US012141754B2

(12) United States Patent
Parks et al.

(10) Patent No.: US 12,141,754 B2
(45) Date of Patent: Nov. 12, 2024

(54) FINITE STATE MACHINES FOR IMPLEMENTING WORKFLOWS FOR DATA OBJECTS MANAGED BY A DATA PROCESSING SYSTEM

(71) Applicant: Ab Initio Technology LLC, Lexington, MA (US)

(72) Inventors: Robert Parks, Weston, MA (US); Anthony Yeracaris, Newton, MA (US); Dusan Radivojevic, North Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 226 days.

(21) Appl. No.: 16/749,604

(22) Filed: Jan. 22, 2020

(65) Prior Publication Data

US 2020/0234242 A1    Jul. 23, 2020

Related U.S. Application Data

(60) Provisional application No. 62/795,443, filed on Jan. 22, 2019.

(51) Int. Cl.
*G06Q 10/10* (2023.01)
*G06F 9/448* (2018.01)
*G06F 16/906* (2019.01)

(52) U.S. Cl.
CPC ......... *G06Q 10/103* (2013.01); *G06F 9/4498* (2018.02); *G06F 16/906* (2019.01)

(58) Field of Classification Search
None
See application file for complete search history.

(56) References Cited

U.S. PATENT DOCUMENTS 5,966,072 A    10/1999   Stanfill et al.
7,716,630 B2    5/2010   Wholey et al.
(Continued)

FOREIGN PATENT DOCUMENTS

CN    1573757 A    2/2005
CN    103210405 A    7/2013

OTHER PUBLICATIONS

Reihaneh et al. reference (Year: 2017).*
(Continued)

*Primary Examiner* — Andrew B Whitaker
(74) *Attorney, Agent, or Firm* — Wolf, Greenfield & Sacks, P.C.

(57) ABSTRACT

Techniques for using finite state machines (FSMs) to implement workflows in a data processing system comprising at least one data store storing data objects and a workflow management system (WMS). The WMS is configured to perform: determining a current value of an attribute of a first data object by accessing the current value in the at least one data store; identifying, using the current value and metadata specifying relationships among at least some of the data objects, an actor authorized to perform a workflow task for the first data object; generating a GUI through which the actor can provide the input that the workflow task is to be performed; and in response to receiving, from the actor and through the GUI, input specifying that the workflow task is to be performed: performing the workflow task; and updating the current workflow state of the first FSM to a second workflow state.

30 Claims, 53 Drawing Sheets

(56) References Cited

U.S. PATENT DOCUMENTS

| | | | |
|---|---|---|---|
| 9,020,873 B1* | 4/2015 | Duffy | G06N 20/00 |
| | | | 706/46 |
| 2003/0055668 A1 | 3/2003 | Saran et al. | |
| 2005/0043982 A1 | 2/2005 | Nguyen | |
| 2008/0201333 A1* | 8/2008 | Rowley | G06Q 10/06 |
| 2009/0043621 A1* | 2/2009 | Kershaw | G06Q 10/06398 |
| | | | 705/7.17 |
| 2011/0161926 A1* | 6/2011 | Cruise | G06F 8/35 |
| | | | 717/113 |
| 2011/0313933 A1* | 12/2011 | Dai | G06Q 10/10 |
| | | | 705/301 |
| 2014/0304380 A1 | 10/2014 | Waas et al. | |
| 2015/0363175 A1* | 12/2015 | Klausner | G06F 8/34 |
| | | | 717/109 |
| 2020/0104142 A1* | 4/2020 | Waga | G06F 9/544 |

OTHER PUBLICATIONS

International Search Report and Written Opinion for International Application No. PCT/US2020/014607, mailed Jun. 2, 2020.
Mohan et al., A State Machine Based Approach for a Process Driven Development of Web-Applications. Lecture Notes in Computer Science. May 27, 2002; 2348:52-66.
International Preliminary Report on Patentability mailed Aug. 5, 2021 in connection with International Application No. PCT/US2020/014607.
Written Opinion for Singapore Application No. 11202107946W dated Aug. 18, 2023.
Extended European Search Report for European Application No. 24179638.2 dated Aug. 1, 2024.

* cited by examiner

FIG. 3C

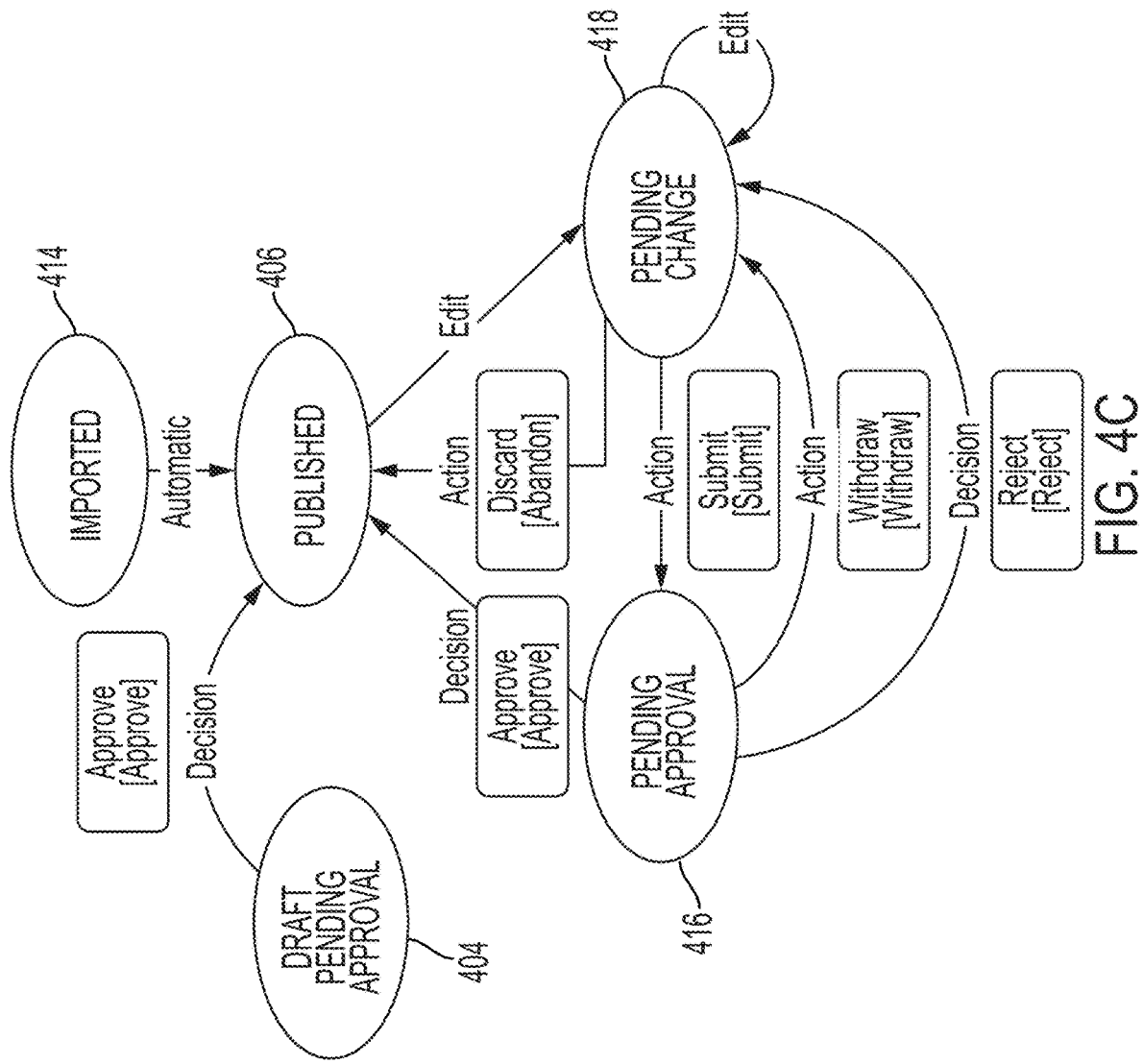

METADATA PORTAL

📖 Business Glossary   🏠 Dashboard   ⚡ Business Lineage   📋 Work Queue   🔒 GDPR ▾   ⊘ DQI   Other ▾   Help ▾     👤 Risk Reviewer ▾

📋 Work Queue

📥 Inbox    📤 Outbox

Inbox Items

⏱ 1 rows   ▽ Filter ⊗   ⇅ Sort ⊗

| ☐ | Object | Description | Created On | Created By | Last Action On | Last Action By |
|---|---|---|---|---|---|---|
| ☐ | 📄 Accounting Exposure | Definition changed | 3/30/2018 4:12:21 PM | 👤 Abby A. Williams | 3/30/2018 4:16:32 PM | 👤 Abby A. Williams |

👍 Approve    👎 Reject    ← 841b

Work Item Details     ✎ Edit

🔵 SUBMITTED
Object: 📄 Accounting Exposure
Description of change:
Definition changed

Modifications

✱ Edited   By 👤 Abby A. Williams   On 3/30/2018 4:12:26 PM
Definition changed

The risk that a company's equities, assets, liabilities or income will change in value as a result of exchange rate changes. This occurs when a *firm* ~~business~~ denominates a portion of its equities, assets, liabilities or income in a foreign currency.

Decision Results

Pending 3

Pending
   👥 Risk Reviewers
   👥 Liquidity Reviewers
   👥 Finance Reviewers

▸ Other users' actions

Activity
💬 Add comment

↪ Abby A. Williams submitted 2 minutes ago
Please review this change to the Definition. Firm was changed to business.

✱ Abby A. Williams edited 6 minutes ago
Definition changed 💬

*powered by* Ab Initio

| METADATA PORTAL | | | | | | | |
|---|---|---|---|---|---|---|---|
| ⌂ | ▲ Business Glossary | ▲ Dashboard | ✓ Business Lineage | ▣ Work Queue | ✦GDPR ▾ | ⦿DQI | Other ▾  Help ▾ |

✿ Configuration

- ▲ Accountable Party Types
- ◇ Classifications
- ▦ Business Hierarchies
- ▨ Application Hierarchies
- □ Additional Attributes
- ✿ State Machines
- □ State Machine Assignment
- ✣ Workflow Actors
- ⚷ Permissions
- □ Business Lineage
- □ Data Quality

State Machines

[+ Add New]

⊙ 7 rows  ● ▣ ▤ Filter  ▲ Sort ⇅  ↻

| Name | Type | Description |
|---|---|---|
| ✿ AutoApproveImportStateMachine | Import State Machine | Automatically approves imports (even if there are errors) |
| ✿ AutoApprovePrimaryStateMachine | Primary Versioned State Machine | Automatically approves edits to primary objects |
| ✿ BusinessLineageStateMachine | Primary Versioned State Machine | Business lineage state machine for nodes and edges |
| ✿ ConditionalImportFeedAutoApproval | Import State Machine | Automatically approves imports that do not contain errors or warnings |
| ✿ DefaultChangeStateMachine | Change State Machine | Default change state machine |
| ✿ DefaultImportFeedStateMachine | Import State Machine | Default primary state machine for import feed changesets |
| ✿ DefaultPrimaryStateMachine | Primary Versioned State Machine | Default primary state machine for versioned objects |

— 910 powered by Ab Initio

Object States

[Add New] [Edit ✏️] [⊗ Filter] [⊟] [⇅ Sort] [↻]  9 rows

| State | Is Public State | Is Quiescent State | Change State Machine | Icon | Style Classes |
|---|---|---|---|---|---|
| ◎ Delete Pending Approval | | | | ab: remove | label label-danger |
| ◎ Deleted | | ✓ | | ab: remove | label label-danger |
| ◎ Draft | ✓ | | | ab: plus | label label-success |
| ◎ Imported | | | | ab: start | label label-success |
| ◎ Pending Approval | | | | ab: approval | label label-warning |
| ◎ Pending Change | | | | ab: edit | label label-warning |
| ◎ Pending Delete | | | | ab: remove | label label-danger |
| ◎ Published | ✓ | ✓ | | ab: check | label label-primary |
| ◎ Start | | | | ab: start | label label-success |

State Transitions

[Edit ✏️] [⊗ Filter] [⊟] [⇅ Sort] [↻]  1 rows

| From State | To State | Type | Task Name | Actor Ty... | Show in Object Vi... | Show in Work Que... | On Event | ChangeSet Operation | Decision |
|---|---|---|---|---|---|---|---|---|---|
| ◎ Start | ◎ Draft | Edit | | | | | | | |

FINITE STATE MACHINES FOR IMPLEMENTING WORKFLOWS FOR DATA OBJECTS MANAGED BY A DATA PROCESSING SYSTEM

CROSS-REFERENCE TO RELATED APPLICATIONS

The present application claims the benefit of priority under 35 U.S.C. § 119(e) to U.S. Provisional Patent Application No. 62/795,443, filed on Jan. 22, 2019, titled "FINITE STATE MACHINES FOR IMPLEMENTING WORKFLOWS FOR DATA OBJECTS MANAGED BY A DATA PROCESSING SYSTEM", which is incorporated by reference herein in its entirety.

BACKGROUND

A finite state machine (FSM) is a computational model that may be implemented in hardware or software. As its name indicates, a finite state machine includes a finite set of states, and the finite state machine can be in exactly one of these states at any given time. A finite state machine also includes one or more transitions between states in the set of states. A finite state machine may transition from one state to another in a number of ways and, for example, in response to a condition being met and/or in response to an external input. A finite state machine may be represented in memory using one or more data structures that store data specifying the list of states, the transitions among the states, and/or an indication of the current state. Finite state machines are used in a many different areas including modeling reactive systems, design of hardware digital systems, modeling application behavior, software engineering, network protocols, natural language processing, and compilers.

SUMMARY

Some embodiments are directed to a method for managing workflows in a data processing system, the data processing system comprising: (i) at least one data store storing: a plurality of data objects and values of their attributes, the plurality of data objects including a first data object, the first data object having a plurality of attributes including a first attribute that can have any one of a plurality of values; and metadata specifying relationships among at least some of the plurality of data objects; and (ii) a workflow management system comprising: a workflow execution engine for managing execution of finite state machines (FSMs) including a first FSM associated with the first data object and for managing a first workflow for the first data object. The method comprises: when a current workflow state of the first FSM is a first workflow state, using the workflow management system to perform: determining a current value of the first attribute of the first data object by accessing the current value of the first attribute in the at least one data store; identifying, using the current value of the first attribute and the metadata specifying relationships among at least some of the plurality of data objects, a first actor authorized to perform a first workflow task for the first data object; generating a graphical user interface (GUI) through which the first actor can provide the input that the first workflow task is to be performed; and in response to receiving, from the first actor and through the GUI, input specifying that the first workflow task is to be performed: performing the first workflow task for the first data object; and updating the current workflow state of the first FSM to a second workflow state.

Some embodiments are directed to at least one non-transitory computer readable storage medium storing processor-executable instructions that, when executed by a data processing system, cause the data processing system to perform a method for managing workflows in the data processing system, the data processing system comprising: (i) at least one data store storing: a plurality of data objects and values of their attributes, the plurality of data objects including a first data object, the first data object having a plurality of attributes including a first attribute that can have any one of a plurality of values; and metadata specifying relationships among at least some of the plurality of data objects; and (ii) a workflow management system comprising: a workflow execution engine for managing execution of finite state machines (FSMs) including a first FSM associated with the first data object and for managing a first workflow for the first data object, the method comprising: when a current workflow state of the first FSM is a first workflow state, using the workflow management system to perform: determining a current value of the first attribute of the first data object by accessing the current value of the first attribute in the at least one data store; identifying, using the current value of the first attribute and the metadata specifying relationships among at least some of the plurality of data objects, a first actor authorized to perform a first workflow task for the first data object; generating a graphical user interface (GUI) through which the first actor can provide the input that the first workflow task is to be performed; and in response to receiving, from the first actor and through the GUI, input specifying that the first workflow task is to be performed: performing the first workflow task for the first data object; and updating the current workflow state of the first FSM to a second workflow state.

Some embodiments are directed to a data processing system, comprising: at least one computer hardware processor; at least one data store storing: a plurality of data objects and values of their attributes, the plurality of data objects including a first data object, the first data object having a plurality of attributes including a first attribute that can have any one of a plurality of values; and metadata specifying relationships among at least some of the plurality of data objects; and a workflow management system comprising: a workflow execution engine for managing execution of finite state machines (FSMs) including a first FSM associated with the first data object and for managing a first workflow for the first data object, wherein the workflow management system is configured to perform, using the at least one computer hardware processor, a method comprising: when a current workflow state of the first FSM is a first workflow state: determining a current value of the first attribute of the first data object by accessing the current value of the first attribute in the at least one data store; identifying, using the current value of the first attribute and the metadata specifying relationships among at least some of the plurality of data objects, a first actor authorized to perform a first workflow task for the first data object; generating a graphical user interface (GUI) through which the first actor can provide the input that the first workflow task is to be performed; and in response to receiving, from the first actor and through the GUI, input specifying that the first workflow task is to be performed: performing the first workflow task for the first data object; and updating the current workflow state of the first FSM to a second workflow state.

Some embodiments are directed to a system for managing a workflow for a first data object in a plurality of data objects using a first finite state machine (FSM), the first FSM having a first set of workflow states including first and second workflow states, and a first set of transitions among the first set of workflow states, the first set of transitions representing tasks in the first workflow and including a first transition between the first and second states representing a first workflow task in the first workflow. The system comprising: at least one computer hardware processor; and at least one non-transitory computer-readable storage medium storing processor-executable instructions that, when executed by the at least one computer hardware processor, cause the at least one computer hardware processor to perform: identifying, from among a plurality of actors and using at least one value of at least one attribute of the first data object, a first actor authorized to perform the first workflow task for the first data object; and when the first FSM indicates that a current workflow state of the first workflow for the first data object is the first workflow state, receiving, from the first actor, input specifying that the first workflow task is to be performed; performing the first workflow task for the first data object; and updating the first FSM to indicate that the current workflow state of the first workflow for the first data object is the second workflow state.

Some embodiments are directed to a method for managing a workflow for a first data object in a plurality of data objects using a first finite state machine (FSM), the first FSM having a first set of workflow states including first and second workflow states, and a first set of transitions among the first set of workflow states, the first set of transitions representing tasks in the first workflow and including a first transition between the first and second states representing a first workflow task in the first workflow. The method comprises using at least one computer hardware processor to perform: identifying, from among a plurality of actors and using at least one value of at least one attribute of the first data object, a first actor authorized to perform the first workflow task for the first data object; and when the first FSM indicates that a current workflow state of the first workflow for the first data object is the first workflow state, receiving, from the first actor, input specifying that the first workflow task is to be performed; performing the first workflow task for the first data object; and updating the first FSM to indicate that the current workflow state of the first workflow for the first data object is the second workflow state.

Some embodiments are directed to at least one non-transitory computer readable storage medium storing processor executable instructions that, when executed by at least one computer-hardware processor, cause the at least one computer hardware processor to perform a method for managing a workflow for a first data object in a plurality of data objects using a first finite state machine (FSM), the first FSM having a first set of workflow states including first and second workflow states, and a first set of transitions among the first set of workflow states, the first set of transitions representing tasks in the first workflow and including a first transition between the first and second states representing a first workflow task in the first workflow. The method comprises: identifying, from among a plurality of actors and using at least one value of at least one attribute of the first data object, a first actor authorized to perform the first workflow task for the first data object; and when the first FSM indicates that a current workflow state of the first workflow for the first data object is the first workflow state, receiving, from the first actor, input specifying that the first workflow task is to be performed; performing the first workflow task for the first data object; and updating the first FSM to indicate that the current workflow state of the first workflow for the first data object is the second workflow state.

Some embodiments provide for a method for managing workflows for a plurality of data objects including a first data object, the method comprising using at least one computer hardware processor to perform: generating, using a first specification for a first finite state machine (FSM), a first FSM for managing a first workflow for a first set of data objects, the first specification indicating: a first set of workflow states including first and second workflow states; and a first set of transitions among the first set of workflow states, the first set of transitions representing tasks in the first workflow and including a first transition between the first and second states representing a first task in the first workflow; and when the first FSM indicates that a current workflow state of the first workflow for the first set of data objects is the first workflow state, receiving, from a first actor authorized to perform the first workflow task corresponding to the first transition between the first and second workflow states, input specifying that the first workflow task is to be performed; performing the first workflow task for the first data object; and updating the first FSM to indicate that the current workflow state of the first workflow for the first set of first data objects to the second workflow state.

Some embodiments provide for at least one non-transitory computer-readable storage medium storing processor-executable instructions that, when executed by the at least one computer hardware processor, cause the at least one computer hardware processor to perform: generating a first finite state machine (FSM) for a first workflow for a first data object of a plurality of data objects; identifying, using at least one value of at least one attribute of the first data object, a first actor authorized to perform a first workflow task associated with a first transition out of the first workflow state to a second workflow state; when the first FSM indicates that a current workflow state of the first workflow is a first workflow state, generating a graphical user interface (GUI) through which the first actor can provide the input that the first workflow task is to be performed, and presenting the GUI to the first actor.

Some embodiments provide for a method, comprising using at least one computer hardware processor to perform: generating a first finite state machine (FSM) for a first workflow for a first data object of a plurality of data objects; identifying, using at least one value of at least one attribute of the first data object, a first actor authorized to perform a first workflow task associated with a first transition out of the first workflow state to a second workflow state; when the first FSM indicates that a current workflow state of the first workflow is a first workflow state, generating a graphical user interface (GUI) through which the first actor can provide the input that the first workflow task is to be performed, and presenting the GUI to the first actor.

Some embodiments provide for a system, comprising: at least one computer hardware processor; and at least one non-transitory computer-readable storage medium storing processor executable instructions that, when executed by the at least one computer hardware processor, cause the at least one computer hardware processor to perform: generating a first finite state machine (FSM) for a first workflow for a first data object of a plurality of data objects; identifying, using at least one value of at least one attribute of the first data object, a first actor authorized to perform a first workflow task associated with a first transition out of the first workflow state to a second workflow state; when the first FSM indicates that a current workflow state of the first workflow is a first workflow state, generating a graphical user interface (GUI) through which the first actor can provide the input that the first workflow task is to be performed, and presenting the GUI to the first actor.

Some embodiments provide for at least one non-transitory computer-readable storage medium storing processor-executable instructions that, when executed by at least one computer hardware processor, cause the at least one computer hardware processor to perform: generating a first FSM for managing the first workflow for changing a value of an attribute of a first data object of a plurality of data objects, the generating performed using a specification indicating a first set of workflow states including first and second workflow states and a first set of transitions among the first set of workflow states, the first set of transitions representing tasks in the first workflow and including a first transition between the first and second states representing a first task in the first workflow; and when the first FSM indicates that a current workflow state of the first workflow for the first data object is the first workflow state, receiving, from a first actor authorized to perform the first workflow task corresponding to the first transition between the first and second workflow states, the input specifying that the first workflow task is to be performed; performing the first workflow task for the first data object; and updating the first FSM to indicate that the current workflow state of the first workflow for the first data object is the second workflow state.

Some embodiments provide for a system, comprising: at least one computer hardware processor; and at least one non-transitory computer-readable storage medium storing processor-executable instructions that, when executed by the at least one computer hardware processor, cause the at least one computer hardware processor to perform: generating a first FSM for managing the first workflow for changing a value of an attribute of a first data object of a plurality of data objects, the generating performed using a specification indicating a first set of workflow states including first and second workflow states and a first set of transitions among the first set of workflow states, the first set of transitions representing tasks in the first workflow and including a first transition between the first and second states representing a first task in the first workflow; and when the first FSM indicates that a current workflow state of the first workflow for the first data object is the first workflow state, receiving, from a first actor authorized to perform the first workflow task corresponding to the first transition between the first and second workflow states, the input specifying that the first workflow task is to be performed; performing the first workflow task for the first data object; and updating the first FSM to indicate that the current workflow state of the first workflow for the first data object is the second workflow state.

Some embodiments provide for a method, comprising using at least one computer hardware processor to perform: generating a first FSM for managing the first workflow for changing a value of an attribute of a first data object of a plurality of data objects, the generating performed using a specification indicating a first set of workflow states including first and second workflow states and a first set of transitions among the first set of workflow states, the first set of transitions representing tasks in the first workflow and including a first transition between the first and second states representing a first task in the first workflow; and when the first FSM indicates that a current workflow state of the first workflow for the first data object is the first workflow state, receiving, from a first actor authorized to perform the first workflow task corresponding to the first transition between the first and second workflow states, the input specifying that the first workflow task is to be performed; performing the first workflow task for the first data object; and updating the first FSM to indicate that the current workflow state of the first workflow for the first data object is the second workflow state.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 3C is a diagram of an illustrative graphical user interface (GUI) 380 through which an actor can view and/or perform one or more workflow tasks, in accordance with some embodiments of the technology described herein.

FIGS. 4B-4D are diagrams illustrating portions of finite state machine 400 shown in FIG. 4A, in accordance with some embodiments of the technology described herein.

FIG. 8B is a view of a GUI 810 showing information for a business term data object including values for data object attributes and associated parties, in accordance with some embodiments of the technology described herein.

FIG. 8C is a view of a GUI 820 showing information for a business term data object including the current workflow state of a finite state machine for the business term data object, in accordance with some embodiments of the technology described herein.

FIG. 8E is a view of a GUI 830 showing how an actor's change to the value of a second attribute of the data object results in the instantiation of another secondary finite state machine for managing the approval process for the change of the attribute value, in accordance with some embodiments of the technology described herein.

FIG. 8F is a view of a GUI 835 showing the actor's view after the actor has submitted a change to a value of an attribute of a data object, in accordance with some embodiments of the technology described herein.

FIG. 8G is a view of a GUI 837 showing a list of reviewers to approve the submitted change to the value of the data object attribute, in accordance with some embodiments of the technology described herein.

FIG. 8H is a view of a GUI 840 showing a reviewer log in, check his work queue, and approve the change submitted by the actor, in accordance with some embodiments of the technology described herein.

FIG. 8I is a view of a GUI 845 showing another reviewer log in, check his work queue, and approve the change submitted by the actor, in accordance with some embodiments of the technology described herein.

FIG. 8J show a view of GUI 850 through which a reviewer can access his or her work queue, in accordance with some embodiments of the technology described herein.

FIG. 8K shows a view of GUI 855 through which the actor can see whether her changes have been approved, in accordance with some embodiments of the technology described herein.

FIG. 8L is a view of a GUI 860 showing another reviewer log in, check his work queue, and approve the change submitted by the actor, in accordance with some embodiments of the technology described herein.

FIG. 9A is a view of a GUI 910 showing a listing of finite state machine specifications, in accordance with some embodiments of the technology described herein.

FIG. 9B is a view of a GUI 920 showing a primary finite state machine for managing changes to the data object in the examples of FIGS. 8A-8N, in accordance with some embodiments of the technology described herein.

FIG. 9C is a view of a GUI 930 showing the state table for the primary state machine shown in FIG. 9B and state transitions for one of the states, in accordance with some embodiments of the technology described herein.

FIG. 9D is a view of a GUI 940 showing the state table for the primary state machine shown in FIG. 9B, and state transitions for another one of the states, in accordance with some embodiments of the technology described herein.

FIG. 10 is a view of a GUI 1000 showing a secondary finite state machine for managing changes to attributes of the data object in the examples of FIGS. 8A-8N and the associated state table, in accordance with some embodiments of the technology described herein.

DETAILED DESCRIPTION

Figure 1A:
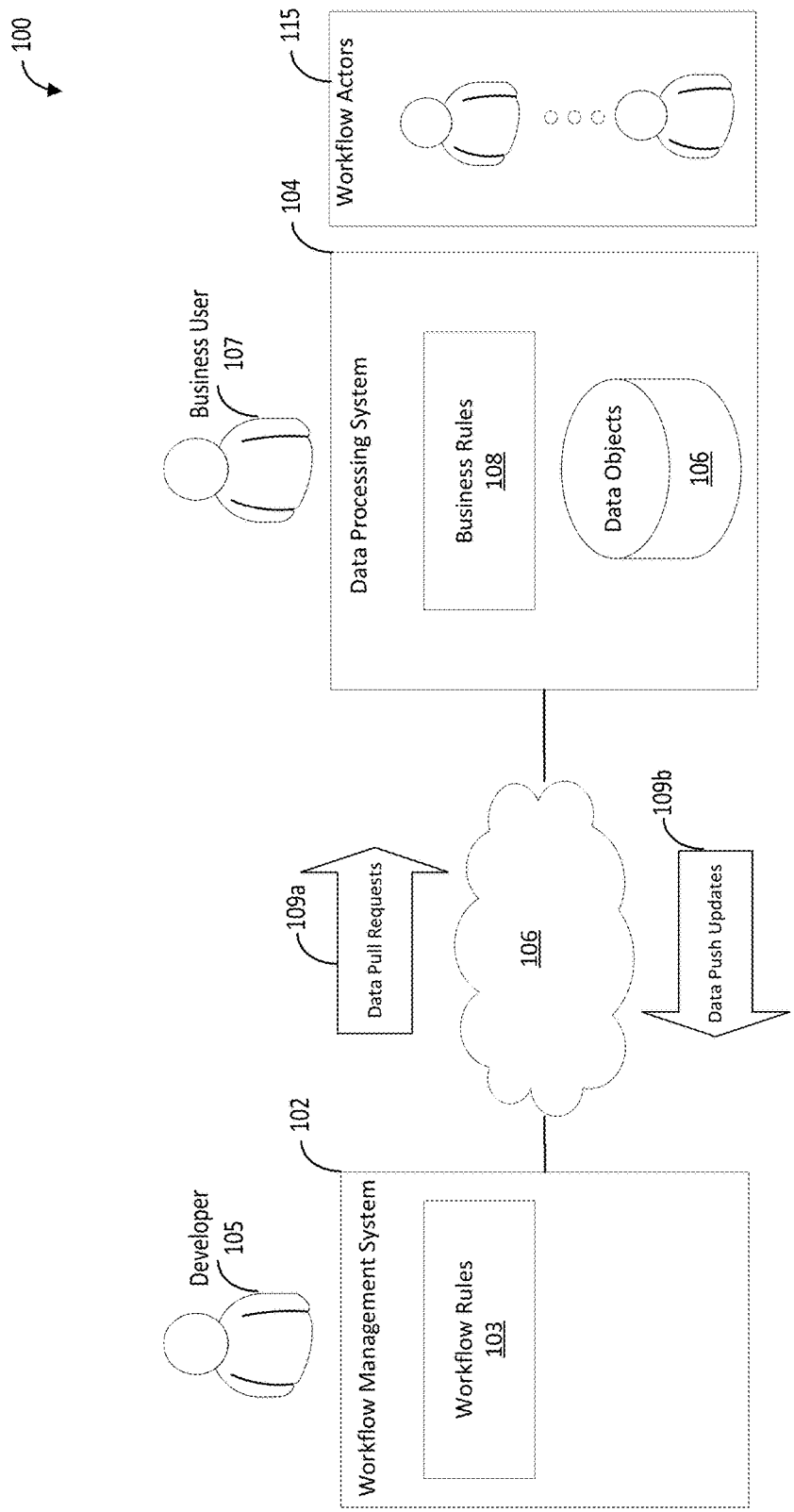
FIG. 1A is a block diagram of a conventional workflow management system.

Aspects of the technology described herein relate to increasing the speed, throughput, and accuracy of a data processing system by improving upon conventional techniques for implementing workflows for data objects managed by the data processing system. A data processing system may manage thousands, millions, or billions of data objects. The techniques described herein enable efficient implementation of workflows for such data objects in a way that reduces errors occurring in and the computational resources used by data processing systems that implement workflows using conventional workflow implementation techniques. The techniques developed by the inventors provide data processing system users with precise and concise control over who can edit data, who can access data and when, who can see pending changes, who can approve the dissemination of data to a broader audience, who gets notified of changes (e.g., people and systems), and who can advance the workflow state of a data object.

In some embodiments, a workflow for a data object may include a set of workflow tasks related to the data object, with each task in the set of tasks being performed by the data processing system either automatically or in response to input provided by one or more actors. For example, a workflow for a data object may be a workflow for changing a value of an attribute of the data object. The tasks in such a workflow may include making a proposed change to the attribute value, submitting the proposed change for review, reviewing the proposed change, and approving or rejecting the proposed change. Examples of such a workflow are provided herein including with reference to FIGS. 3A and 4A-4D. As another example, a workflow for a data object may be a workflow for resolving an issue (e.g., a data error) represented by the data object. The tasks in such a workflow may include editing the data object representing issue, submitting the issue, indicating that the issue has been resolved, verifying whether the issue has been resolved. An illustrative example of such a workflow is provided herein including with reference to FIG. 3B.

In some embodiments, one or more workflow tasks in a workflow may be performed by one or more actors. An actor may perform one or more actions in furtherance of performing (e.g., to start performing, to start and complete performing) a workflow task in a workflow. For example, one actor may perform the workflow task of editing a data object and submitting the changes for review, while another actor or actors may review the changes and determine whether to approve or reject the changes. An actor may be a user of a data processing system who is authorized to perform one or more actions with respect to one or more data objects managed by the data processing system.

The inventors recognized that conventional approaches for implementing workflows in data processing systems may be improved. For example, one conventional approach of specifying a workflow is using a graphical representation called the business process model and notation (BPMN) representation. However, a workflow specified in BPMN is just a specification—BPMN does not include executable code that a data processing system can use to execute the BPMN workflow. Further, BPMN does not provide any capabilities for controlling the visibility or editability of data objects persisted in a relational database. Although there are software tools for implementing BPMN workflows (e.g., CAMUNDA BPMN), such software tools require writing low-level code for implementing BPMN workflows, which is time consuming, error prone, and ultimately impractical, especially when multiple workflows need to be specified for a large number of data objects being managed by a data processing system.

Additionally, conventional software tools for implementing workflows do not provide a way to customize which actors are authorized to perform which workflow tasks at the data-object level. Rather, conventional approaches involve identifying actors at the workflow task level. For example, unlike the techniques described herein, BPMN does not provide a mechanism for identifying and varying actors based on data object attributes and/or relationships.

The inventors have also recognized that although conventional workflow management systems are sometimes used to manage workflows for data objects in a data processing system, such conventional workflow management systems are not integrated with the data processing system. As described next, such deployments have a number of drawbacks including lack of synchronization and complexity of implementation and maintenance. Additionally, such deployments typically do not provide the richness in the workflow or in the information that can be presented to a business user that an integrated approach can provide.

A conceivable illustrative situation is illustrated in the potential computing environment 100 of FIG. 1A, which shows a conventional workflow management system 102 communicatively coupled to data processing system 104 through network 106 (e.g., the Internet). The data processing system 104 includes: a data store 106 storing multiple data objects, and business rules 108, which specify information used for implementing any workflows for the data objects in data store 106. For example, business rules 108 may specify actor permissions by specifying which actors (e.g., from among actors 115) have create, read, update, and/or delete permissions for various data objects in data store 106, and which actors are authorized to review updates to data objects made by other actors. Business rules 108 are typically specified by business users (e.g., business user 107).

The workflow management system 102 includes workflow rules 103, which specify how workflows involving the data objects are to be implemented by the external workflow management system 102. For example, workflow rules 103 may specify a sequence of tasks in a workflow and which actor(s), from among workflow actors 115, are authorized to perform these tasks. Workflow rules 103 are implemented using low-level software code (e.g., using Camunda BPMN) by one or more software developers, like developer 105.

Since the conventional workflow management system 102 is not integrated with data processing system 104, these two separate systems need to be synchronized. One conceivable approach to synchronization is the "data pulling" approach in which the WMS 102 repeatedly polls data processing system 104 for updates to its data via data pull requests 109a. Another conceivable approach to synchronization is the "data pushing" approach in which the data processing system 104 pushes data updates 109b to WMS 102. However, both of these conceivable approaches have significant drawbacks, and not only fail to provide an acceptable level of synchronization, but also can cause workflow errors.

For example, in the data pulling approach, there would be a latency in receiving data updates since a data processing system may manage a large number of data objects (e.g., thousands/millions) whose values need to be updated and it takes time to gather and communicate such updates to WMS 102 over a network. Moreover, if the workflow rules 103 depend on values of data objects, any delay in updates to those values means that the WMS 102 implements workflows incorrectly (e.g., by allowing an actor to perform a workflow task that she is not authorized to perform), which is unacceptable in many applications such as, for example, data governance.

On the other hand, in the data pushing approach, the data processing system 104 would not be aware of what information is used by the workflow rules 103 to implement workflows, and does not know what data to provide to WMS 102, or when to provide these data (and providing all possible data changes is impractical, as it would mean sending a copy of each update). Since the workflow rules 103 are managed by the workflow management system 102, the data processing system 104 does not have access to the workflow rules 103, does not have any capability or mechanism to reason about the workflow rules 103, and cannot be used to drive push updates. For example, if one of the data objects in data store 106 is updated, the data processing system 104 has no way of knowing whether the change in that data object might trigger a particular workflow rule 103 (or impact how it is executed), and thus the data processing system has no way of deciding whether or not to "push" a notification of that change to the workflow management system 102. As a result, the WMS 102 may not receive information it needs from the data processing system 104 to accurately implement the workflows or may be inundated with all possible data changes, most of which may be irrelevant to workflow management.

Aside from lack of synchronization, another drawback of the conceivable system shown in FIG. 1A is the amount of time and effort required to deploy, maintain, and update such a system. For example, if the business rules 108 change, then the workflow rules 103 may need to be updated, which would require time from software developer 107. As another example, if there are changes to the workflow rules 103, the data processing system 104 would need to be updated (perhaps with the involvement of one or more software developers) to make sure that the data processing system 104 pushes to WMS 102 whatever data is now required by WMS 102 to implement the workflows (as a result of the update to workflow rules 103). This is both costly and introduces unacceptable time delays, especially when the time between changes to workflow rules 103 and/or business rules 108 is much shorter than the time it takes to write, test, and deploy code to implement such changes. Any inconsistency in the workflow logic in WMS 102 and the data "pushing" logic in data processing system 104, would immediately lead to erroneous workflow management. Such system fragility is obviously not acceptable in practice.

To address the above-described shortcomings of conventional techniques for implementing workflows, the inventors have developed new approach for a workflow management system for formally managing rich workflows for data objects stored in the data processing system. Unlike conventional approaches in which the workflow management system is separate from the data processing system (e.g., as described above with reference to FIG. 1A), the workflow management system developed by the inventors is integrated with the data processing system, which avoids multiple shortcomings of conventional approaches described above. The workflow management system developed by the inventors has direct access not only to the data objects managed by a data processing system (which avoids the above-described synchronization and latency issues), but also to metadata specifying relationships among the data objects, which can be leveraged to efficiently identify authorized actors for data objects using inheritance and/or group membership, as described herein.

The workflow management system developed by the inventors uses finite state machines to implement workflows for data objects managed by the data processing system. In some embodiments, a workflow for a data object may be represented by a finite state machine, with the states of the finite state machine corresponding to workflow states of the data object in the workflow, and with the transitions of the finite state machine corresponding to workflow tasks. In some embodiments, in order to implement a workflow for a particular data object, an instance of the finite state machine may be created for that data object. As workflow tasks are performed, the state of the FSM instance is updated to indicate the current state of the data object. After the workflow is completed for a data object, the instance of the FSM used to manage that workflow may be deleted and/or a workflow for subsequent modifications may be initiated (e.g., a workflow to create and publish a document may complete by initiating a new workflow to give one or more actors permission to revise the published document).

The inventors have recognized that implementing workflows at the data object level using finite state machines eliminates the need for actors to write low-level code, as is the case with other conventional workflow implementation techniques. Instead, an actor need only configure a finite state machine by specifying its states, transitions, and related parameters, as described herein. Although the finite state machine approach is more constrained than one in which an actor may write any suitable program code to implement the workflow (notably, an FSM is in one state at any given time, while BPMN and related solutions allow a workflow to be in multiple states at one time), the structure and constraints imposed by the FSM approach reduce the amount of time required to specify new workflows and the number of errors in them, which in turn improves the accuracy and reliability of the data processing system managing the data objects and the execution of workflows for the data objects.

The techniques developed by the inventors described herein provide multiple other benefits relative to conventional workflow modeling approaches such as BPMN. For example, the techniques described herein provide concise configuration/controls to express the editability, visibility, notifications, and lifecycle of data objects. As another example, the techniques described herein provide a mechanism for identifying and varying actors based on data object attributes and/or relationships among multiple data objects (including, for example, direct, relational, and/or recursive relationships). As another example, BPMN does not assume any sort user interface (or even single application), and the techniques described herein improve upon BPMN by allowing the workflow to express what should happen in the user interfaces being presented to workflow actors. These improvements allow for a more concise, less error prone, faster to market, and more efficient implementation over BPMN for workflows.

In some embodiments, a data processing system may use the state of the FSM instance for managing a workflow for a data object to enable one or more actors of the data processing system to perform workflow tasks on the data object. For example, the data processing system may use the state of the FSM to determine which action(s) may be performed relative to the data object (e.g., based on the transitions out of the current workflow state) and allow one or more actors to perform such action(s). For example, the data processing system may notify an actor that he or she may perform a workflow action and/or present the actor with an interface (e.g., a graphical user interface) through which the actor may provide input indicating that the workflow action is to be performed.

In some embodiments, a data processing system may use multiple finite state machines to manage a workflow for a single data object. For example, when the workflow involves making multiple different changes to the data object, a dedicated finite state machine may be instantiated for managing the approval process for each respective change. Using multiple finite state machines to manage different changes to a single data object allows the workflows for making and approving such changes to proceed in parallel and independently of one another. Such parallelization further improves the efficiency of the data processing system. This is described in more detail herein, including with reference to FIGS. 5A-5C. In addition, such parallelization makes it easier for administrators or other actors interacting with the data processing system to make/work on multiple changes in parallel to one another, since each change may be managed by a respective finite state machine. As such, one or more parallel workflows may be instantiated for one or more respective attributes of a data object. The states of the parallel workflow(s) may affect the primary workflow (e.g., the state of the primary workflow may change in response to the parallel workflows completing after all attribute changes are completed).

The inventors have further recognized that managing a workflow using finite state machines on a per-data-object level, allows the data processing system to identify actors authorized to perform various workflow tasks on a per-data-object level. Accordingly, in some embodiments, the data processing system may identify actors authorized to perform a workflow task on a data object based on information associated with the data object. For example, in some embodiments, a data processing system may identify one or more actors authorized to perform a workflow task on a data object based on a value or values of one or more attributes of the data object.

In some embodiments, one or more finite state machines may be used to manage one or more workflows associated with one or more lifecycle stages of a particular data object. For example, the lifecycle of a data object may involve stages such as creating the data object, revisioning of the data object, publication of the data object, approval of the data object, approval of changes to the data object, and collaborating on changes to the data object. Each of the lifecycle stages may be associated with a workflow managed by using a finite state machine, in accordance with some embodiments of the technology described herein.

Some embodiments described herein address all of the above-described issues that the inventors have recognized with conventional techniques for implementing workflows for data objects managed by a data processing system. However, not every embodiment described herein addresses every one of these issues, and some embodiments may not address any of them. As such, it should be appreciated that embodiments of the technology described herein are not limited to addressing all or any of the above-discussed issues of conventional techniques for implementing workflows for data objects managed by a data processing system.

In some embodiments, a data object managed by a data processing system may include data and one or more attributes, each of which may be single-valued or multi-valued. Data in a data object may include content such as, for example, text, a data record, and/or one or more alphanumeric values. As one example, a data object may represent a data record (e.g., a transaction), and the data in the data object may be stored in the fields of the data record. As another example, a data object may represent a file. As another example, a data object may represent a document. In this example, the data in the data object may include text in the document. As another example, a data object may represent a business term in a business glossary of an organization (e.g., "Credit Risk," "Accounting Exposure", etc.) In this example, the data in the data object may include text specifying the definition of the business term. As another example, a data object may represent an issue to be resolved (e.g., a data error, a request to reset a password, a problem with a purchase order, invoice or other document). In this example, the data in the data object may include text describing the issue.

In some embodiments, a data object may have one or multiple attributes. The values of the attributes may provide information about the data object. For this reason, the attribute values may be considered metadata. As one example, a data object may have an attribute indicating its name and/or other identifier. As another example, a data object may have a definition attribute specifying a semantic meaning of the data object. As another example, the data object may be part of one or more hierarchies of data objects and may have an attribute indicating the hierarchy or hierarchies to which the data object belongs. As another example, a data object may have one or more classification attributes including, by way of example and not limitation, a governance group classification attribute which may specify a list of one or more governance groups to which the data object belongs, a sensitivity classification attribute which may indicate the sensitivity level of data in the data object (e.g., "Internal", "Public", "Confidential", "Highly Confidential"), and a personally identifiable information ("PII") classification attribute indicating a level of harm (e.g., "Level 1", "Level 2", etc.) that would result from improper use, access, and/or modification of the data in the data object. As another example, a data object may have an attribute specifying one or more actors authorized to perform one or more actions (e.g., create, read, access, update, delete) on the data object. As another example, a data object may have an attribute indicating valid values (via a range, a list) for another value associated with data object. These examples of attributes are illustrative and non-limiting, with additional examples of attributes being provided herein.

Some embodiments provide for a method for managing workflows in a data processing system, the data processing system comprising: (i) at least one data store storing: a plurality of data objects and values of their attributes, the plurality of data objects including a first data object, the first data object having a plurality of attributes including a first attribute that can have any one of a plurality of values; and metadata specifying relationships among at least some of the plurality of data objects; and (ii) a workflow management system comprising: a workflow execution engine for managing execution of finite state machines (FSMs) including a first FSM associated with the first data object and for managing a first workflow for the first data object. The method may include, when a current workflow state of the first FSM is a first workflow state (e.g., "pending approval" state 306 of FSM 300 in FIG. 3A), using the workflow management system to perform: (A) determining a current value of the first attribute of the first data object by accessing the current value of the first attribute in the at least one data store (in this way the current value rather than a potentially stale previously-cached value is used); (B) identifying, using the current value of the first attribute and the metadata specifying relationships among at least some of the plurality of data objects, a first actor authorized to perform a first workflow task for the first data object; (C) generating a graphical user interface (GUI) through which the first actor can provide the input that the first workflow task is to be performed; and (D) in response to receiving, from the first actor and through the GUI, input specifying that the first workflow task is to be performed: (1) performing the first workflow task for the first data object (e.g., reject the change); and (2) updating the current workflow state of the first FSM to a second workflow state (e.g., change the current workflow state to the "draft" state 304 of FIG. 3A).

In some embodiments, data objects in the plurality of data objects are organized into one or more hierarchies, wherein the metadata specifies the one or more hierarchies, and wherein the current value of the first attribute indicates a first hierarchy, of the one or more hierarchies, to which the first data object belongs. Accordingly, in some embodiments, identifying the first actor comprises: identifying the first actor as an actor authorized to perform the first workflow task for a second data object in the plurality of data objects, wherein the second data object is related to (e.g., it is an ancestor, a descendant, or a sibling) of the first data object according to the first hierarchy.

Some embodiments provide for a data processing system for managing a workflow for a first data object in a plurality of data objects using a first FSM, the first FSM having a first set of workflow states including first and second workflow states, and a first set of transitions among the first set of workflow states, the first set of transitions representing tasks in the first workflow and including a first transition between the first and second states representing a first workflow task in the first workflow. In some embodiments, the system is programmed to: (1) identify, from among a plurality of actors and using a value of an attribute of the first data object, a first actor authorized to perform the first workflow task for the first data object; and (2) when the first FSM indicates that a current workflow state of the first workflow for the first data object is the first workflow state (e.g., "pending approval" state 306 of FIG. 3A), (a) receive, from the first actor, input specifying that the first workflow task is to be performed (e.g., receive input from a reviewer rejecting the change); (b) perform the first workflow task for the first data object (e.g., reject the change); and (c) update the first FSM to indicate that the current workflow state of the first workflow is the second workflow state (e.g., change the current workflow state to the "draft" state 304 of FIG. 3A).

The data processing system may use the value(s) of any of numerous types of data object attributes to identify an actor authorized to perform a workflow task. For example, in some embodiments, the attribute may be a classification attribute whose value indicates a classification for the data object, and the actor may be identified based on the value of the classification attribute. Examples of classification attributes include, but are not limited to, a governance group classification, a sensitivity classification, and a personally identifiable information classification. For example, in some embodiments, one actor may be identified as authorized to perform a workflow task on a data object when its sensitivity classification is "Public", while another actor may be identified as authorized to perform the same workflow task for another data object when its sensitivity classification is "Confidential".

As another example, in some embodiments, data objects in the plurality of objects may be organized into one or more hierarchies, and the attribute may indicate one or more of the hierarchies to which the data object belongs. In some such embodiments, the data processing system may identify an actor authorized to perform a workflow task "T" for data object "A" to be an actor specified for at least one other data object "B" related to data object "A" in the same hierarchy (e.g., data object "B" may be a sibling, parent, grandparent, or other ancestor of data object "A" in the hierarchy). In some embodiments, an actor specified for data object "B" may be an actor authorized to perform the workflow task "T" on data object "B" or may be any other suitable actor, as aspects of the technology described herein are not limited in this respect. This is described herein including with reference to FIGS. 1D-1G.

In some embodiments, the data processing system may use the value of the attribute to identify an actor having create, read, update, and/or delete (CRUD) permissions for the data object. Once such an actor is identified, the data processing system may provide this actor with access to an interface (e.g., a graphical user interface) through which the actor may provide input relating to a first workflow task for a workflow for the first data object. The data processing system may generate such a GUI and present it to the actor. In turn, the actor may use the GUI to provide input to the data processing system specifying that the first workflow task is to be performed (e.g., indicating that a change to a data object is to be submitted for review, providing a decision, etc.). The data processing system may receive the input through the GUI, perform the workflow task for the first data object; and update a finite state machine for managing the workflow for the first data object to indicate that the current workflow state of the first data object has changed.

In some embodiments, the data processing system is configured to generate a finite state machine for managing a workflow for a data object from a specification of the finite state machine. The specification may indicate the states and transitions for the FSM, and may be stored in any suitable format and/or any suitable data structure(s), as aspects of the technology described herein are not limited in this respect.

In some embodiments, a data processing system may implement: (1) a workflow for a data object using an instance of a finite state machine for the workflow; and (2) the same workflow for a different data object using another instance of the finite state machine.

In some embodiments, a data processing system may use one FSM to manage a workflow for a data object and another FSM to manage a workflow for approving a change to a value of an attribute of the object. In this situation, the FSM for managing the workflow for the data object may be termed the "primary" FSM, while the FSM for managing the workflow for approving a change to an attribute value may be termed the "secondary" FSM. Primary and secondary finite state machines are described herein including with reference to FIGS. 5A-5C.

In some embodiments, the data processing system may generate one or more graphical user interfaces indicating the current workflow state of a finite state machine for a data object. Examples of this are described herein including with reference to FIGS. 8A-8N.

In some embodiments, a workflow task may involve a decision made by one or more actors. For example, one or more reviewers may decide whether a pending change to a data object is to be approved or rejected. As another example, one or more reviewers may decide whether a data object is to be deleted. As yet another example, one or more reviewers may decide whether a pending issue is resolved. In some embodiments, the data processing system may utilize a voting scheme to determine the decision based on inputs provided by multiple actors. For example, the data processing system may determine that a pending change is approved as soon as any one of the multiple actors provides such approval. As another example, the data processing system may determine that a pending change is approved only when a majority or all of the multiple actors provides such an approval.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Illustrative Data Processing System

Figure 1B:
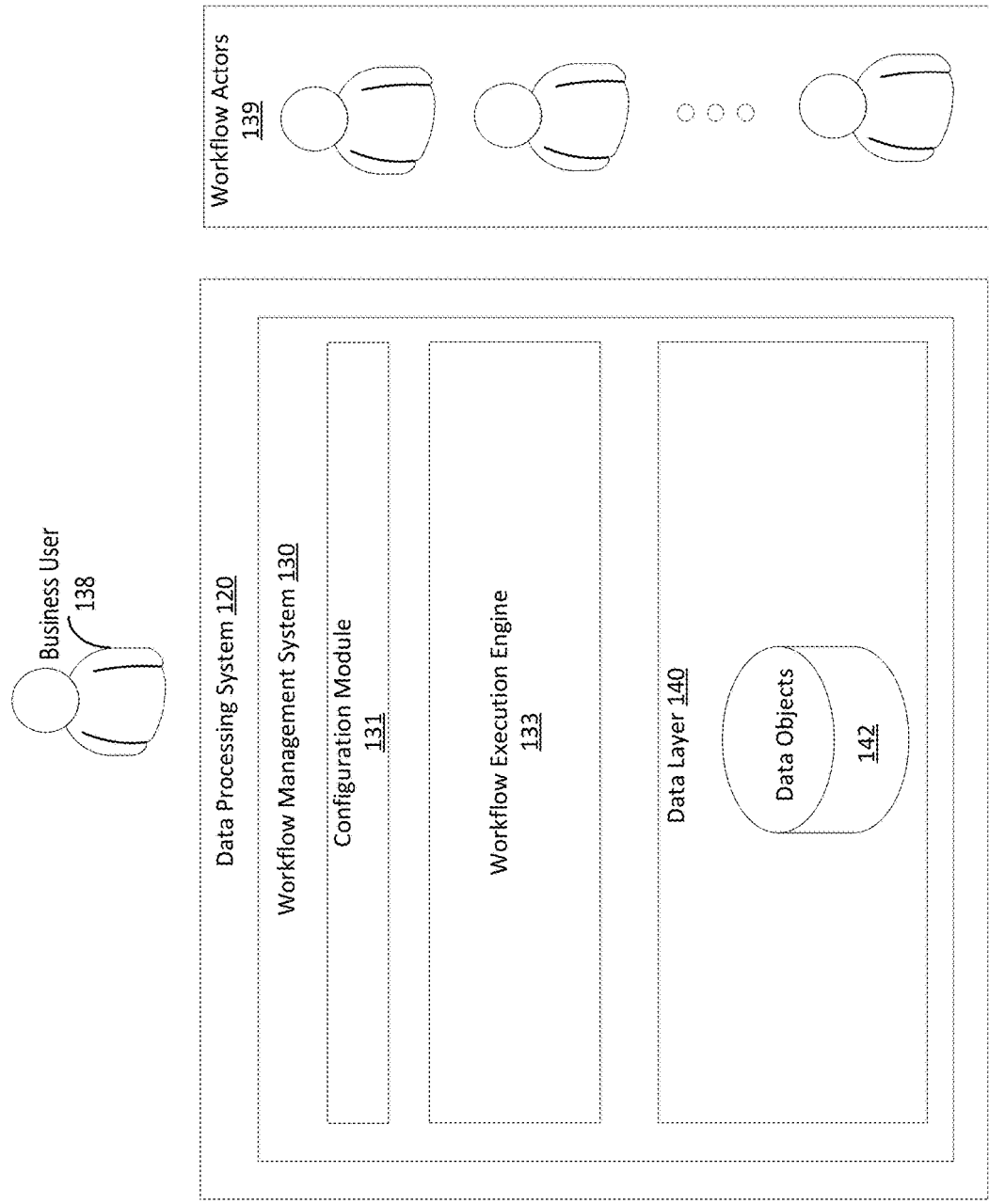
FIG. 1B is a block diagram of an illustrative data processing system 120 and a workflow management system 130 integrated with the data processing system 120, in accordance with some embodiments of the technology described herein.

FIG. 1B is a block diagram of an illustrative data processing system 120 and a workflow management system 130 integrated with the data processing system 120, in accordance with some embodiments of the technology described herein. As shown in FIG. 1B, data processing system 120 includes a workflow management system (WMS) 130. In turn, the workflow management system 130 includes, among other components: (1) configuration module 131; (2) workflow execution engine 133; and (3) data layer 140, which stores data objects 142.

Workflow management system 130 is configured to perform various functions related to instantiating and managing workflows for making changes to the data objects 142. In some embodiments, the WMS 130 is configured to manage, concurrently, multiple workflows for making changes to respective ones of data objects 142. To this end, the WMS 130 may be configured to instantiate, for any one data object, a respective finite state machine for managing a workflow for making changes to that data object. In this way, when the WMS 130 is managing workflows for making changes to N different data objects (of data objects 142), the WMS 130 is using N respective finite state machine instances to do so (where N is an integer greater than one). As such, the WMS 130 may be configured to persist information about N finite state machines in the memory of the data processing system 120.

A data processing system 120, in some embodiments, may be configured to manage thousands, tens of thousands, hundreds of thousands, millions, tens of millions or even hundreds of millions of data objects. In turn, the WMS 130 may be configured to instantiate and persist finite state machines for any suitable number of these data objects as appropriate. For example, the WMS 130 may be configured to persist hundreds, thousands, tens of thousands, hundreds of thousands, millions, tens of millions or even hundreds of millions of finite state machine instances to manage change workflows for the respective data objects.

In some embodiments, to avoid synchronization issues that occur in conventional workflow management systems, the WMS 130 may be the only system through which changes to data objects 142 may be made. Accordingly, in some embodiments, changes to at least some of the data objects 142 may be made only through the actions permitted by the FSMs for managing change workflows for those objects. Moreover, the actions may be performed by only those actors that are authorized by the WMS 130 to perform them. In this way, the WMS 130 may provide the only interface through which changes to at least some of data objects 142 may be implemented, in some embodiments. To this end, the WMS 130 may generate GUIs for performing only those actions that are permitted by the workflow and may present them to only those actors that are authorized to perform them; other mechanisms of access to the data objects (e.g., via integration web services) may be blocked by the WMS 130.

In the illustrated embodiment of FIG. 1B, the WMS 130 has access to any data stored in the data layer 140. For example, the WMS 130 may have access (e.g., direct access) to the memory or memories in which the data in data layer 140 are stored.

For example, the WMS 130 has access to the data objects 142 persisted in data layer 140. For example, workflow management system 130 has access to any data stored within any of the data objects 142 including, by way of example, the current value of any attribute of any one of data objects 142. Examples of data object attributes are provided herein and include, but are not limited to, attributes whose values, for a particular data object, identify one or more groups (e.g., hierarchies of data objects, groups of objects having a same classification, or any other suitable groups of data objects) to which the particular data object belongs.

As another example, the WMS 130 has access to metadata about the data objects 142. In some embodiments, the WMS 130 has access to metadata specifying relationships among at least some of the data objects 142. For example, in some embodiments, at least some of the data objects 142 may be organized into one or more hierarchies, and the WMS 130 may access metadata specifying the one or more hierarchies. In this way, the WMS 130 may identify, for a particular data object, one or more other data objects related to the particular data object according to a hierarchy. For example, the WMS 130 may identify, for a particular data object, one or more of its ancestors (e.g., parent data object(s), grandparent data object(s), etc.), one or more of its descendants (e.g., one or more child or grandchild data objects), and/or one or more of its sibling data objects (e.g., data objects sharing at least one common ancestor with the particular data object) in the hierarchy.

As part of managing a workflow for a particular data object using a finite state machine, the WMS 130 may be configured to identify actors allowed to perform various tasks in the workflow. In some embodiments, the WMS 130 may be configured to identify the actors, dynamically, based on the current values of the particular data object's attributes. For example, when the FSM for (managing a workflow for) a first data object is in a first state of the FSM (e.g., state 306 of FSM 300 shown in FIG. 3A), the WMS 130 may dynamically identify, based on the current value(s) of the first object's attribute(s) and from among potential workflow actors 139, the actor(s) authorized to perform a workflow task (e.g., to approve or reject a proposed change to the first data object).

For example, to identify one or more actors authorized to perform a workflow task for a first data object, the WMS 130 may: (1) determine the current value for the first data object's attribute that indicates the hierarchy or hierarchies to which the first data object belongs; (2) identify a second data object in the hierarchy related to the first data object (e.g., the second object may be an ancestor, a descendant or a sibling of the first data object); (3) identify an actor or actors authorized to perform the same workflow task for the second data object; and (4) identify these actor(s) as ones also authorized to perform the same workflow task for the first data object. In this example, the WMS 130 identifies an actor to perform a workflow task for the first data object based on both: (1) a current value of the data first object's attribute that indicates a hierarchy to which data object belongs; and (2) metadata specifying the hierarchy of data objects so that the second data object (and its associated actors for the workflow task) may be identified. The integration of the WMS 130 into data processing system 120 is what enables the WMS 130 to access up-to-date values of these data and use these values to authorize actors to perform various workflow tasks on a per data object level. Aspects of this example are described further herein including with reference to FIGS. 1D-1G.

As another example, to identify one or more actors authorized to perform a workflow task for a first data object, the WMS 130 may: (1) determine the current value for the first data object's attribute that indicates a classification of the first data object; (2) identify a group of data objects to which the first data object belongs based on the current value (e.g., the group of data objects having the same classification); (3) identify an actor or actors authorized to perform the same workflow task for the identified group; and (4) identify these actor(s) as ones also authorized to perform the same workflow task for the first data object. In this example too, the WMS 130 identifies an actor to perform a workflow task for the first data object based on both: (1) a current value of the data first object's attribute that indicates a group of objects to which data object belongs; and (2) metadata specifying a relationship among data objects by specifying an assignment of actors to a group of data objects in the data objects 142. As with the foregoing example, the integration of the WMS 130 into data processing system 120 is what enables the WMS 130 to access up-to-date values of these data and use these values to authorize actors to perform various workflow tasks on a per data object level. Aspects of this example are described further herein including with reference to FIGS. 1H and 1I.

As can be appreciated from the foregoing examples, the workflow management system 130 is tightly coupled to the data objects 142 in the data processing system 120. On the one hand, this enables the WMS 130 to manage workflows for making changes to the data objects. On the other hand, because the WMS dynamically accesses current values of the data objects, any changes to the data objects can change the workflows being managed by the WMS. For example, as explained in the foregoing examples, changes to the data objects may alter the state of the corresponding FSM and may impact which actors are allowed to perform workflow tasks.

By developing a workflow management system that manages workflows through finite state machines, the inventors have enabled a broad class of users to configure the workflow management system. Indeed, configuring a finite state machine (e.g., by specifying its states and transitions) does not require writing low-level software and does not require a software developer (unlike the situation in the conventional approach illustrated in FIG. 1A). In the example of FIG. 1B, a business user 138 may specify finite state machines and their parameters through the configuration module 131, which may be configured to present the business user 138 with one or more interfaces (e.g., graphical user interfaces) through which the business user may specify finite state machines and any related information. Non-limiting examples of the information that a business user 138 may input through configuration module 131 are shown in FIGS. 9A-9D and 10.

As shown in FIG. 1B, workflow management system 130 includes workflow execution engine 133, which may be configured to instantiate and manage the instances of finite state machines for managing workflows for respective ones of data objects 142. For example, workflow execution engine 133 may be configured to generate one or more FSM instances using one or more FSM specifications (e.g., stored in FSM specifications module 132 shown in FIG. 1C). As another example, workflow execution engine 133 may be configured to update information associated with an FSM instance, for instance, by updating the current state of the FSM (e.g., the current workflow state of the workflow that the FSM instance represents). As another example, workflow execution engine 133 may be configured to delete an FSM instance after the completion of the workflow that the FSM instance represents (e.g., when the current state of the FSM is a terminal state). The workflow execution engine 133 may manage FSM instances in memory of the data processing system 120 in any suitable way using any suitable data structure(s), as aspects of the technology described herein are not limited in this respect.

As shown in FIG. 1B, data layer 140 stores data objects 142. The data layer may store any data of data objects 142 including, but not limited to, values of attributes of data objects 142. The data layer 140 may comprise one or multiple data stores to store the data objects 142. Each data store may include one or multiple storage devices storing data in one or more formats of any suitable type. For example, the storage device(s) part of a data store may store data using one or more database tables, spreadsheet files, flat text files, and/or files in any other suitable format (e.g., a native format of a mainframe). The storage device(s) may be of any suitable type and may include one or more servers, one or more database systems, one or more portable storage devices, one or more nonvolatile storage devices, one or more volatile storage devices, and/or any other device(s) configured to store data electronically. In embodiments where a data store includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks of any suitable type, as aspects of the technology described herein are not limited in this respect.

In some embodiments, data layer 140 may store additional types of data including, but not limited to, metadata specifying relationships among the data objects 142 and information for facilitating searching among the data objects 142 (e.g., a search index maintained for the data objects 142), as also described in connection with FIG. 1C.

Figure 1C:
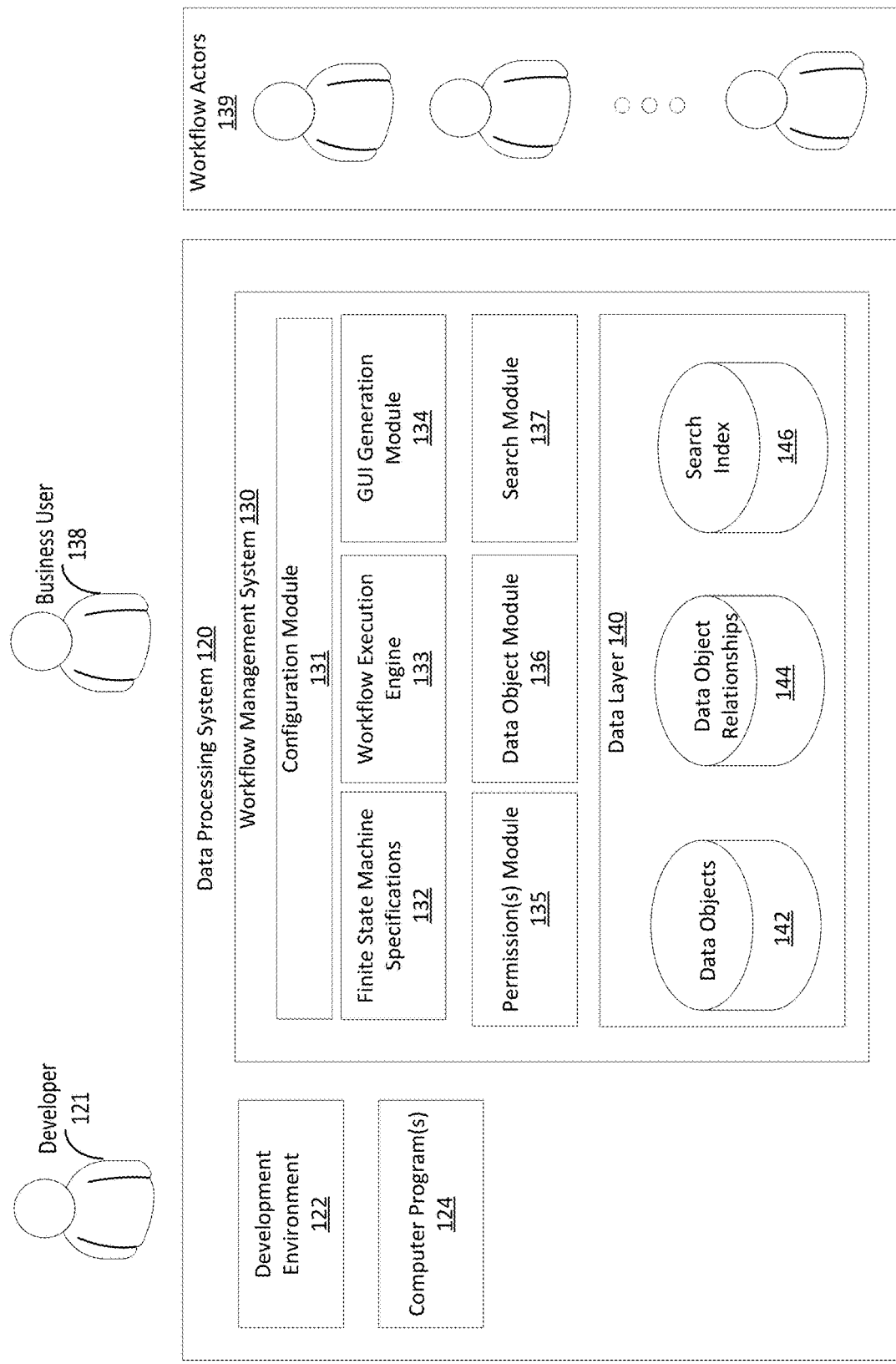
FIG. 1C is a block diagram of an illustrative embodiment of the data processing system 120 shown in FIG. 1B, in accordance with some embodiments of the technology described herein.

FIG. 1C is a block diagram of an illustrative embodiment of the data processing system 120 shown in FIG. 1B, in accordance with some embodiments of the technology described herein. FIG. 1C shows an embodiment of data processing system 120 that contains some of the same components shown in FIG. 1B (e.g., workflow management system 130, configuration module 131, workflow execution engine 133, data layer 140, and data objects 142), but also shows additional components which are not shown in FIG. 1B. It should be appreciated that the embodiment of FIG. 1C is illustrative and that, in other embodiments, data processing system 120 may include one or more other components in addition to or instead of the components shown in FIG. 1C.

As shown in FIG. 1C, data processing system 120 includes one or multiple computer programs 124 configured to operate on data in data layer 140. The computer programs 124 may be of any suitable type and written in any suitable programming language(s). For example, in some embodiments, computer programs 124 may include one or more computer programs written at least in part using the structured query language (SQL) and configured to access data in one or more data stores part of data layer 140. As another example, in some embodiments, data processing system 120 is configured to execute programs in the form of graphs and computer programs 124 may comprise one or more computer programs developed as dataflow graphs. A dataflow graph may include components, termed "nodes" or "vertices," representing data processing operations to be performed on input data and links between the components representing flows of data. Techniques for executing computations encoded by dataflow graphs are described in U.S. Pat. No. 5,966,072, titled "Executing Computations Expressed as Graphs," which is incorporated by reference herein in its entirety.

In the illustrated embodiment of FIG. 1C, data processing system 120 further includes development environment 122 that may be used by a person (e.g., software developer 121) to develop one or more of computer programs 124 for operating on data in data layer 140. An environment for developing computer programs as data flow graphs is described in U.S. Pat. Pub. No.: 2007/0011668, titled "Managing Parameters for Graph-Based Applications," which is incorporated by reference herein in its entirety.

In some embodiments, one or more of computer programs 124 may be configured to perform any suitable operations on data in data layer 140. For example, one or more of computer programs 124 may be configured to access data from one or more sources, transform the accessed data (e.g., by changing data values, filtering data records, changing data formats, sorting the data, combining data from multiple sources, splitting data into multiple portions, and/or in any other suitable way), calculate one or more new values from accessed data, and/or write the data to one or multiple destinations.

In the illustrated embodiment of FIG. 1C, data layer 140 further includes metadata 144 specifying relationships among data objects 142, and information 146 for facilitating searching among the data objects 142. In some embodiments, metadata 144 may specify one or more hierarchies of data objects (in data objects 142). The hierarchies may be specified in any suitable way and using any suitable data structure(s), for example using one or more tree data structures, pointers, or in any other suitable way, as aspects of the technology described herein are not limited in this respect. In some embodiments, metadata 144 may specify one or more groups of objects, explicitly or implicitly. For example, in some embodiments, metadata 144 may specify a group of objects implicitly by specifying a common authorized actor to perform a workflow task for the data objects in the group. For example, metadata 144 may indicate that a particular actor is authorized to perform a particular workflow task for all data objects having the same value for a classification attribute. Such an assignment of an actor is an implicit grouping of objects having the same value for the classification attribute.

In some embodiments, information 146 for facilitating search among data objects 142 may include one or more search indices. The search index may be implemented as a suffix tree, an inverted index, a citation index, an N-gram index, a document-term matrix, or in any other suitable way, as aspects of the technology described herein are not limited in this respect.

In the illustrated embodiment of FIG. 1C, workflow management system 130 also includes the following components: finite state machine specifications 132, GUI generation module 134, permissions module 135, data object module 136, and search module 137.

In some embodiments, the finite state machine specifications 132 may include one or more FSM specifications. The FSM specification 132 may be stored in data layer 140, in some embodiments, or in any other component of data processing system 120, as aspects of the technology described herein are not limited in this respect. In some embodiments, an FSM specification may specify a set of states for the FSM and a set of state transitions. An FSM specification may be stored in any suitable format and using any suitable data structure(s), as aspects of the technology described herein are not limited in this respect. As described herein, the workflow execution engine may be configured to generate one or more FSM instances using one or more FSM specifications stored in FSM specifications module 132.

In some embodiments, GUI generation module 134 may be configured to generate graphical user interfaces through which actors may provide input in furtherance of performing one or more workflow tasks. For example, GUI generation module 134 may be configured to generate a GUI through which an actor authorized to make a decision (e.g., whether to reject or approve a pending change) may provide input indicating his or her decision. Additionally or alternatively, GUI generation module may be configured to generate a GUI indicating the current workflow state of a workflow for an object. Examples of such GUIs are provided herein.

It should be appreciated that the GUIs generated by GUI generation module 134 respect and enforce the editability rules defined by the workflow. For example, if there is no edit transition coming out of a workflow state, which means that the data object is not editable, the GUI generation module 134 will not generate an interface for any actor through which the data object may be edited. Moreover, the WMS 130 will block editing of the data object through any other mechanisms, such as integration web services, for example. (The notion of editability being driven by workflow, as implemented in the systems described herein, is not present in conventional workflow systems, such as those based on BPMN).

In some embodiments, permissions module 135 may be configured to identify one or more actors authorized to perform one or more workflow tasks in one or more workflows. The permissions module 135 may identify such actors using any of the techniques described herein. For example, permissions module 135 may: (1) determine one or more current attribute values of a data object in data store 140 by accessing the current attribute value(s) in data layer 140; (2) access metadata 144 specifying relationships among data objects (e.g., specifying a hierarchy of objects, specifying a group of objects sharing a common classification, etc.); and (3) identify one or more actor(s) authorized to perform a workflow task using both of types of information.

In some embodiments, data object module 136 may be configured to manage data objects 142. For example, the data object module 136 may be configured to access, modify, and/or store data objects 142 and any associated information. For example, the data object module 136 may be used to access values of attributes of data objects stored in data layer 140. As another example, the data object module 136 may be used to access metadata 144 specifying relationships among data objects (e.g., information specifying the structure of a hierarchy of data objects).

In some embodiments, data objects may be versioned. For example, after a change is made to a data object, the modified data object may be associated with a new version number, and the previous version of the data object may be stored. In some embodiments, the data object module 136 may be configured to manage versions of data objects and may be configured to provide access to one or more older versions of a data object along with information specifying the changes to and/or differences among the data object versions. Versioning of data objects is enabled by managing workflows on a per data object basis (e.g., by using a respective finite state machine instance to manage a workflow for each data object), as described herein. Indeed, enabling management of data object versioning is a key benefit of managing workflows on a per data object basis.

In some embodiments, a finite state machine for managing a workflow for a data object may be "versioned" in that, when the workflow results in a change being made to a data object, the modified data object is stored as a new version of the data object, and the previous version of the data object is persisted. In some embodiments, a finite state machine for managing a workflow for a data object may be "unversioned" in that, when the workflow results in a change being made to a data object, the modified data object is stored and the previous version of the data object is not persisted.

In some embodiments, search module 137 may provide a programmatic interface (e.g., an API) and/or a user interface (e.g., a GUI) for searching for data objects among data objects 142 in data layer 140. In some embodiments, the search module 137 may utilize search index to perform a search. In some embodiments, the search module 137 may update and/or recalculate the search index to optimize future searches (e.g., in response to the addition of new data objects, deletion of data objects, and/or modification of data objects in the data layer 140).

Figure 1D:
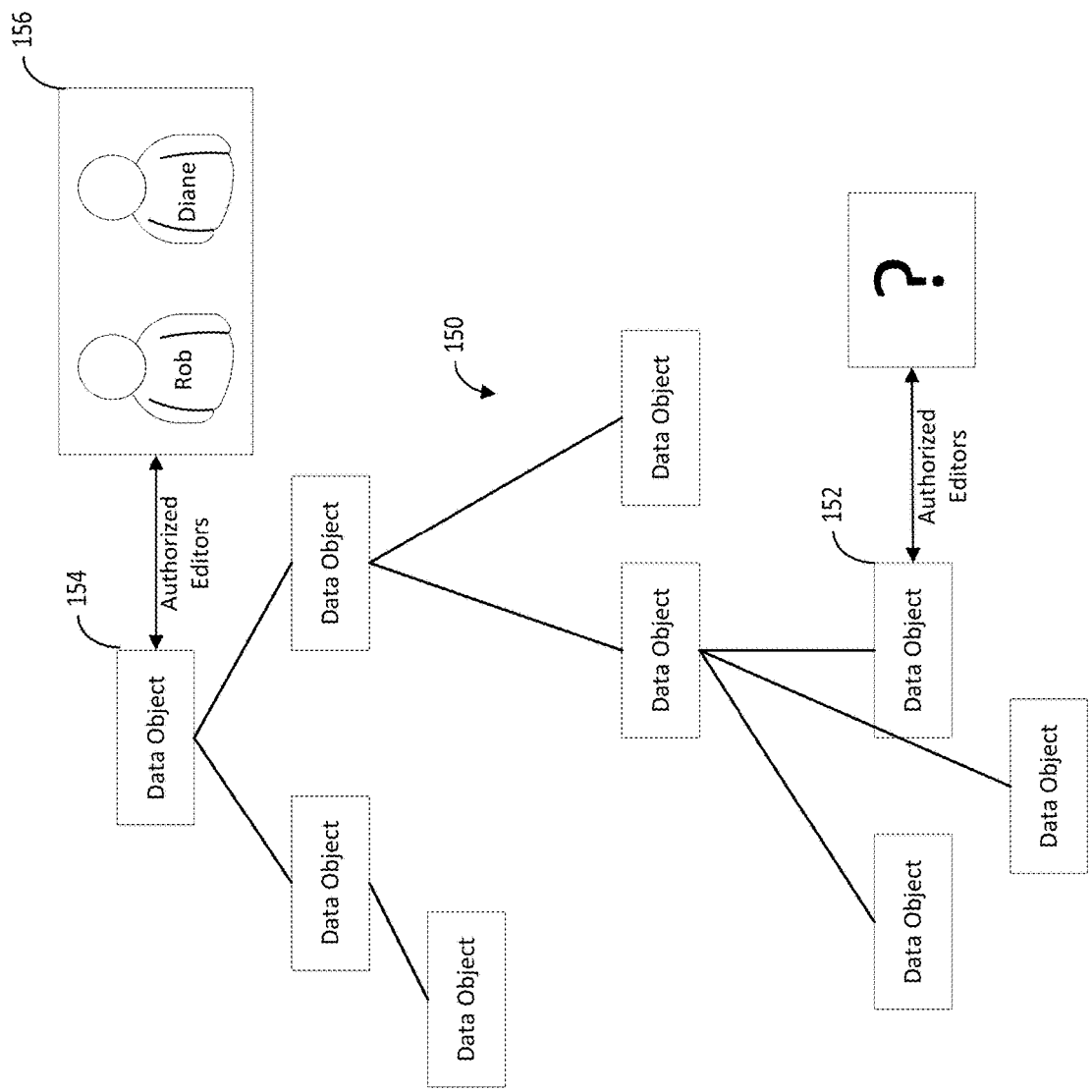
FIGS. 1D-1E illustrate an example of identifying an actor authorized to perform a workflow task for a data object using information about the hierarchy of data objects to which the data object belongs, in accordance with some embodiments of the technology described herein.
Figure 1E:
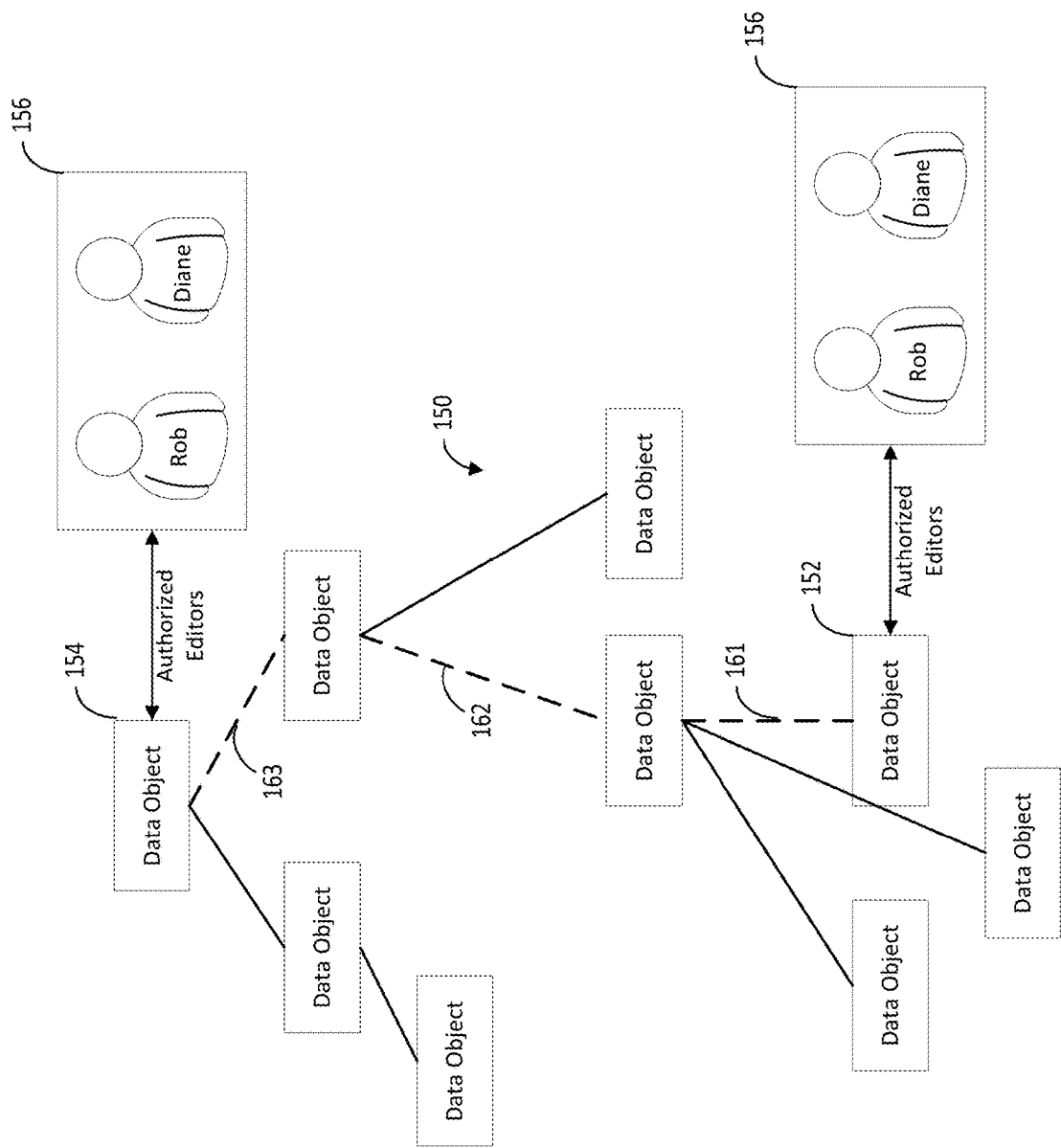

FIGS. 1D-1E illustrate an example of identifying an actor authorized to perform a workflow task for a data object using information about the hierarchy of data objects to which the data object belongs, in accordance with some embodiments of the technology described herein. FIG. 1D shows a hierarchy of data objects 150 in which data object 152 is a descendant of data object 154. In this example, suppose the finite state machine for managing the change workflow for data object 152 enters a state in which the workflow management system 130 has to identify any actor(s) authorized to edit the data object 152. (Such a situation may arise, for example, when FSM 300 enters state 304 or when FSM 400 enters state 402). In this example, to identify the authorized actor(s), the WMS 130 uses the hierarchy 150 to identify an ancestor of object 152 for which there are authorized editors. As shown in FIG. 1D, authorized editors 156 (Rob and Diane) are authorized to edit data object 154, which is an ancestor of data object 152.

As shown in FIG. 1E, the WMS 130 traverses the hierarchy 150 via links 161, 162, and 163 in search of an ancestor of data object 152 that is associated with authorized editors. The WMS 130 then identifies actors authorized to edit the ancestor data object as actors also authorized to edit data object 152. In this example, the first such object is data object 154 and, as shown in FIG. 1E, the WMS 130 assigns the actors 156 as actors authorized to edit data object 152. In this way, the hierarchy 150 enables authorized actors for data object 152 to be inherited from one of its ancestors.

Accordingly, in some embodiments, one or more actors authorized to perform a particular workflow task for a data object may be inherited from an ancestor of the data object in a hierarchy to which the data object belongs. In some embodiments, the ancestor object may be selected as the closest ancestor object to the data object in the hierarchy that also has one or more actors authorized to perform the same workflow task. Thus, if a parent object and a grandparent object of a particular data object each have associated actors, the actors of the parent object may be identified as the actors authorized to perform the same workflow task for the particular data object.

Figure 1F:
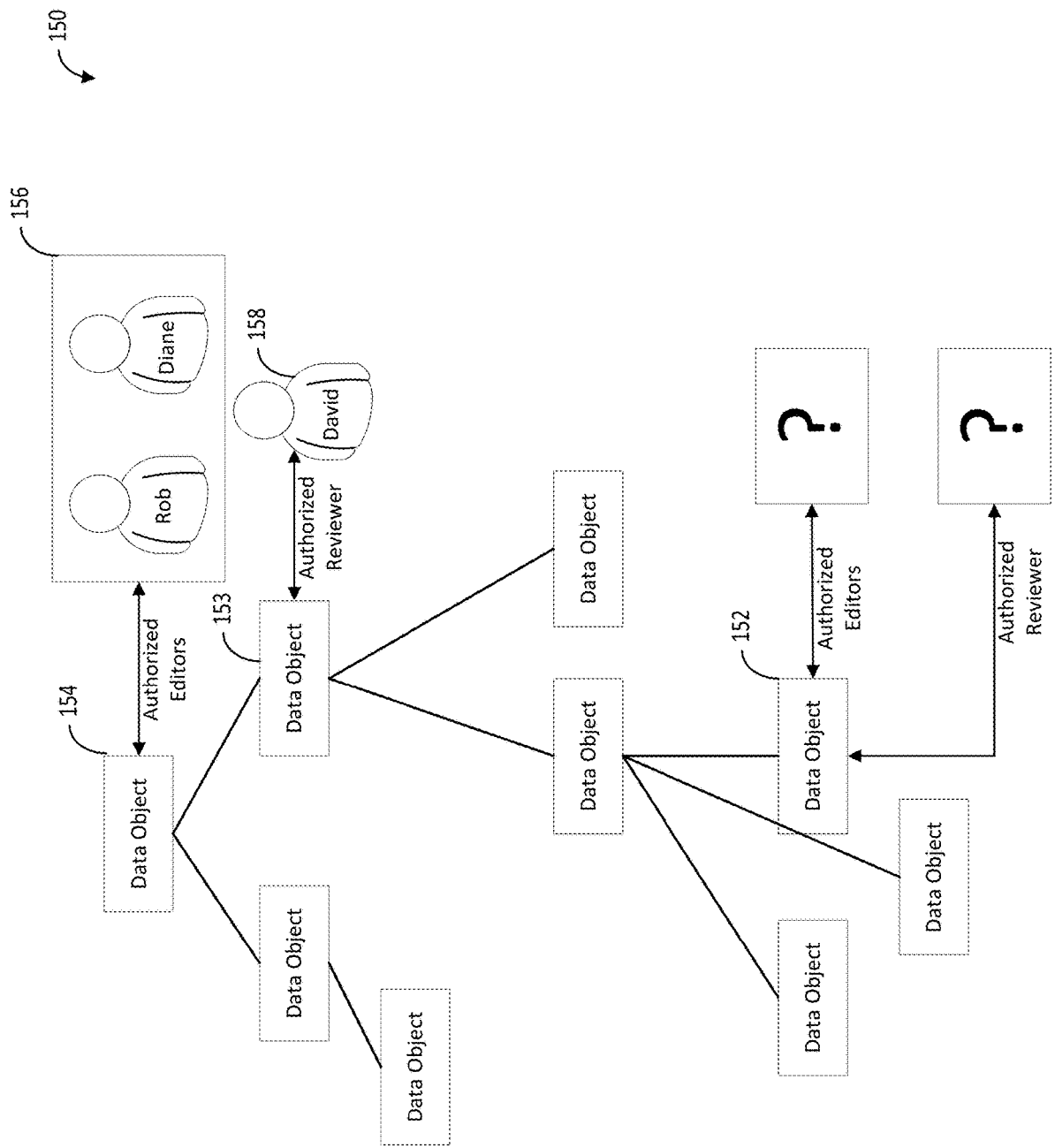
FIGS. 1F-1G illustrate an example of identifying actors authorized to perform workflow tasks for a data object using information about the hierarchy of data objects to which the data object belongs, in accordance with some embodiments of the technology described herein.
Figure 1G:
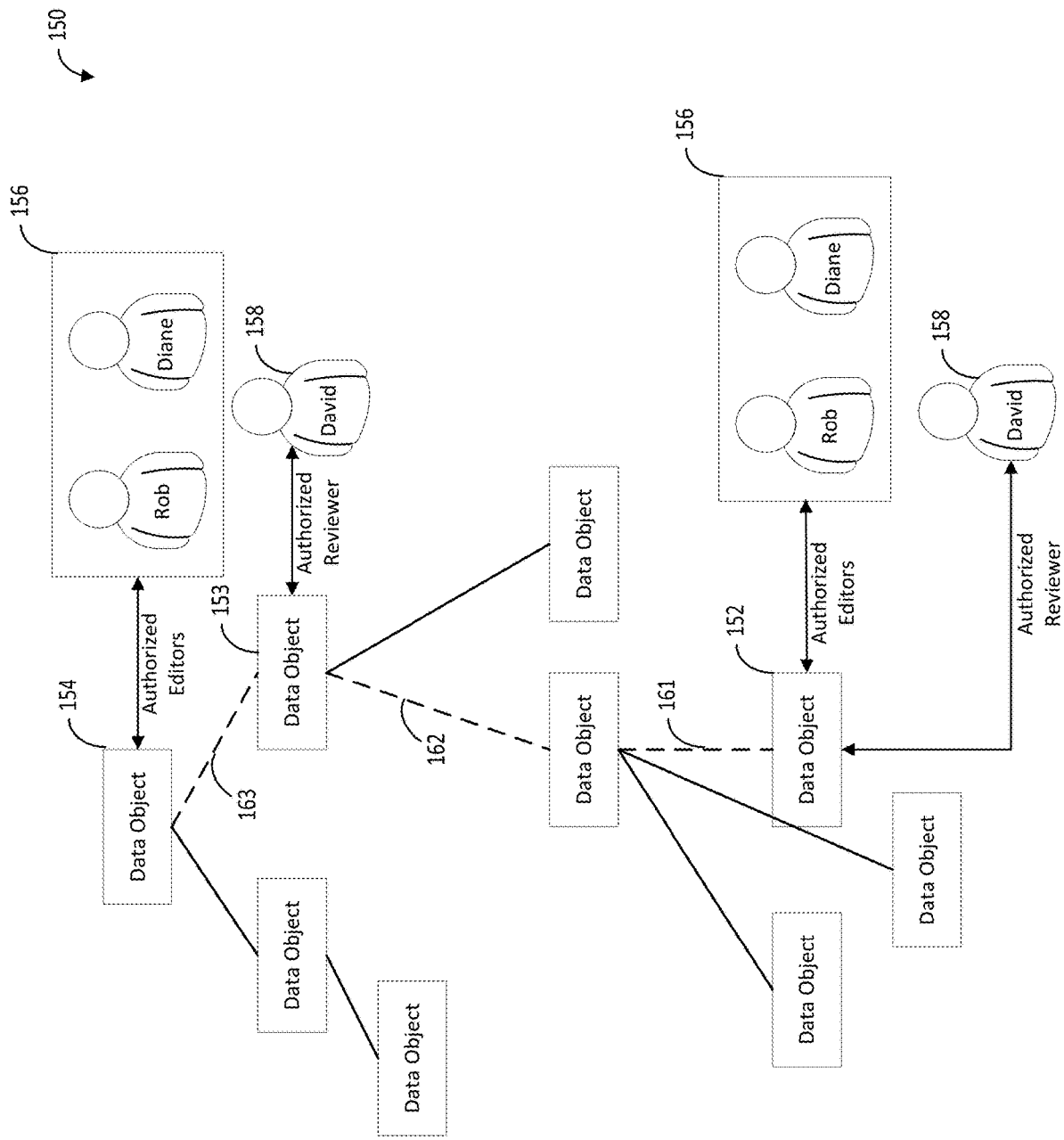

FIGS. 1F-1G illustrate another example of identifying actors authorized to perform workflow tasks for a data object using information about the hierarchy of data objects to which the data object belongs, in accordance with some embodiments of the technology described herein. This example illustrates how inheritance can be used to assign different actors for different workflow tasks (in the same workflow) by inheriting from different ancestor objects of the same data object 152. As shown in FIG. 1F, data object 152 has an ancestor data object 153 and an ancestor object 154 in the hierarchy 150. As in the previous example, the data object 154 is associated with actors 156 (Rob and Diane) authorized to edit the data object 154. The data object 153 is associated with actor 158 (David) who is authorized to review (and approve or reject) any changes made to the data object 153. As shown in FIG. 1F, the data object 152 is not yet associated with any actors authorized to edit the object ("authorized editor") or review any such edits ("authorized reviewer").

As shown in FIG. 1G, the WMS 130 may traverse the hierarchy 150 via links 161, 162, and 163 to identify both authorized editors and authorized reviewers for the data object 152. In this example, the WMS 130 identifies the actors 156 as actors authorized to edit data object 152 (e.g., by identifying the data object 154 as the closest data object to data object 152, in terms of number of links in the hierarchy 150, that is also associated with authorized actors). The WMS 130 also identifies the actor 158 as an actor authorized to review (e.g., accept or reject) any changes made to data object 152 (e.g., by one of actors 156). In this way, the workflow for making changes to data object 152 is defined in part by authorized actors for data objects (153 and 154) related to the data object 152 in the hierarchy 150. As can be appreciated from this example, actors for different tasks in the same workflow of a data object may be inherited from different ancestors of the data object.

The inheritance concept illustrated in FIGS. 1D, 1E, 1F, and 1G is powerful because a data processing system may manage thousands or millions of data objects, and it is not possible to manually specify authorized actors on a per-dataobject level. On the other hand, data objects managed by a data processing system are hierarchically related in many practical applications (e.g., the deployment of a business term glossary for a financial services company, data governance applications, etc.). The workflow management system developed by the inventors can leverage such hierarchical relationships to efficiently and dynamically identify actors authorized to perform various workflow tasks.

It should also be appreciated that this type of functionality is not possible to implement using conventional workflow management systems that are not integrated with the data processing system for whose data objects they are managing workflows. Such a conventional workflow management system would not have access to metadata specifying relationships among the data objects or, even if it were somehow provided this access, it would not be possible to keep such information synchronized between a conventional workflow management system and the data processing system.

As described herein, other types of relationships among data objects may be leveraged to identify actors authorized to perform various workflow tasks. For example, FIGS. 1H-1I illustrate an example of identifying an actor authorized to perform a workflow task for a data object using information about a group of data objects to which the data object belongs, in accordance with some embodiments of the technology described herein.

Figure 1H:
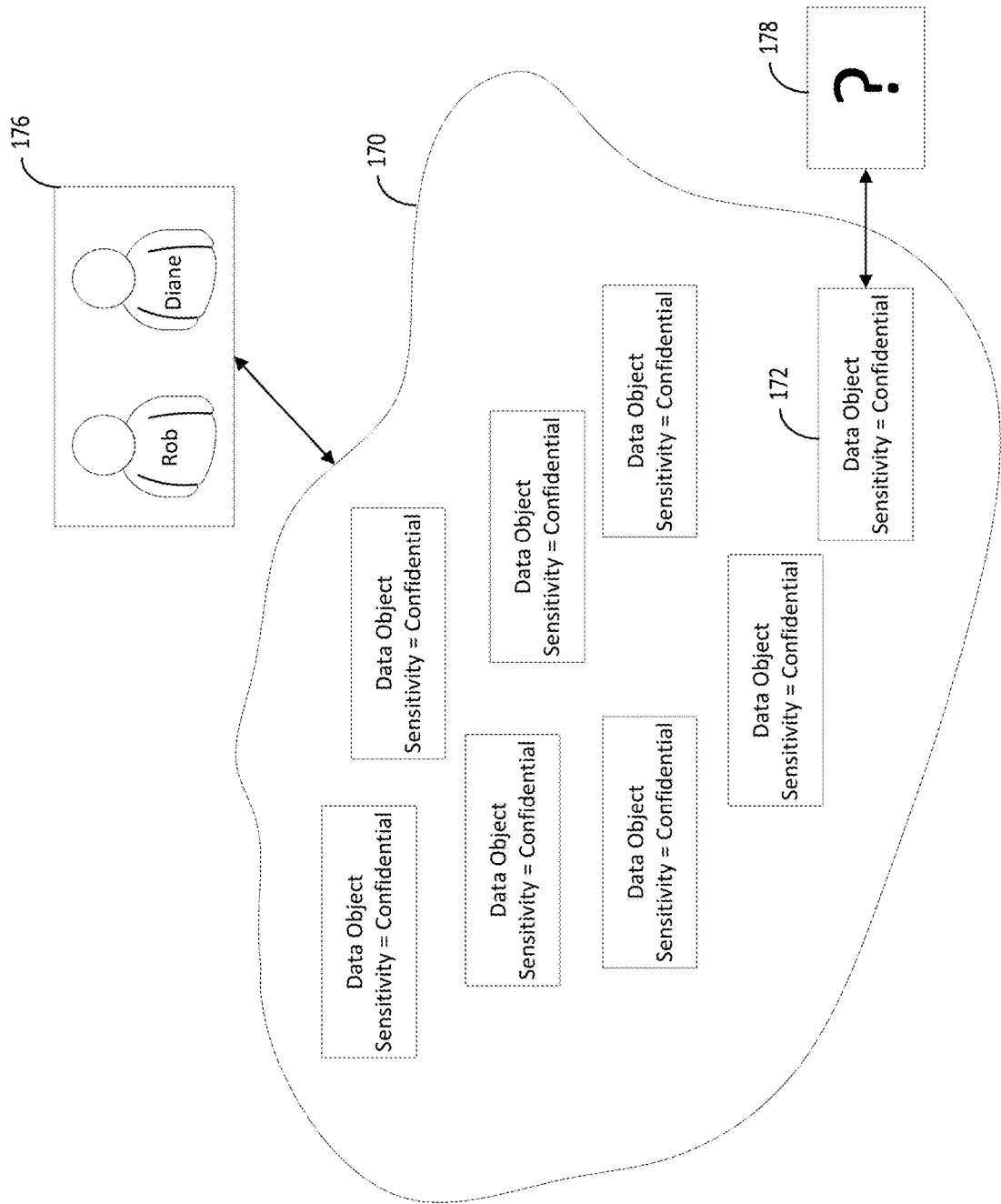
FIGS. 1H-1I illustrate an example of identifying an actor authorized to perform a workflow task for a data object using information about a group of data objects to which the data object belongs, in accordance with some embodiments of the technology described herein.
Figure 1I:
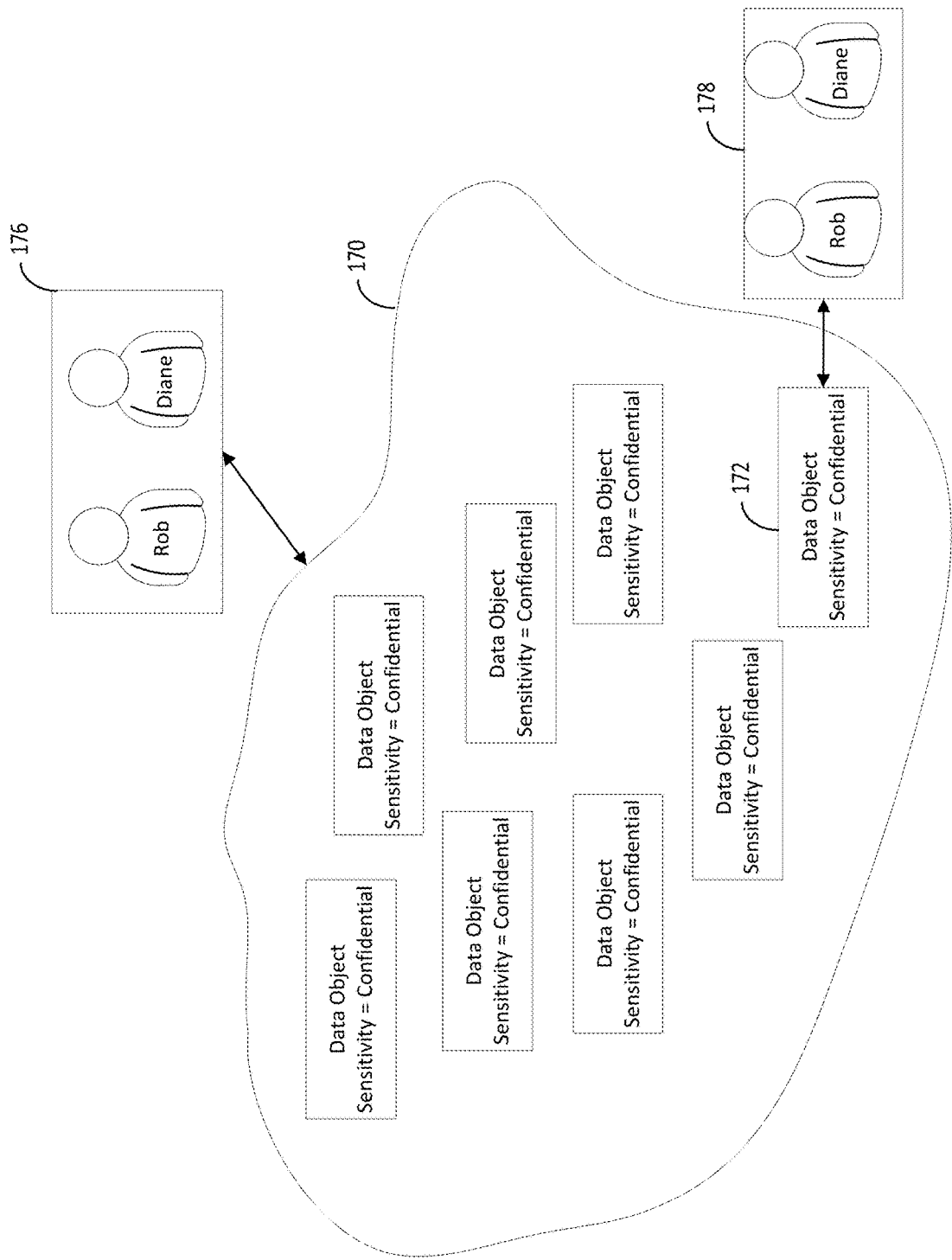

FIG. 1H illustrates that a data processing system may include multiple data objects, including data object 172, that share a common value ("Confidential" in this example) for the sensitivity classification attribute. The data objects having a common value for a specified attribute form a group 170 with which a set of actors 176 (Rob and Diane) is associated. In this example, the actors 176 may be authorized to review changes made to any data object in group 170. To identify an authorized reviewer for changes proposed to the data object 172, a workflow management system (e.g., WMS 130) may: (1) determine the current value of its sensitivity classification attribute by accessing the current value in the data store 140; (2) identify the group 170 as a group to which data object 170 belongs; and (3) identify actors 176 ones authorized to review changes for data object 172, as shown in FIG. 1I, because these actors are authorized to review changes for data objects in the group 170.

Illustrative Method

Figure 2:
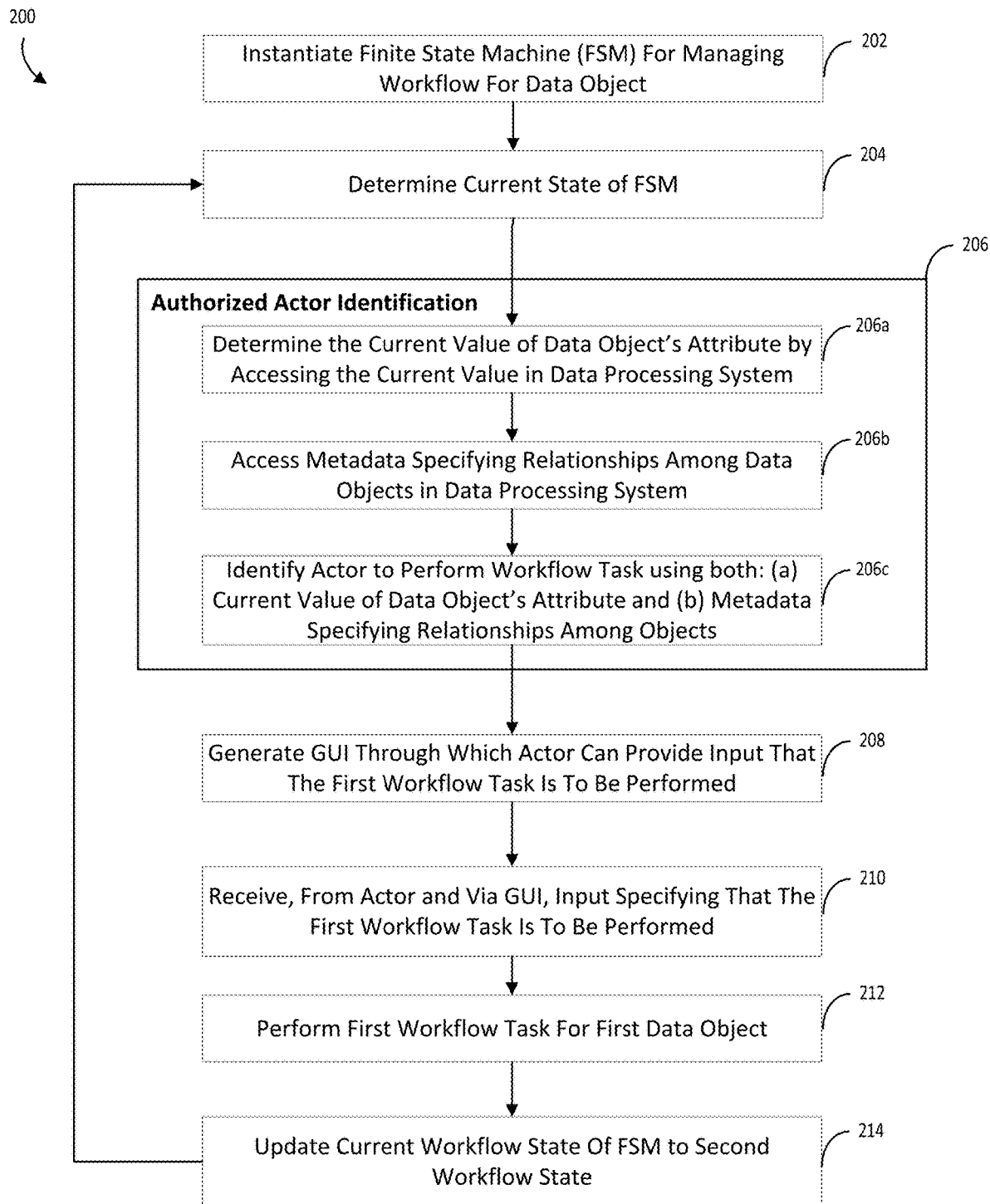
FIG. 2 is a flowchart of an illustrative process 200 for managing a workflow for a data object using a finite state machine, in accordance with some embodiments of the technology described herein.

FIG. 2 is a flowchart of an illustrative process 200 for managing a workflow for a data object using a finite state machine, in accordance with some embodiments of the technology described herein. Process 200 may be executed by any suitable data processing system and, for example, may be executed by data processing system 120 described with reference to FIG. 1B and FIG. 1C.

Process 200 begins at act 202, where a finite state machine for managing a workflow for a first data object is instantiated. In some embodiments, the FSM may be instantiated by: (1) accessing a specification for the FSM; (2) generating an instance of the FSM using the accessed specification; and (3) associated the generated instance of the FSM with the first data object.

In some embodiments, the specification for the FSM may be one of the FSM specifications 132 and may be stored in data layer 140 or in any other computer-readable storage medium (e.g., memory) accessible to the workflow management system 130. The FSM specification may be in any suitable format (e.g., a table, a configuration file, a text file, a structured data file, an XML file, etc.), as aspects of the technology described herein are not limited in this respect.

In some embodiments, the specification may specify the states of the FSM, and the transitions of the FSM. In some embodiments, the specification may specify one or more properties for each of the states (e.g., whether the state is a start state, a quiescent state, a final state, information specifying how a graphical representation of the state is to be rendered, etc.) and/or transitions of the FSM (e.g., the type of transition, information identifying one or more actors permitted to take an action in the workflow represented by the transition, etc.).

A finite state machine instance may be generated from the FSM specification in any suitable way, as aspects of the technology described herein are not limited in this respect. For example, one or more variables and/or objects representing the finite state machine may be instantiated using the information in the accessed specification. The FSM instance may be associated with the first data object in any suitable way, as aspects of the technology described herein are not limited in this respect.

Next, at act 204, the current state of the FSM is determined. This may be done in any suitable way, for example by checking the value of a variable indicating the current state. Upon instantiation, the finite state machine enters into a starting state. That is, the current state of the finite state machine may be its starting state (or a state to which the FSM transitions automatically without user input from its starting state, as the case may be during imports). After one or more actions are taken, the state of the finite state machine may be updated to reflect a new state, for example, as described below with reference to act 214.

Next, at act 206, an actor authorized to perform a workflow task for the first data object is identified. In some embodiments, the workflow task may be associated with an action that may be taken from the current workflow task identified at act 204. In some embodiments, the actor may be identified using the current value of an attribute of the first data object. For example, in the illustrated embodiment of FIG. 2, an actor is identified by: (1) determining, at act 206a, the current value of the data object's attribute by accessing the current value of the attribute in the data processing system 120 (e.g., in data layer 140); (2) accessing, at act 206b, metadata (e.g., metadata 144) specifying relationships among data objects in the data processing system 120; and (3) identifying, at act 206c, an actor to perform the workflow task using both: (a) the current value (rather than some previously cached version) of the data object's attribute as determined at act 206a; and (b) the metadata accessed at act 206b.

As one example, the current value of the first data object's attribute may indicate a particular hierarchy of data objects to which the first data object belongs. The metadata may specify one or more other data objects in this hierarchy and the actor authorized to perform a workflow task may be identified as an actor already authorized to perform the same workflow task for a second data object in the hierarchy that is related to the first data object (e.g., as an ancestor, a descendant, or a sibling of the first data object).

As another example, the current value of the first data object's attribute may indicate a group of objects to which the first data object belongs (e.g., a group of objects sharing a common value for a particular attribute). The metadata may specify an actor authorized to perform a workflow task for any data object within the group, and the actor authorized to perform the workflow task for the first data object may be identified to be the actor authorized to perform the workflow task for the group. Examples of such attributes include, but are not limited to, classification attributes (e.g., a governance group classification, a sensitivity classification, a personally identifiable information classification, etc.) whose value indicates a classification for the data object, and the actor may be identified based on the value of the classification attribute.

Next, process 200 proceeds to act 208, where a graphical user interface is generated so that the actor, identified at act 206, can provide input through the GUI specifying that the first workflow task is to be performed. For example, with reference to the illustrative FSM of FIG. 3A, when the current workflow state for a data object is the draft state 304, act 208 may involve generating a GUI through which the actor identified at act 206 may provide input indicating the changes to the first data object are to be submitted. The generated GUI may be presented to the actor after the actor logs into the data processing system 120.

Next, at act 210, the actor may provide, via the GUI generated at act 208, input specifying that the first workflow task is to be performed. For example, the actor may provide input that changes to a data object are to be submitted by clicking a "submit" button in a GUI presented to the actor by the data processing system.

In response to receiving input specifying that the first workflow task is to be performed, the data processing system performs the first workflow task for the first data object at act 212 and the current workflow state of the FSM for the first data object is updated to a second workflow state at act 214. For example, in response to receiving input indicating that changes to the first data object are to be submitted at act 210, the data processing system may update the current state of the FSM from the "draft" state 304 to the "pending approval" state 306. After act 214 is performed, process 200 returns to act 204.

It should be appreciated that process 200 is illustrative and that there are variations. For example, actors authorized to perform actions corresponding to one or more workflow tasks may be identified prior to the start of process 200 since one or more attributes of one or more data objects may be known. On the other hand, if one or more data object attribute values changes during execution of process 200, actors authorized to perform actions with respect to the data object may be identified during execution of process 200.

Managing Workflows Using Finite State Machines

Figure 3A:
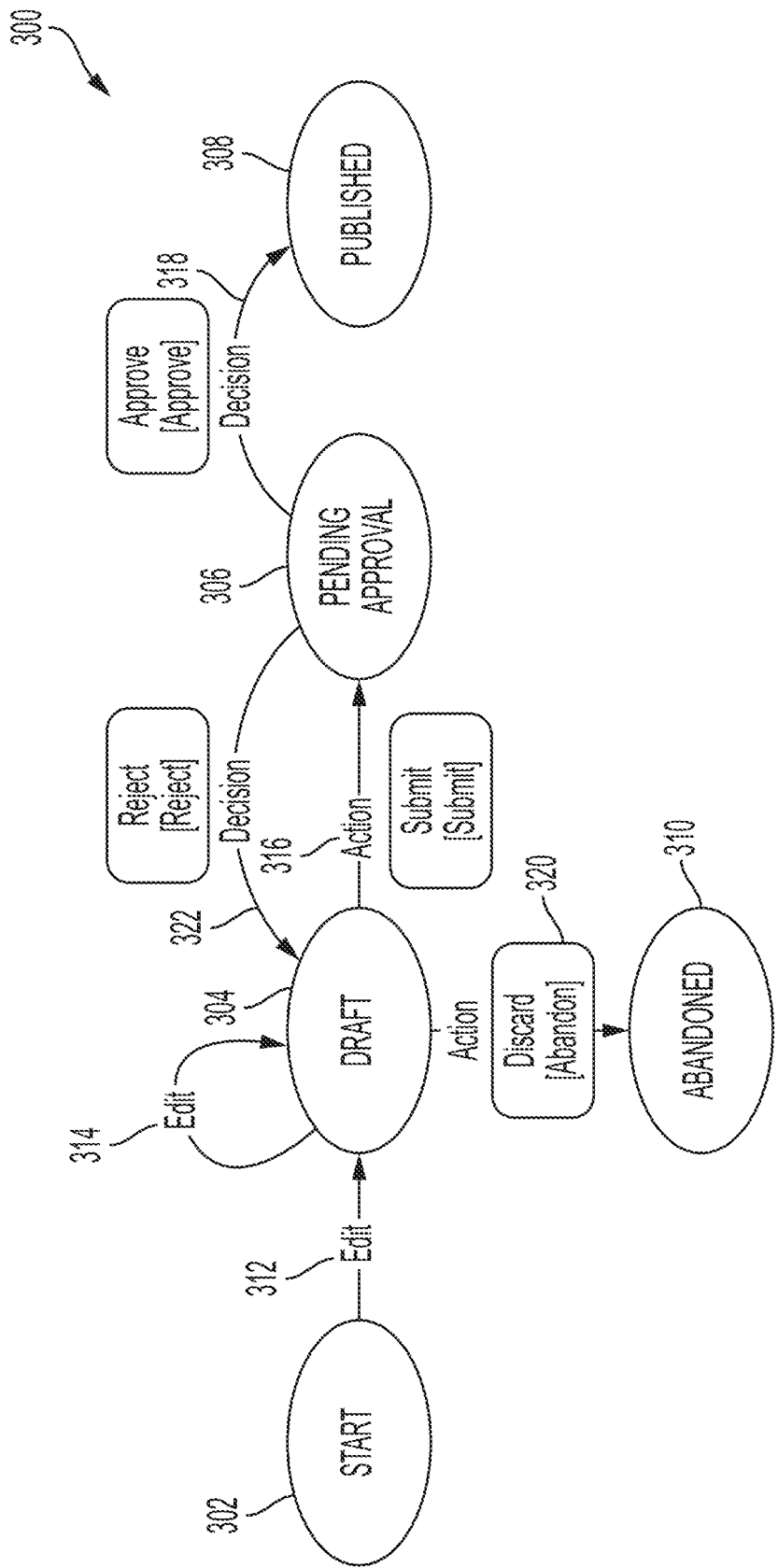
FIG. 3A is a diagram showing states and transitions of an illustrative finite state machine 300 for a workflow for managing changes to a data object, in accordance with some embodiments of the technology described herein.

FIG. 3A is a diagram showing states and transitions of an illustrative finite state machine 300 for a workflow for managing changes to a data object, in accordance with some embodiments of the technology described herein. For example, the FSM 300 may be used for managing changes to a business term data object, examples of which are provided herein. As another example, the FSM 300 may be used for managing changes to a document (e.g., an article, a text file, a blog post, etc.). In some embodiments, the specification for FSM 300 may be one of FSM specifications store 132 and FSM 300 may be instantiated using workflow execution engine 133.

As shown in FIG. 3A, finite state machine 300 includes five workflow states: the start state 302, the draft state 304, the pending approval state 306, the published state 308, and the abandoned state 310. The FSM 300 includes state transitions which control how a workflow, governed by the FSM 300 moves from one workflow state to another, and the operations (e.g., Submit, Abandon, Approve, etc.) that happen as a result. In the illustrative embodiment of FIG. 3A, there are two edit transitions (edit transition 312 from the start state 302 to the draft state 304, and edit transition 314 from the draft state 304 to itself), two Actor Action transitions (the submit transition 316 from state 304 to state 306, and the discard transition 320 from state 304 to state 310), and two decision transitions (the approve transition 318 from state 306 to state 308, and the rejection transition 322 from state 306 to state 304).

For example, when a document is created by an actor, an instance of finite state machine 300 may be generated for a workflow for managing changes to the document. The current state of the FSM 300 may be initialized to the start state 302. After an actor completes making changes to the document, the current workflow state may be updated from the start state 302 to the draft workflow state 304. When the current workflow state is state 304, and the actor edits the document, the current workflow state may stay as the draft state 304. When the current workflow state is state 304, the actor may submit the document for approval, in which case the current workflow state would be updated to be the pending approval state 306, or discard the document, in which case the current workflow state would be updated to the abandoned state 310. When the current state of the FSM for the document is the pending approval state 308, an approver (or a collection of approvers operating in accordance with a voting scheme, examples of which are described herein) may either: (1) reject the change to the document submitted by the actor, in which case the current state of FSM would be updated to the draft state 304; or (2) approve the change to the document submitted by the actor, in which case the current state of FSM would be updated to the published state 310.

As may be appreciated from the foregoing description, different actors may be authorized to perform different types of actions with respect to a data object. For example, with respect to FSM 300, an actor may be authorized to create a data object, make edits to the data object, discard the edits to the data object, and/or submit the edits for approval. On the other hand, a different actor or actors may be authorized to approve or reject the edits to the data object.

Accordingly, in some embodiments, a first set of one or more actors may be authorized to perform one or more workflow tasks corresponding to one workflow state (e.g., person A may be authorized to edit, submit an edit, or discard an edit to the document, when the current workflow state is the draft state 304) and a second set of one or more actors may be authorized to perform one or more workflow tasks corresponding to another workflow state (e.g., person B may be authorized to approve or reject an edit to the document, when the current workflow state is the pending approval state 306).

In some embodiments, finer-grained permissions are possible. For example, in some embodiments, each transition out of an FSM state may be associated with one or more respective authorized actors. For example, the approve and reject transitions may be associated with the same authorized actor (e.g., a single reviewer can either approve or reject the change) or different authorized actors (e.g., a reviewer may be authorized to unilaterally reject, but not approve a change, as approval from multiple approvers may be needed). Techniques for identifying actors to associate with one or state transitions are described herein.

In some embodiments, the current workflow state of the finite state machine 300 may be used to generate a user interface through which an actor can perform one or more workflow tasks. The user interface may be generated in response to the FSM entering the workflow state from which the task may be performed or after the FSM enters the workflow state and one or more other events occurs such as, for example, the actor logging into the system and requesting to view any pending workflow tasks.

For example, when the current workflow state for a document is in the edit state 304, an actor (e.g., "Abby A. Williams") may be authorized to submit changes for approval or discard the changes. Thus, in this example, the actor is authorized to take actions associated with the transitions 316 and 320 of FSM 300, and this information may be used by the data processing system (e.g., by GUI generation module 134 of data processing system 120) to generate a graphical user interface through which the actor may perform these authorized actions. An illustrative example of such a user interface is shown in FIG. 3C, which shows graphical user interface 380 generated and presented to actor 382 (Abby A. Williams in this example).

As shown in FIG. 3C, GUI 380 shows a list of tasks 384 that actor 382 may perform for various data objects. For example, GUI 380 shows that actor 382 may submit or discard changes for the "Book Balance" data object 386, and enables actor 382 to do so using buttons 387. Details of the changes, which are to be submitted or discarded, are shown in panel 388. Actions taken by other actors with respect to this or related objects are shown in panel 389.

Figure 3B:
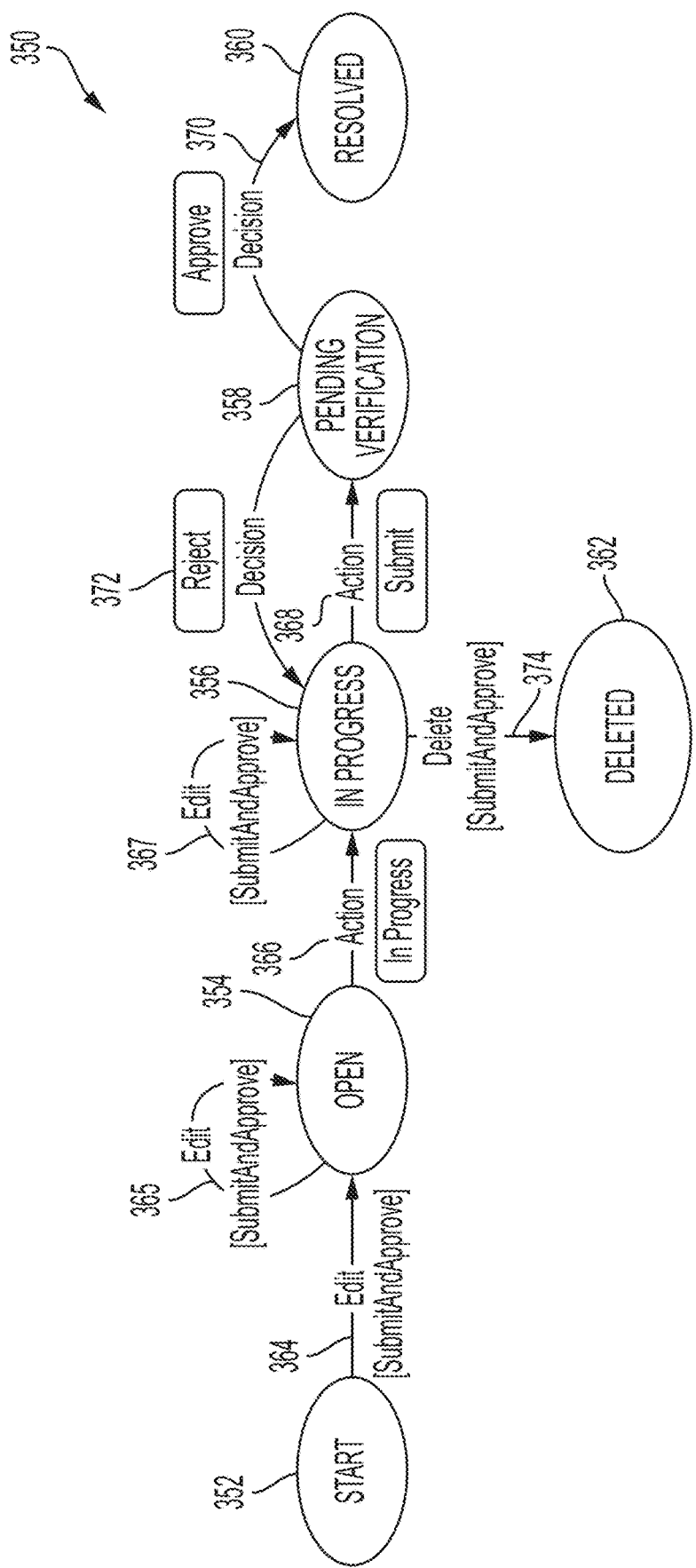
FIG. 3B is a diagram showing states and transitions of an illustrative finite state machine 350 for an issue management workflow, in accordance with some embodiments of the technology described herein.
Figure 3C:
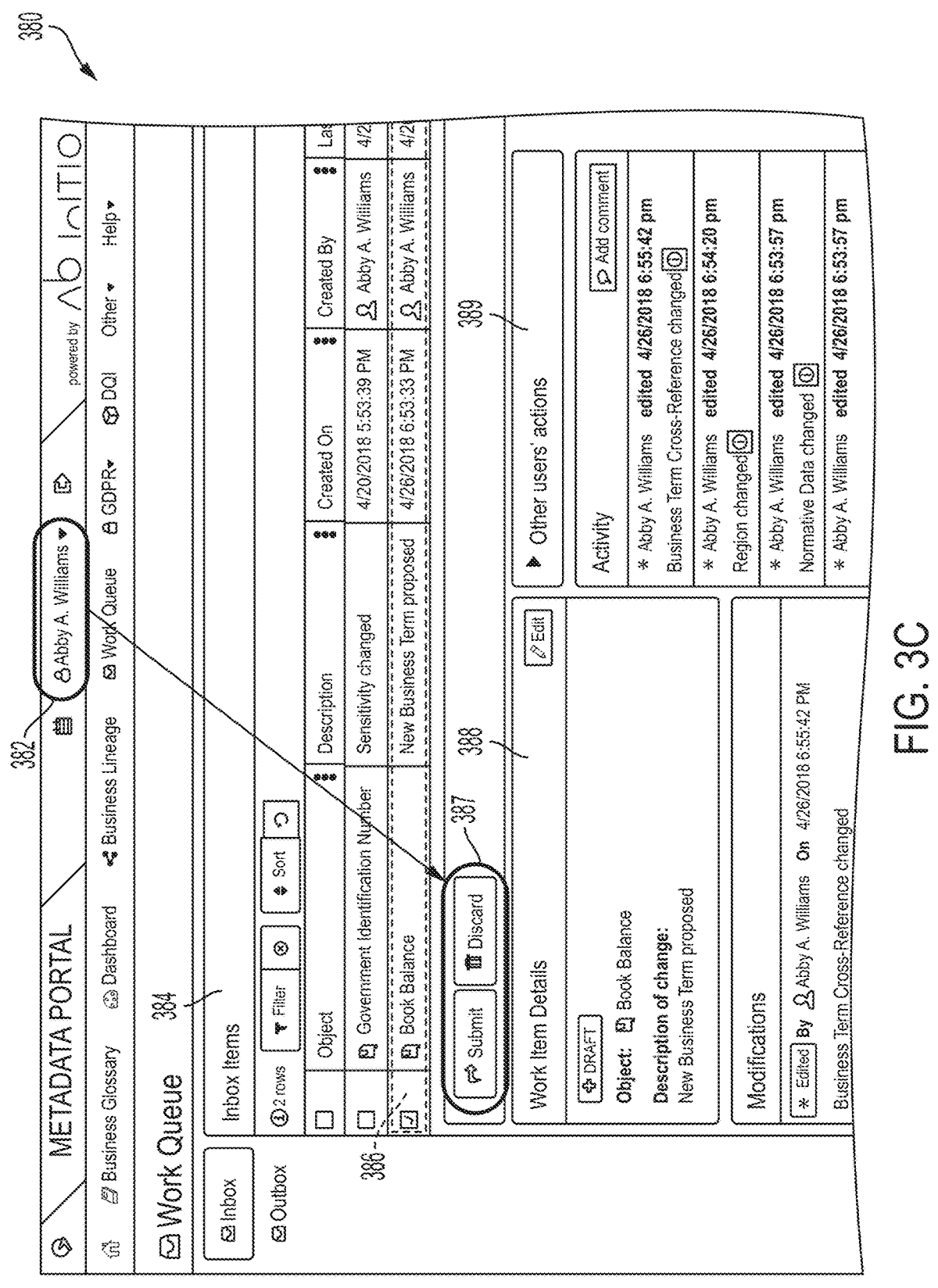
Figure 3D:
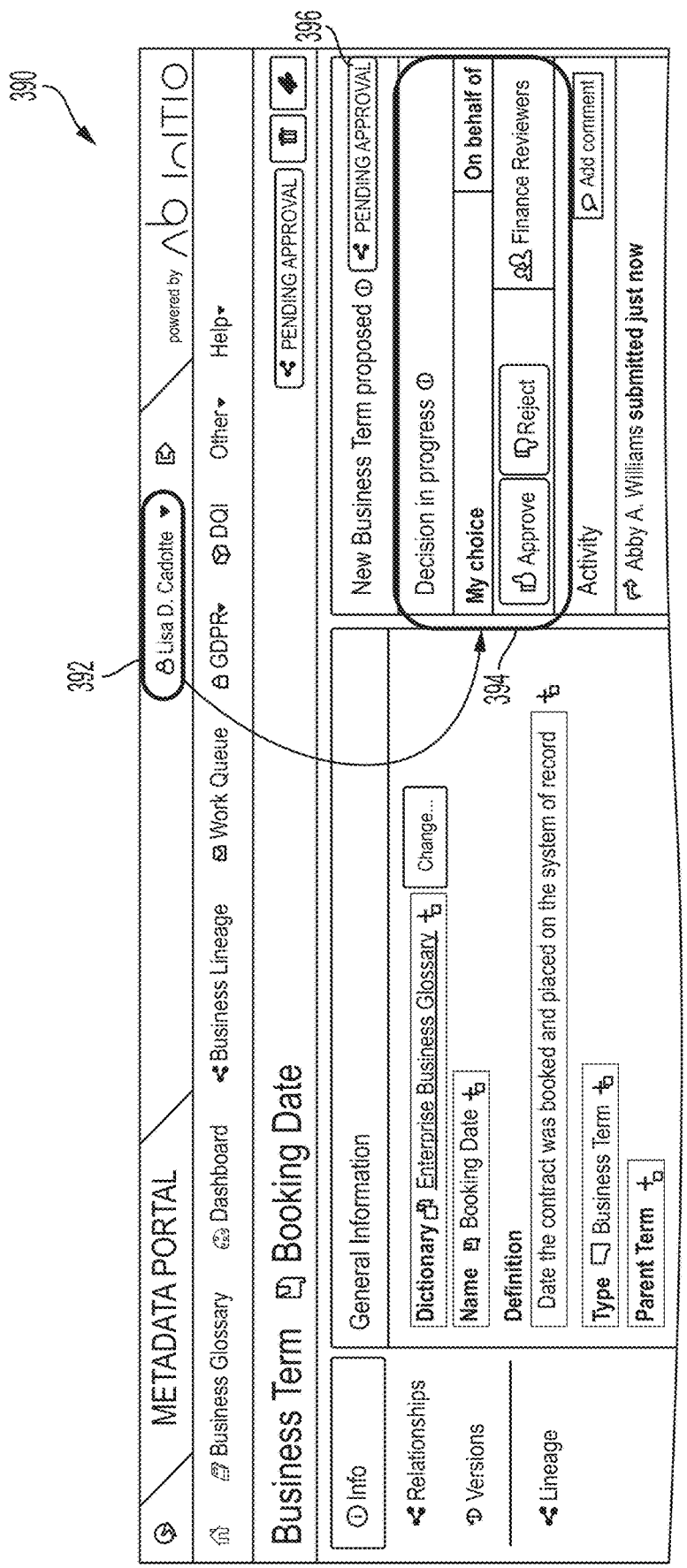
FIG. 3D is a diagram of another GUI 390 through which an actor can view and/or perform one or more workflow tasks for a data object, in accordance with some embodiments of the technology described herein.

Another example is shown in FIG. 3D, which shows an illustrative graphical user interface 390 generated for actor 392 ("Lisa D. Cadotte," in this example) when the FSM 300 is in the pending approval state 306, which is shown using GUI element 396. GUI 390 allows actor 392 to approve or reject the changes using voting buttons 394.

It should be appreciated that, in some embodiments, an instance of FSM 300 would be generated for managing a workflow for each data object. A single instance of FSM 300 would not be used to keep track of changes to multiple data objects (e.g., multiple documents), rather multiple instances of the FSM 300 would be used to do so, and a data processing system (e.g., system 120) would manage such instances (e.g., using workflow execution engine 130). However, in some embodiments, an FSM may be used for managing a workflow for multiple data objects, for example in the case of managing the process for importing multiple data objects to the data processing system, as described herein including with reference to FIGS. 6A and 6B.

Another example of a finite state machine for managing a workflow for a data object is shown in FIG. 3B, which shows a diagram of states and transitions of finite state machine 350 for an issue management workflow, in accordance with some embodiments of the technology described herein. FSM 350 may be used to manage workflow tasks relating to an issue, which may be represented by an issue data object, examples of which are provided herein. In some embodiments, the specification for FSM 350 may be stored in FSM specifications store 132 and FSM 350 may be instantiated using workflow execution engine 130.

As shown in FIG. 3B, finite state machine 350 includes six workflow states: the start state 352, the open state 354, the in progress state 356, the pending verification state 358, the resolved state 360, and the deleted state 362. The FSM 350 includes state transitions which control how an issue resolution workflow, governed by the FSM 350 moves from one workflow state to another, and the operations (e.g., Submit, Delete) that happen as a result. In the illustrative embodiment of FIG. 3B, FSM 350 includes transition 364 from state 352 to state 354, transition 365 from state 354 to itself, transition 366 from state 354 to state 356, transition 367 from state 356 to itself, transition 368 from state 356 to state 358, transition 370 from state 358 to state 360, transition 372 from state 358 to state 356, and transition 374 from state 356 to state 362.

In the illustrated example of FIG. 3B, for state transitions labeled with the caption "SubmitAndApprove", changes associated with such transitions (e.g., edits, deletions) are made automatically without further approval. For example, edits made to the issue data object while the FSM 350 is in the state 354 are made automatically, and the data processing system may commit the changes immediately.

As one illustrative example of how FSM 350 may be used, an instance of FSM may be generated for an issue data object upon its creation, and the current workflow state moves from the start state 352 to state 354. For example, the issue data object may indicate that there is an error in the content of another data object (e.g., a document, a business term data object, an actor's account number, an address, etc.). When the actor assigned to handling the issue clicks "In Progress" through an appropriate user interface (thereby indicating that the actor is starting to address the issue), the current workflow state moves from the open state 354 to the in progress state 356, at which point the actor can perform various actions such as edit the issue data object (the current workflow state would not change), delete the issue data object (the current workflow state would transition to state 362, and the instance of the workflow would end), or submit the issue data object for verification (the current workflow would transition to state 358, and would remain in this state until there is a decision). One more other actors may review the issue data object and determine whether the issue has been resolved (e.g., by determining that an error in the content of the other data object been addressed). In this case, the approval decision is based on whether the underlying issue has been resolved, not about whether edits have been made to the actual issue data object. If the issue is rejected (e.g., because additional steps are needed to address the issue, for example, by making further edits to a document), the current workflow state transitions to state 356, where the issue data object may be edited, resubmitted, or deleted. If the issue were approved, the current workflow state would transition to state 360, and the current workflow instance would end.

Figure 4A:
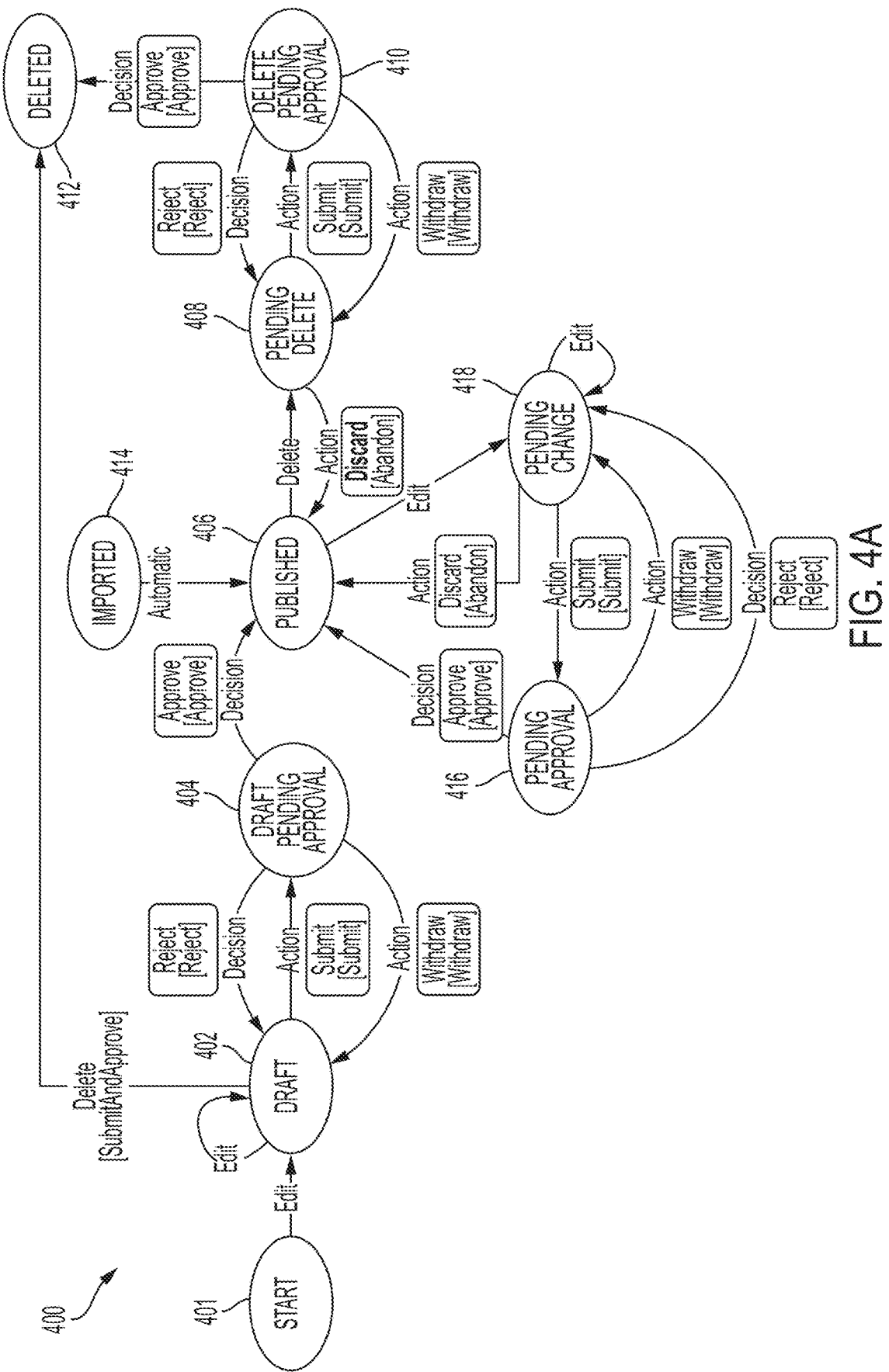
FIG. 4A is a diagram of an illustrative finite state machine 400 for creating and managing a business term data object, in accordance with some embodiments of the technology described herein.
Figure 4B:
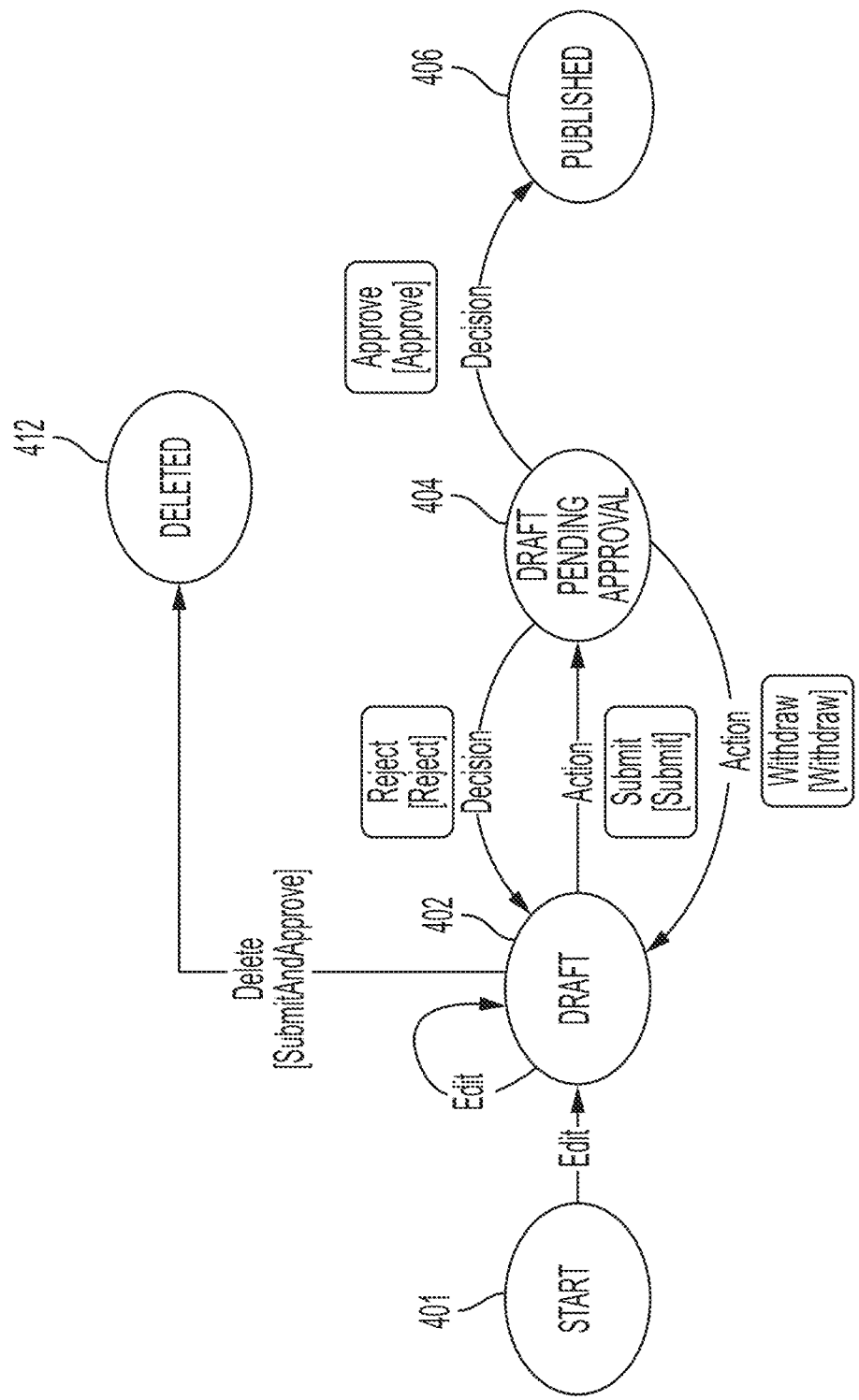
Figure 4D:
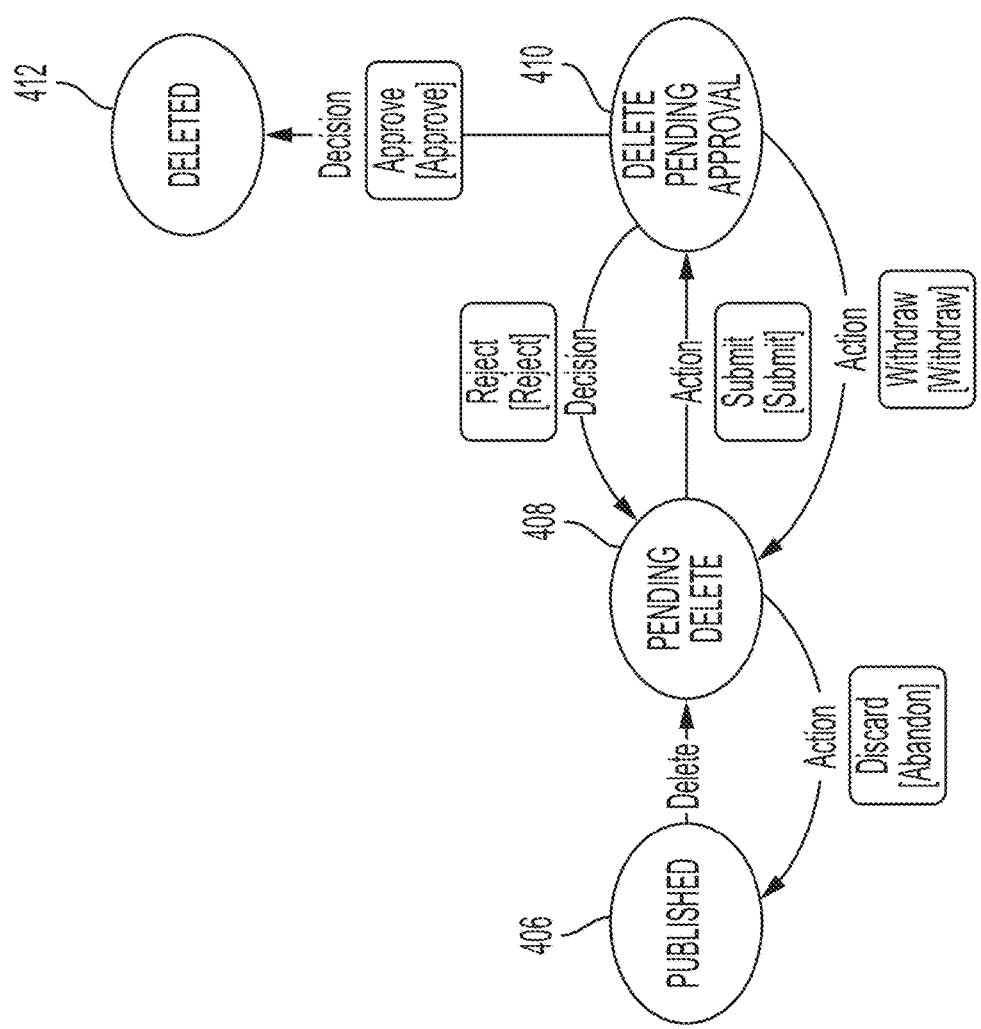

Another example of a finite state machine 400 for managing a workflow for making changes to a business term data object (BTDO) is provided in FIGS. 4A-4D. The entire finite state machine 400 is shown in FIG. 4A, while various portions are illustrated in FIGS. 4B-4D. In some embodiments, the specification for FSM 400 may be one of FSM specifications store 132 and FSM 400 may be instantiated using workflow execution engine 133.

As shown in FIG. 4A, state machine 400 includes ten workflow states: the start state 401, the draft state 402, the draft pending approval state 404, the published state 406, the pending delete state 408, the delete pending approval state 410, the deleted state 412, the imported state 414, the pending approval state 416, and the pending change state 418.

As one illustrative example of how FSM 400 may be used, an instance of the FSM 400 may be generated for a business term data object upon its creation to capture a new business term being proposed, and the current workflow state moves from the start state 401 to the draft state 402.

As shown in FIG. 4B, when the current workflow state is state 402, an authorized actor can either: (1) delete the BTDO (the deletion would be auto-committed without approval), in which case the workflow would transition to the deleted state 412 and the workflow ends (which may involve, for example, deleting the instance of FSM 400 used to manage the workflow); (2) edit the BTDO, in which case the current workflow state remains state 402[1]; or (3) submit the BTDO for review, in which case the workflow would transition to the draft pending approval state 404.

[1] Since there is a transition from the draft state 402 to itself, the BTDO remains editable as long as the FSM 400 is in the draft state 402. Without this transition, the BTDO would not be open for additional changes after its initial creation.

In some embodiments, when the current workflow state is state 404, the current workflow state may transition back to state 402 when the proposed business term data object is rejected (e.g., by an authorized reviewer) or the proposed BTDO is withdrawn by the actor who had submitted it for review. On the other hand, when the current workflow state is state 404, the current workflow state may transition to published state 406, when the proposed BTDO is approved (e.g., by an authorized reviewer).

It should be noted that the FSM 400 includes two different system-defined workflow states—the start state 401 and the imported state 414. The start state 401 is used when a new business term is created. On the other hand, when one or more objects are imported by the data processing system (having been previously created) from one or more external sources (e.g., one or more external systems, databases, data stores, etc.), the initial state is the import state 414 and, upon completion of the import, the current workflow state of FSM 400 passes to the published state 406. In some embodiments, the multiple objects may be imported as a batch, and the overall import may be referred to as "batch processing".

As shown in FIG. 4C, when the current workflow state is the published state 406 and an authorized actor edits the BTDO, a new version of the BTDO is created and the current workflow state transitions to the pending change state 418. When the current workflow state is state 418, the current workflow state transitions back to the published state 406 if the authorized actor who submitted the edit for approval discards the edit. When the current workflow state is state 418, the current workflow state transitions to pending approval state 416 when an authorized actor submits the change for approval.

In some embodiments, when the current workflow state is the pending approval state 416, an authorized actor (or multiple actors) may approve the proposed edit, in which case the current workflow state transitions to the published state 406, or may reject the proposed edit, in which case the current workflow state transitions back to the pending change state 418.

As shown in FIG. 4D, when the current workflow state is the published state 406 and an authorized actors deletes the business term data object, the current workflow state transitions to pending delete state 408. When the current workflow state is state 408, the current workflow state transitions back to the published state if the authorized actor who deleted the BTDO discards the deletion. On the other hand, when the actor submits the deletion request for approval, the current workflow state changes to delete pending approval state 410.

In some embodiments, when the current workflow state is the delete pending approval state 410, an authorized approve the deletion of the BTDO, in which case the current workflow transitions to the pending delete state 408, or may approve the deletion, in which case the BTDO is deleted and the current workflow state moves to the deleted state 412.

In the illustrative example described above with reference to FIG. 4A-4D, any changes to a business term data object are bundled together so that when any edit to the BTDO is made, the entire BTDO is locked. No additional changes are permitted until the workflow state for the BTDO returns to the published state 406 either from the pending approval state 416 (upon approval) or the pending change state 418 (upon discarding of the edit).

Primary and Secondary Finite State Machines

Any embodiment of the invention may implement two or more tasks in parallel on a common data object. Accordingly, one or more secondary, further, finite state machines may be instantiated for managing one or more corresponding workflows for executing respective different tasks. This allows different actors to perform different processes for a same data object at the same time. For example, in some embodiments, a data object may have two or more attributes, and one FSM may be instantiated to manage the workflow for executing a change to one attribute of the data object, while another FSM may be instantiated to manage the workflow for executing a change to another attribute of the data object. This allows the changing, or editing, of different attributes of a given data object simultaneously without the need to lock the data object for editing by other actors whilst it is being edited by a given actor. This reduces the amount of time needed by the data processing system to manage the changes, thereby making the data processing system more efficient, whilst also avoiding the need to lock data objects for other actors during changing or editing of a data object.

Simultaneous changing, or editing, of different attributes of a given data object may be achieved by instantiating each secondary finite state machine using a separate execution thread within the workflow execution engine 133. Furthermore, the tasks associated with each of the respective workflows may also be executed simultaneously in parallel such as by using one or more separate execution threads for each respective workflow.

As an example, and as discussed herein, the inventors have recognized that it is valuable to allow for finer-grained control over the approval process for edits. Accordingly, in some embodiments, one or more secondary finite state machines may be instantiated for managing one or more corresponding workflows for making different edits to a data object. For example, in some embodiments, a data object may have multiple attributes, and one FSM may be instantiated to manage the workflow for managing a change to one attribute of the data object, while another FSM may be instantiated to manage the workflow for managing a change to another attribute of the data object. This allows different actors to edit different attributes of a data object simultaneously, without being locked out. This reduces the amount of time needed by the data processing system to manage the changes, thereby making the data processing system more efficient.

Figure 5A:
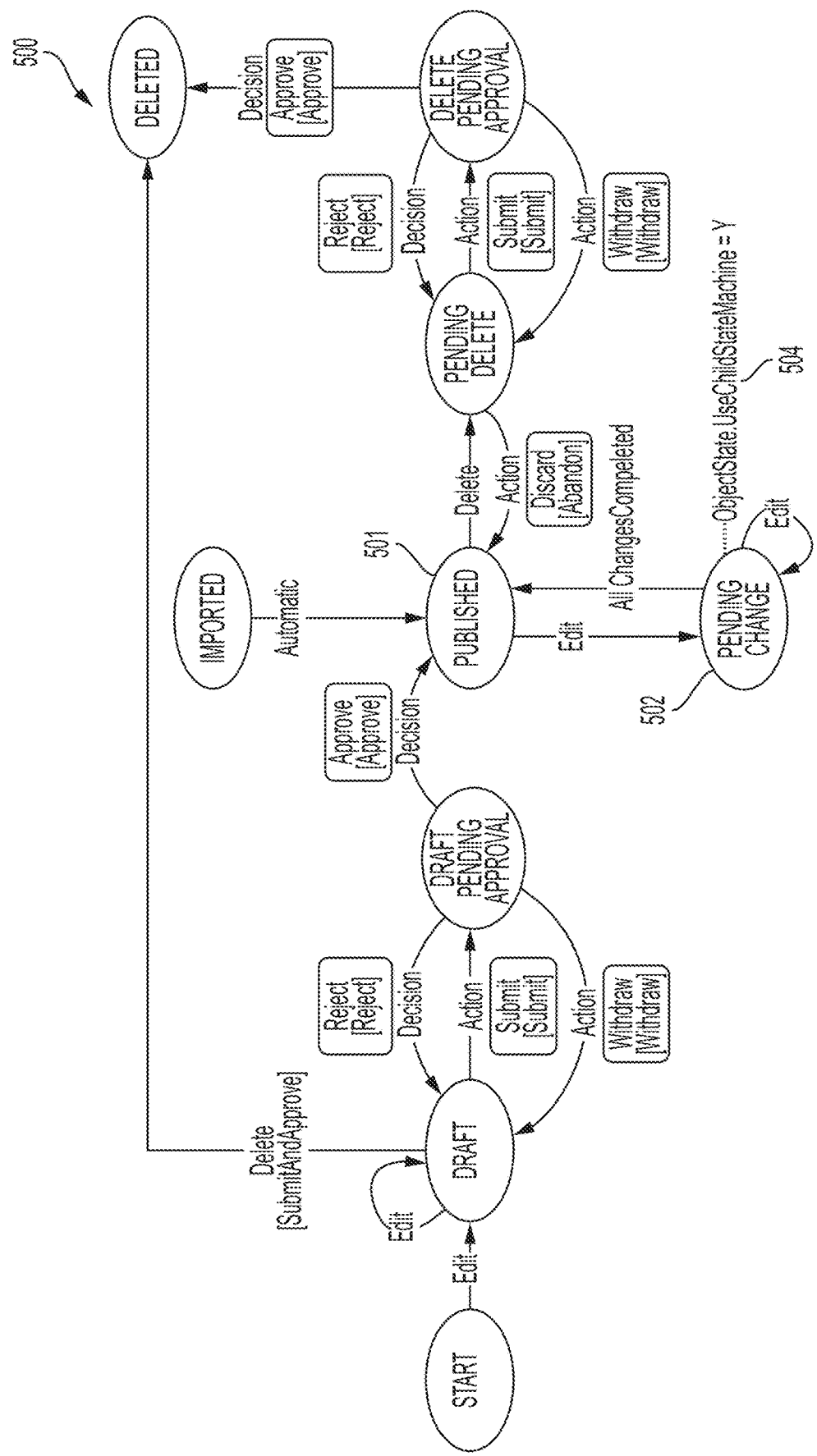
FIG. 5A is a diagram of an illustrative finite state machine 500 for managing changes to a business term data object, with one of the states of the FSM 500 being associated with a secondary finite state machine, in accordance with some embodiments of the technology described herein.
Figure 5B:
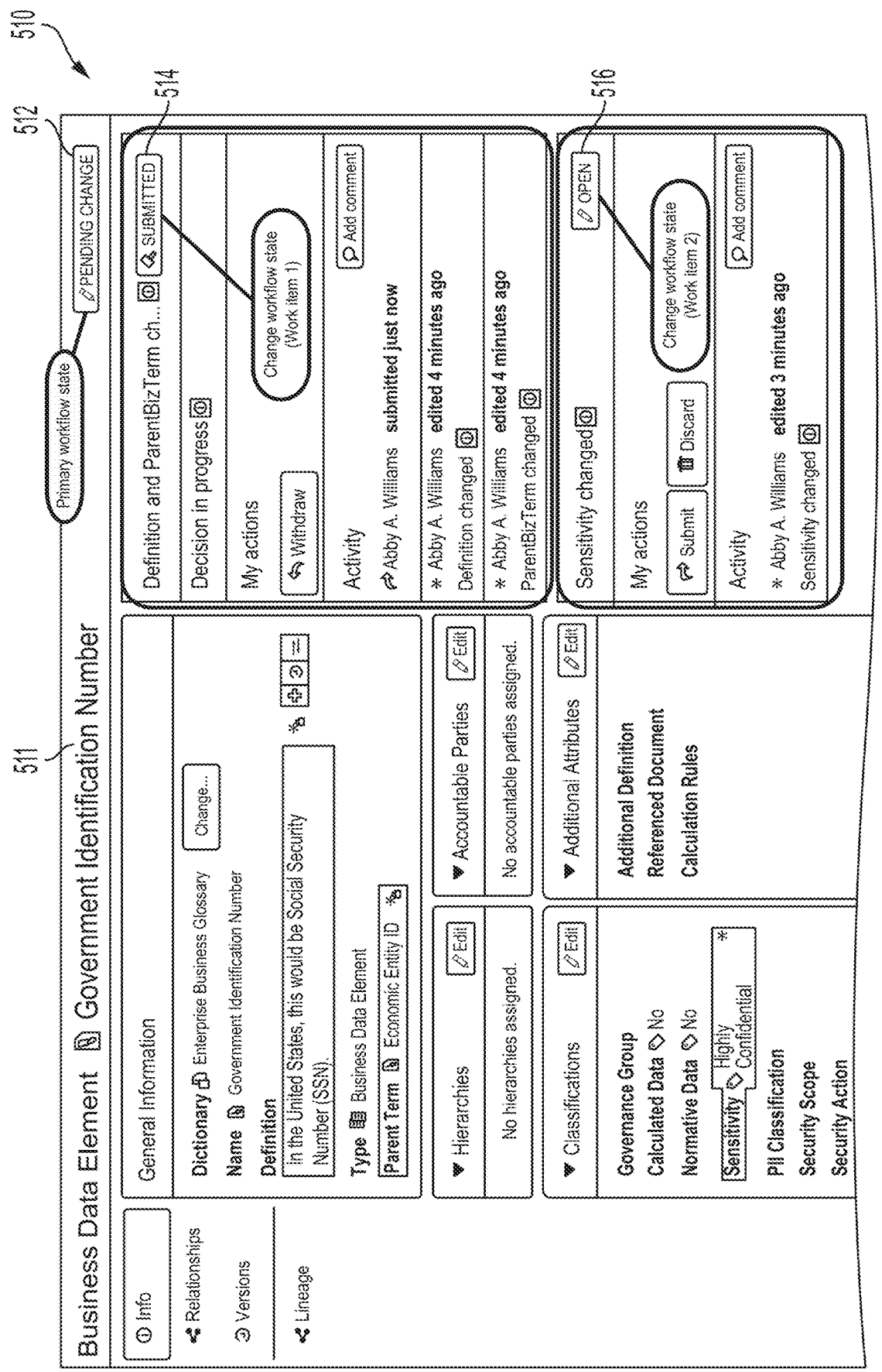
FIG. 5B is a diagram of an illustrative GUI 510 showing the state of a primary FSM for managing changes to a business term data object and the states of secondary FSMs for managing changes to attributes of the business term data object, in accordance with some embodiments of the technology described herein.
Figure 5C:
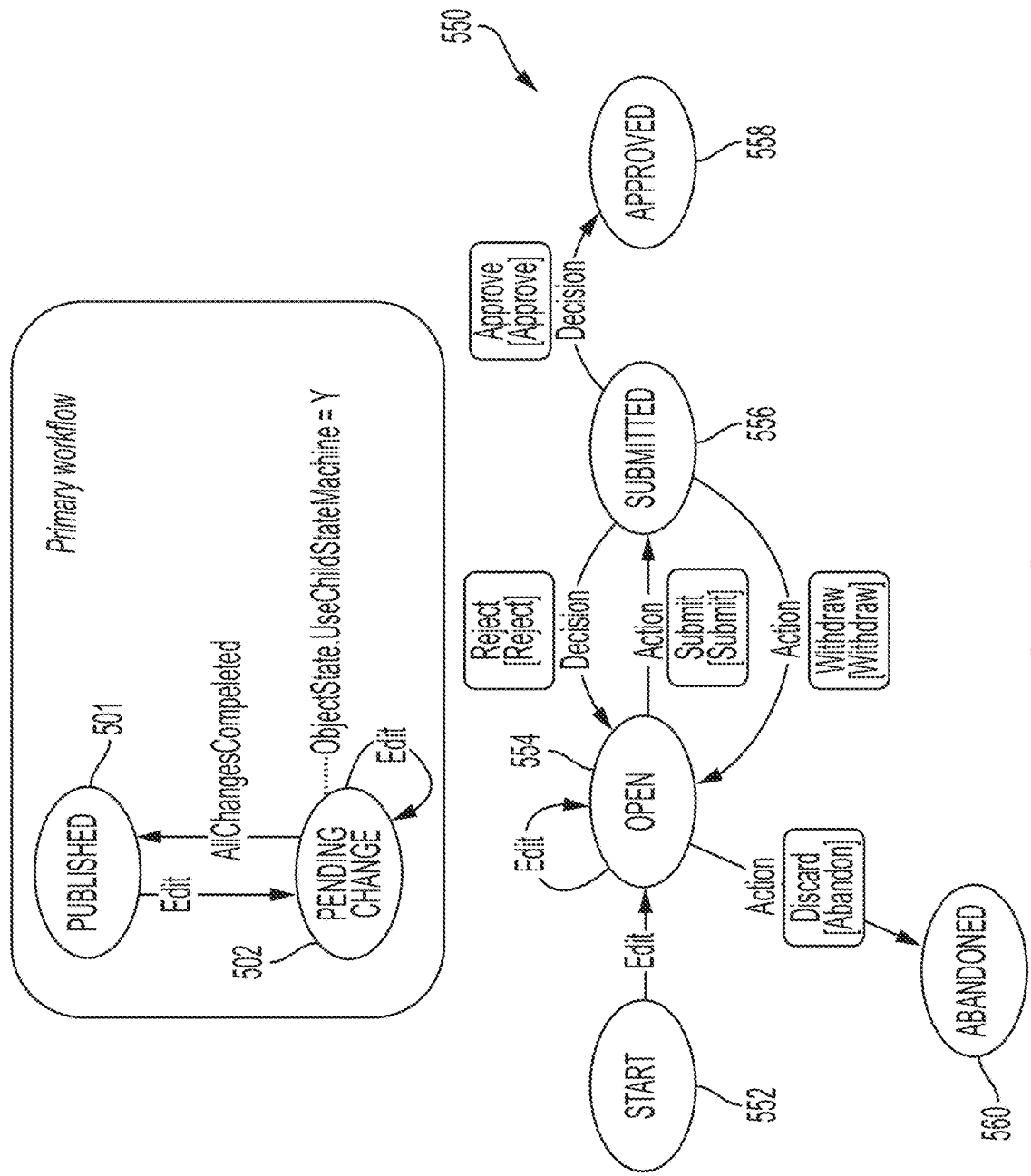
FIG. 5C illustrates a secondary FSM 550 for making changes to a business term data object, in accordance with some embodiments of the technology described herein.

One example of this approach is illustrated in FIGS. 5A-5C. FIG. 5A is a diagram of an illustrative finite state machine 500 for managing changes to a business term data object, with one of the states of the FSM 500 being associated with a "child" or "secondary" finite state machine, in accordance with some embodiments of the technology described herein. In some embodiments, the specification for FSM 500 may be one of FSM specifications store 132 and FSM 500 may be instantiated using workflow execution engine 133.

As may be appreciated from FIGS. 4A and 5A, the structure of the finite state machine 500 is similar to that of finite state machine 400. However, when the current workflow state is in the published state 501 and an edit is made, the FSM 500 transitions to a pending change state 502, and another finite state machine (e.g., FSM "A") is instantiated to manage the workflow for approving that particular edit. In this case, the business term data object is not locked, and other edits may be made. When other edits are made to the BTDO, workflows for approval for these other edits are managed by other finite state machines (e.g., FSMs "B", "C", "D"). When the workflows for all of the edits are completed (e.g., workflows managed by four different FSMs—A, B, C, D—for four different edits), the current workflow state returns to the published state 501. In this example, the finite state machine 500 may be termed the "primary" or "parent" finite state machine, whereas the finite state machines spawned to manage workflow for edits to the business term data object may be termed "secondary" or "child" finite state machines.

In some embodiments, secondary finite state machines allow for concurrent changes to be processed independently from one another—the workflows for approving or rejecting proposed changes may be executed, in parallel, independently of one another. For example, as shown in the GUI 510 of FIG. 5B, changes made to different attributes of a data objects may be managed by different secondary finite state machines, which may be in different states. As shown by GUI element 512 in FIG. 5B, the current workflow state of the primary finite state machine 500 for managing the BTDO 511, named "Government Identification Number," is the pending change state 502. In this example, changes to the Definition attribute of the BTDO are being managed by one secondary finite state machine, whose workflow state is in the "Submitted" state, as shown by GUI element 514, while changes to the "Sensitivity" attribute are being managed by another finite state machine, whose workflow state is in the "Open" state, as shown by GUI element 516. In this example, there are three finite state machines for managing changes to the underlying data object—a primary state machine and two secondary state machines, with their states shown by GUI elements 512, 514, and 516, respectively. The two secondary finite state machines may be instances of the same FSM, specified by the same FSM specification, or instances of different finite state machines, specified by different FSM specifications.

FIG. 5C shows an example of illustrative secondary finite state machine 550 for making changes to a business term data object, in accordance with some embodiments of the technology described herein. A portion of the primary state machine 500 is included in FIG. 5C for reference. In some embodiments, the specification for FSM 550 may be one of FSM specifications store 132 and FSM 550 may be instantiated using workflow execution engine 133.

As shown in FIG. 5C, secondary FSM 550 has five states: the start state 552, the open state 554, the submitted state 556, the approved state 558, and the abandoned state 560. When an attribute of a published data object is modified, the current state of the workflow managed by the primary FSM moves from state 501 to state 502, triggering the generation of an instance of secondary FSM 550 for managing the lifecycle of this modification. The current state of the workflow being managed by the secondary FSM 550 moves from the start state 552 to the open state 554. As there is an Open-to-Open edit transition (from state 554 to itself), the attribute remains editable while the current workflow state is in state 554. When the current workflow state is in the open state 554, and an authorized actor discards the change, the current workflow state moves to the abandoned state 560. On the other hand, when an authorized actor submits the proposed change for approval, the current workflow state moves from the open state 554 to the submitted state 556.

In some embodiments, when the current workflow state is in the submitted state 556, the current workflow state may transition back to state 554 either when the actor who submitted the edit withdraws it or when a reviewer rejects the edit. On the other hand, if the change is approved, the current workflow state transitions to the approved state 558, and the edit is committed by the data processing system.

In some embodiments, when all secondary finite state machines associated with the pending change state 502 have reached terminal states (either the abandoned state 560 or the approved state 558), the instances of the secondary finite state machines are deleted, and the current workflow state for the workflow being managed by the primary FSM 500 returns to the published state 501.

Automatically Triggered Actions

In some embodiments, the data processing system may automatically perform one or more actions in response to one or more trigger events. The events may be defined in the data processing system (e.g., through programming, configuration settings, rules, etc.) and can be used trigger performance of the action(s). Examples of such actions include, but are not limited to, generating and sending a notification (e.g., an e-mail notification, an SMS message, an MMS message, a phone call, or any other suitable type of communication) to one or more actors and/or systems (e.g., a downstream system, an external system, and/or any other system), triggering the execution of another computer program (e.g., a script), and causing a state transition in a workflow for a data object.

As one specific example, an administrator of the data processing system may set up a notification trigger that causes an e-mail to be sent to the relevant parties whenever someone submits a change to a business term. As another specific example, an administrator of the data processing system may set up a trigger to cause a script to automatically add classifications to business terms when they enter a particular workflow state. As another specific example, an administrator of the data processing system may set up a trigger to cause a script to automatically check for the presence of certain classifications (e.g., "Governance Group" classification) before they enter a particular workflow state (e.g., "Draft Pending Approval" state), and display an error message if no such classification has been specified.

Accordingly, in some embodiments, an administrator of the data processing system may define the events that will trigger an action such as a notification (e.g., an e-mail), a script (e.g., Apache Groovy scripting language), or a state transition. In some embodiments, the events may be raised (thereby triggering the action) in response to workflow activity or in response to receiving a remote request (e.g., an HTTP request received via a REST web service).

Non-limiting examples of events that may trigger an action include: (1) when a finite state machine for a data object enters a particular workflow state (e.g., a script to verify classifications of a business terms may be triggered to execute when the business term enters a particular workflow state); (2) when the FSM for the data object leaves a particular workflow state; (3) before an FSM transition for a workflow occurs; (4) after an FSM transition for a workflow occurs (e.g., initiating a new version of a data object may trigger notifications to one or more approvers); (5) when a workflow decision is initiated; (6) when a workflow decision is resolved; (7) when a decision participant selects a voting option.

In the context of notifications, for example, the following list of events is a non-limiting list of examples of events that may trigger a notification: (1) when a change is approved by a designated approver; (2) when a change is approved by an actor with override privileges; (3) when an actor submits a change to a data object and an approval decision is initiated;

(4) after all approvals for a change a received and the change has been committed to the datastore; (5) when a data object in a "Draft" state is deleted; (6) when a data object in the "Published" state is marked for deletion; (7) when a data object in a "Pending Approval" state is discarded; (8) when a pending change is discarded; (9) when a pending change is discarded by an actor with override privileges; (10) when a designated approver rejects a change; (11) when a change is submitted; (12) when a user withdraws a pending change; and (13) when a change is withdrawn by a user with override privileges.

Finite State Machines for Managing Imports

Some embodiments provide for finite state machines for managing the importing of multiple data objects in a batch, which may be advantageous as during import many (e.g., thousands of, millions of) data objects may be subject to the same approval process. Rather than instantiating different finite state machines for importing each individual data object, in some embodiments, a single finite state machine may be utilized for this purpose.

Figure 6A:
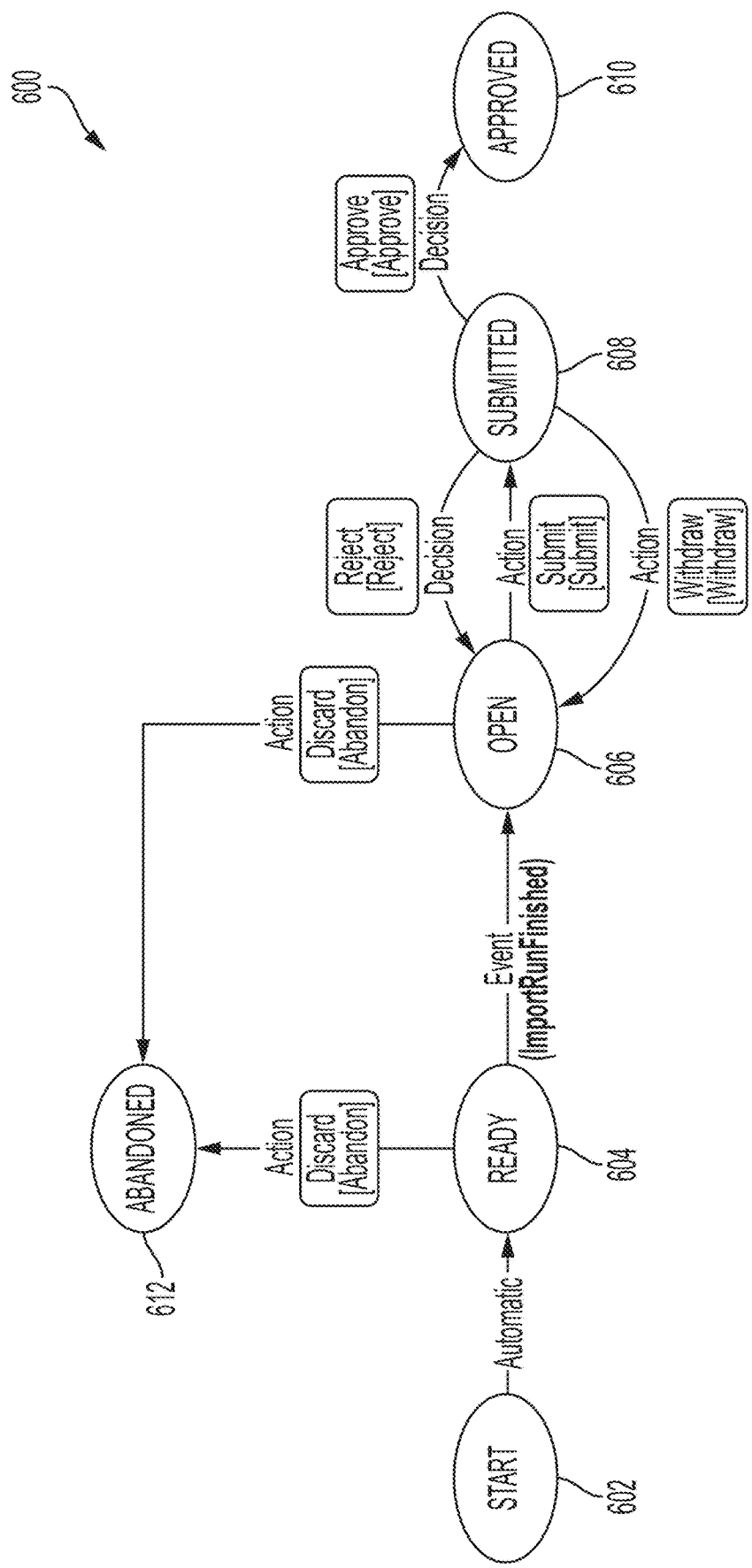
FIG. 6A illustrates a finite state machine 600 for importing additions, modifications, and/or deletions for multiple data objects, in accordance with some embodiments of the technology described herein.

FIG. 6A illustrates a finite state machine 600 for importing additions, modifications, and/or deletions for multiple data objects, in accordance with some embodiments of the technology described herein. In some embodiments, the specification for FSM 600 may be one of FSM specifications 132 and FSM 600 may be instantiated using workflow execution engine 133.

As shown in FIG. 6A, FSM 600 includes 6 workflow states: the start state 602, the ready state 604, the open state 606, the submitted state 608, the approved state 610, and the abandoned state 612. When an actor initiates an import of data objects using the data processing system, an instance of FSM 600 is generated and the current workflow state move to the ready state 604. When the current workflow state is state 604, and the import fails to complete, the actor may abandon it (e.g., by clicking the "Discard" button on a GUI presented to the actor) and the current workflow state transitions to the abandoned state 612 and the workflow completes. Otherwise, when the import completes, the current workflow state transitions to the open state 606.

In some embodiments, when the current workflow state is the open state 606, an authorized actor may either discard the imported data objects, in which case the current workflow state moves to the abandoned state 612 and the workflow completes, or submit the imported data objects for approval, in which case the current workflow state moves to the submitted state 608.

In some embodiments, when the current workflow state is in the submitted state 610, the current workflow state transitions back to the open state 606, if the import is rejected (e.g., by one or more authorized reviewers). On the other hand, when the import is approved, the current workflow state transitions to the approved state 610, and the workflow completes. In some embodiments, when the importing of objects is to be managed through a user interface, the data object are automated assigned the "Imported" state and will continue their individual primary workflows after the batch import is improved.

Figure 6B:
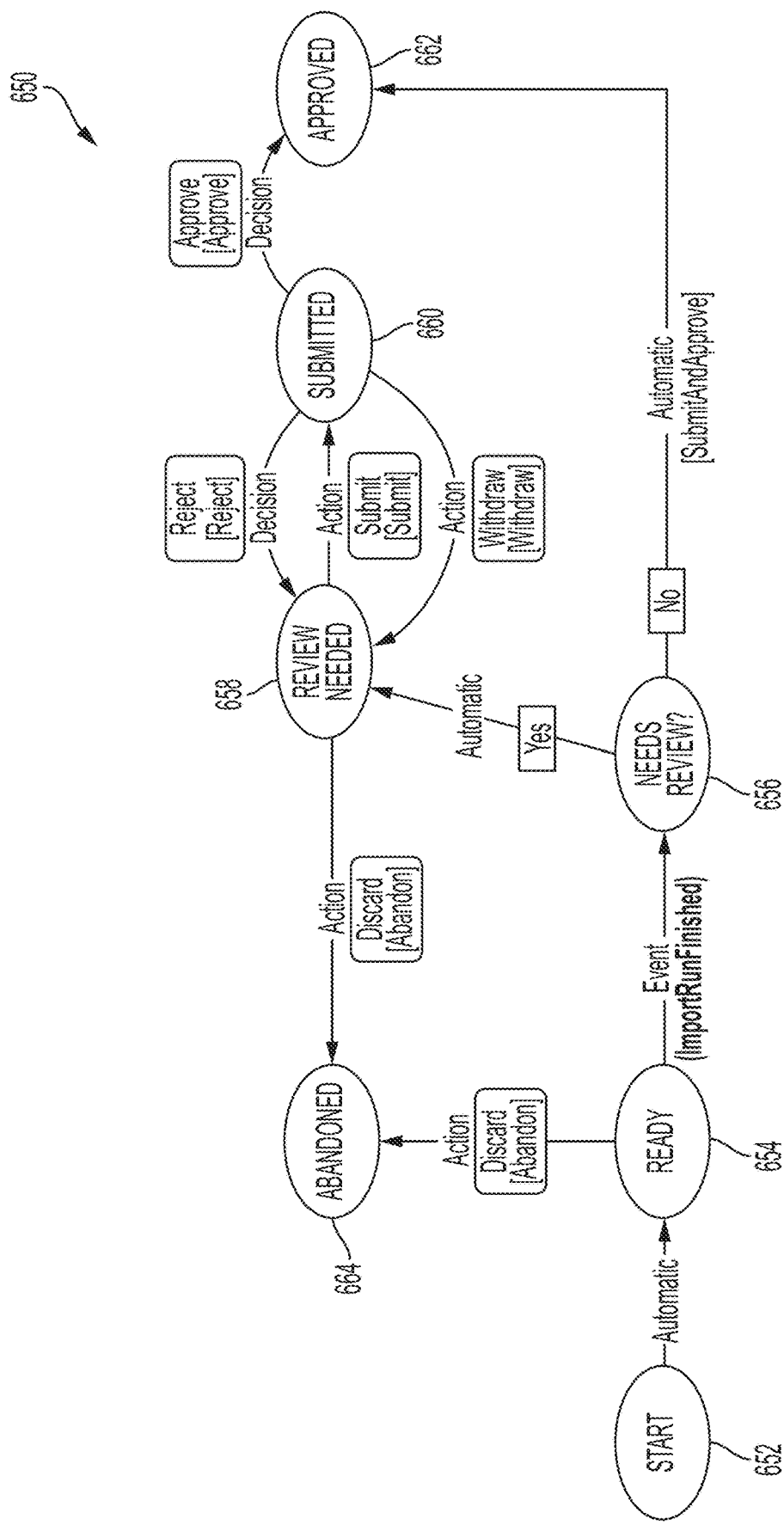
FIG. 6B illustrates a finite state machine 650, for conditionally importing additions, modifications, and/or deletions for multiple data objects, in accordance with some embodiments of the technology described herein.

FIG. 6B illustrates a finite state machine 650, for conditionally importing additions, modifications, and/or deletions for multiple data objects, in accordance with some embodiments of the technology described herein. The FSM 650 includes a conditional transition, which enables requesting approval for the import only if a predefined condition is met (e.g., one or a threshold number of errors occurs, one or more imported records are rejected). In some embodiments, the specification for FSM 650 may be one of FSM specifications 132 and FSM 650 may be instantiated using workflow execution engine 133. It should be appreciated that the ability to branch in a finite state machine is not limited to processing of import workflows, as is the case of the present example, but may be used in any finite state machine for managing a workflow for a data object, in accordance with embodiments of the technology described herein.

As shown in FIG. 6B, FSM 650 includes 7 workflow states: the start state 652, the ready state 654, the open state 656, the review need state 658, the submitted state 660, the approved state 662, and the abandoned state 664. When an actor initiates an import of data objects using the data processing system, an instance of FSM 650 is generated and the current workflow state move to the ready state 654. When the current workflow state is state 654, and the import fails to complete, the actor may abandon it (e.g., by clicking the "Discard" button on a GUI presented to the actor) and the current workflow state transitions to the abandoned state 664 and the workflow completes. Otherwise, when the import completes, the current workflow state transitions to the open state 656.

In some embodiments, when the current workflow state is the open state 656, and a review condition is not met (e.g., no errors in the import, no rejected records in the import, etc.), the current workflow state transitions to approved state 662 and the workflow completes. On the other hand, when a review condition is met, the current workflow transitions to review needed state 658.

In some embodiments, when the current workflow state is the review needed state 658, an authorized actor may either discard the imported data objects, in which case the current workflow state moves to the abandoned state 664 and the workflow completes, or submit the imported data objects for approval, in which case the current workflow state moves to the submitted state 660.

In some embodiments, when the current workflow state is in the submitted state 660, the current workflow state transitions back to the review needed state 658, if the import is rejected (e.g., by one or more authorized reviewers). On the other hand, when the import is approved, the current workflow state transitions to the approved state 662, and the workflow completes.

Identifying Actors to Perform Workflow Tasks

As described herein, a data processing system may authorize different actors to perform different workflow tasks in a workflow for a data object. For example, different actors may be authorized to make changes to a data object and to review (e.g., approve or reject) the changes. Generally, a set of one or more actors may be identified as actors authorized to perform a workflow task for each workflow task in a workflow. Two different tasks may be associated with the same set of one or more actors or different actors.

In some embodiments, a data processing system (e.g., data processing system 120 using permissions module 135) may identify one or more actors as being authorized to perform a workflow task for each of one or more workflow tasks in a workflow for a data object. For example, in some embodiments, one or more actors may be identified as being authorized to perform a workflow task for each of one or more (e.g., all) of the transitions in an FSM for managing a workflow. For example, one or more actors may be identified as authorized to perform a workflow task represented by a state transition for which actor input is required (e.g., not an automatic transition)—such as an edit or an approval.

In some embodiments, the identification of the authorized actors may be stored by the data processing system and used to perform one or more functions in furtherance of managing a workflow. For example, in some embodiments, the data processing system may provide an actor authorized to perform a workflow task (e.g., a reviewer authorized to approve a change to a data object) with a graphical user interface that enables the actor to perform the workflow task (e.g., a graphical user interface through which the reviewer may approve or reject the proposed change to the data object). As another example, in some embodiments, the data processing system may notify an actor (e.g., by e-mail, text message, through an application program, and/or any other suitable type of communication) that he or she has one or more workflow tasks to perform with respect to one or more workflows. As yet another example, in some embodiments, the data processing system may notify one or more actors (e.g., supervisory actors who are not themselves performing the workflow tasks) as to the identity of one or more actors identified as being authorized to perform one or more workflow tasks (e.g., so that the supervisory actors are aware of who is authorized to perform the workflow task(s)). As yet another example, in some embodiments, the data processing system may provide a notification to one or more other systems (e.g., downstream systems) indicating that one or more tasks are to be performed and/or information identifying one or more actors authorized to perform the tasks(s).

The inventors have developed a number of techniques for identifying one or more actors authorized to perform a workflow task for a workflow data object. In some embodiments, a workflow actor may be selected directly. For example, one or more actors may be specified (e.g., by an actor through a graphical user interface) as being authorized to perform one or more particular actions for a particular data object. For example, an actor authorized to make changes to a particular business term data object may be input. However, the inventors have appreciated that it is impractical to assign actors to workflow actions for each workflow and each data object, especially considering that a data processing system may support numerous workflows for multiple (e.g., hundreds, thousands, millions) of data objects. To operate at scale, the inventors developed rules for dynamically identifying actors automatically for target groups (e.g., hierarchies) of objects based on data object attributes, relationships to other objects, etc.

Accordingly, some embodiments provide for automated techniques for identifying actors authorized to perform workflow tasks. In some embodiments, a data processing system may identify one or more actors authorized to perform a workflow task for a data object using information associated with the data object. For example, in some embodiments, the data processing system may identify one or more actors authorized to perform a workflow task for a data object based on values of one or more attributes of the data object.

As one example, the data processing system may manage multiple data objects by organizing them in one more hierarchies, and a data object may include one or more attributes whose value(s) indicate the hierarchy or hierarchies to which the data object belongs. The data processing system may use the value(s) of this attribute or attributes to identify one or more actors authorized to perform a workflow task for the object. For example, data object "A" may be related (e.g., may be a descendant of) to data object B in a hierarchy of data objects. In some embodiments, the data processing system may use the hierarchy to identify that a particular set of one or more actors is authorized to perform a particular workflow task for data object B, and may authorize this set of actors to perform the same particular workflow task for data object B. In some embodiments, data object B may be a parent or ancestor of data object A.

Figure 7A:
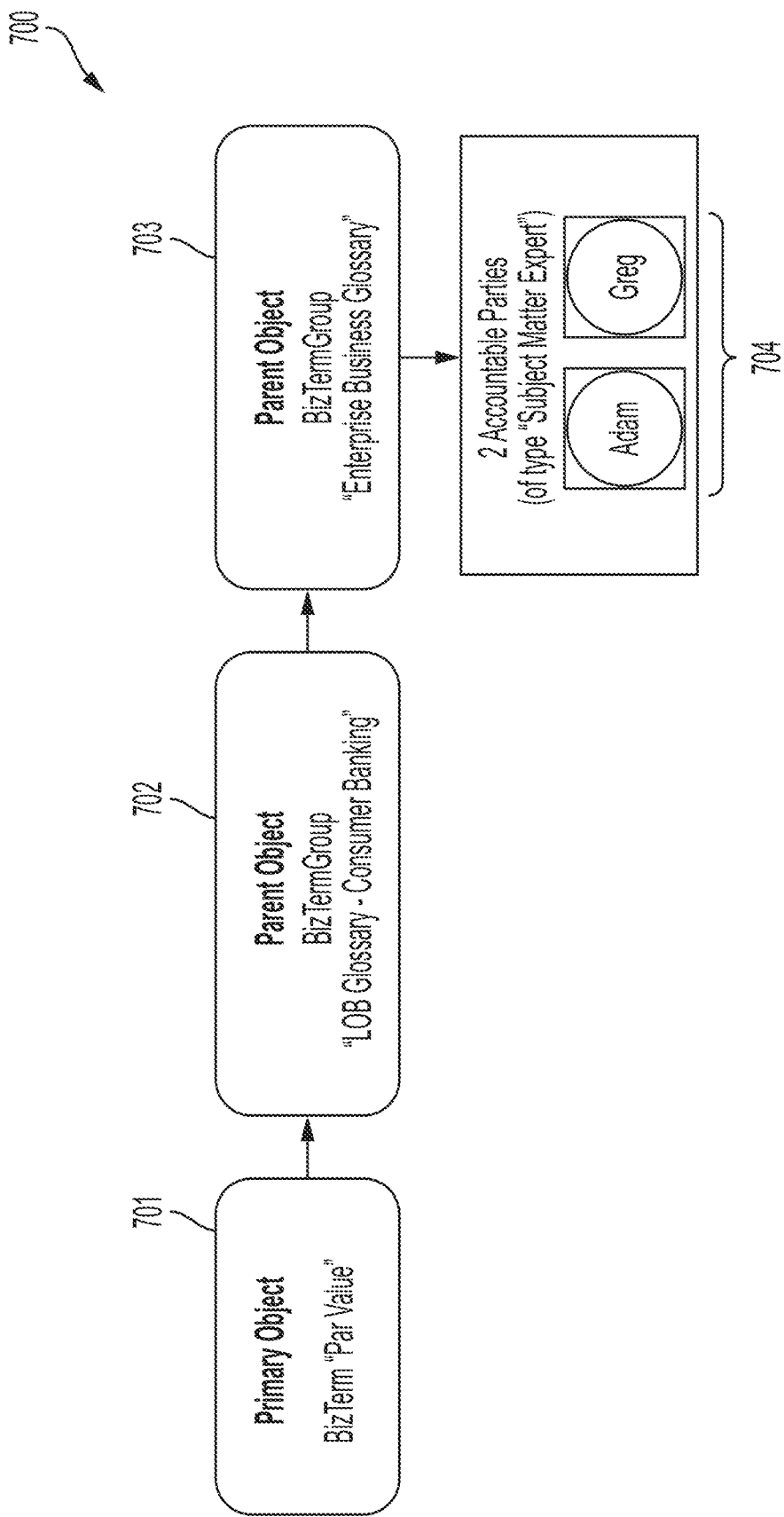
FIG. 7A is a diagram 700 illustrating identification of one or more workflow actors for a data object using information specified for at least one other data object in at least one data object hierarchy containing the data object, in accordance with some embodiments of the technology described herein.

An example of this approach is shown in the illustrative embodiment of FIG. 7A, which shows a diagram 700 illustrating identification of one or more workflow actors for a data object using information specified for at least one other data object in at least one data object hierarchy containing the data object. As shown in FIG. 7A, data object 701 is a child of data object 702, which in turn is a child of data object 703. Actors 704 ("Adam" and "Greg," in this example) are assigned to data object 703 as "Accountable Parties" and, as such, are authorized to perform any workflow task that "Accountable Parties" are authorized to perform. A data processing system may identify the actors 704 as being the "Accountable Parties" for the data object 701. In this way, authorized actors may be identified through inheritance. Permissions to perform a workflow task for a particular data object may be inherited from one or more related data objects in an object hierarchy.

Figure 7C:
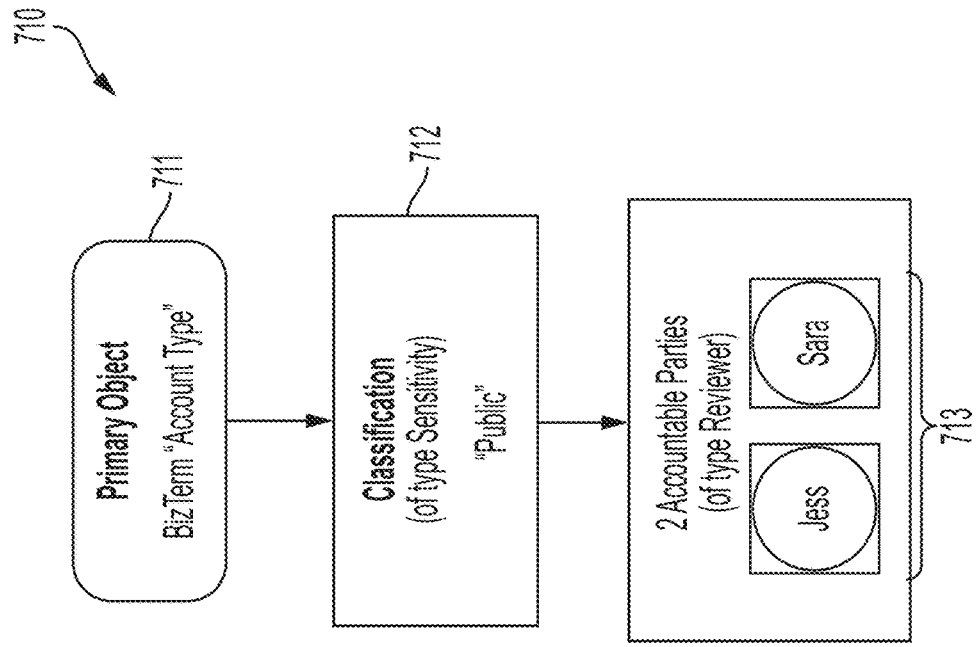
FIG. 7C is another diagram 710 illustrating identification of one or more workflow actors for a data object based on a value of a classification attribute of the data object, in accordance with some embodiments of the technology described herein.
Figure 7B:
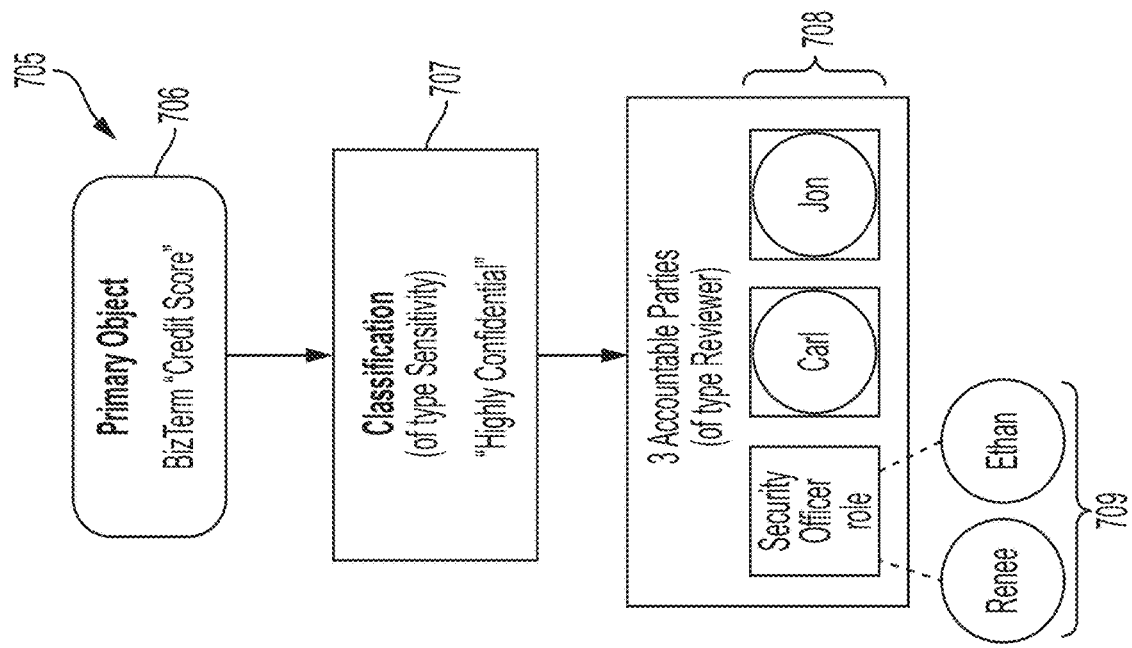
FIG. 7B is a diagram 705 illustrating identification of one or more workflow actors for a data object based on a value of a classification attribute of the data object, in accordance with some embodiments of the technology described herein.
Figure 7D:
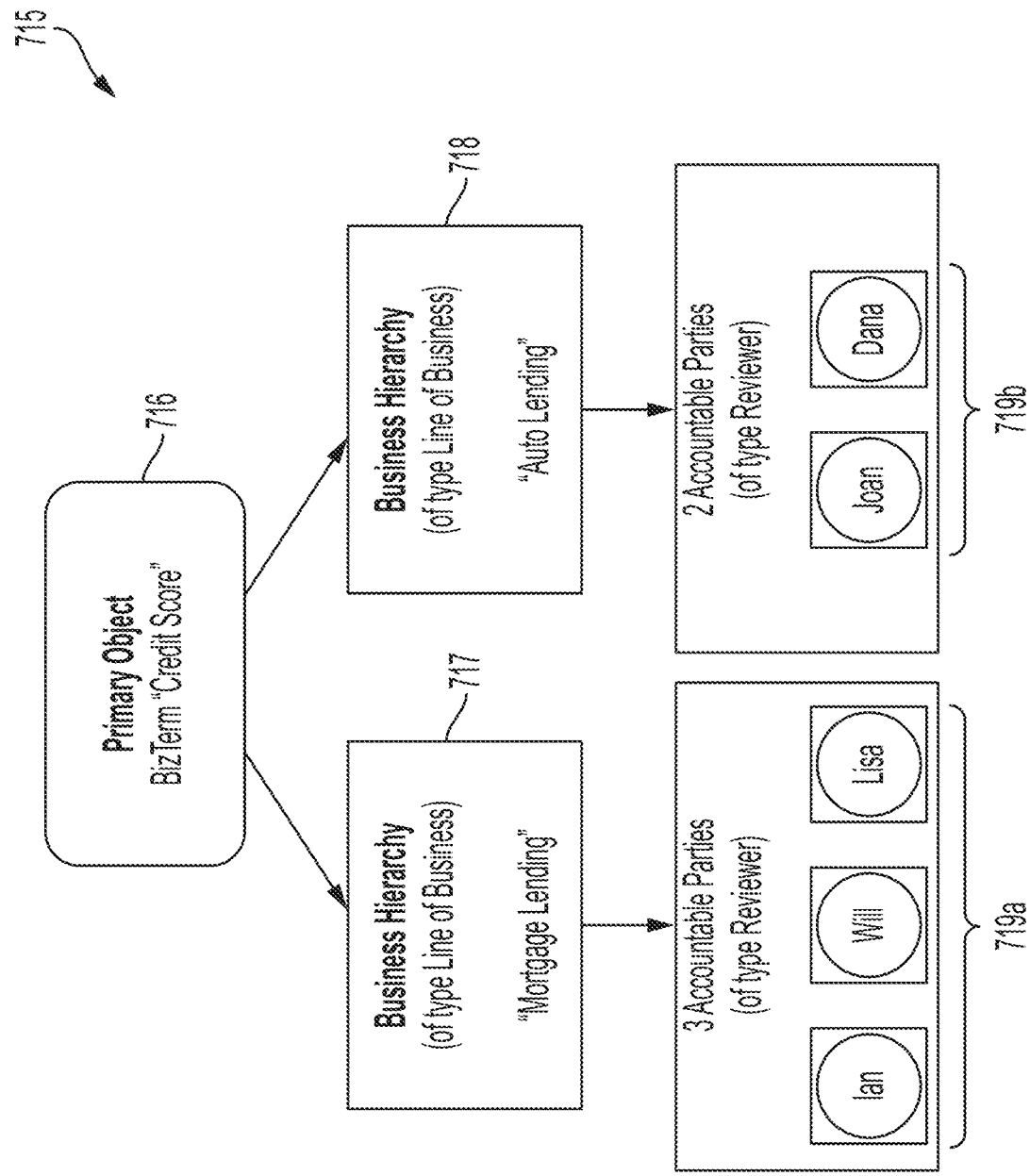
FIG. 7D is a diagram 715 illustrating identifying workflow actors for a data object using information specified for other data objects in multiple data object hierarchies containing the data object, in accordance with some embodiments of the technology described herein.

Another example of this approach is shown in the illustrative embodiment of FIG. 7D, which shows a diagram 715 illustrating identifying workflow actors for a data object 716 using information specified for multiple data object hierarchies containing the data object. In this example, data object 716 (which is a business term data object representing the business term "Credit Score") is part of two hierarchies—the "mortgage lending" hierarchy 717 of data objects and the "auto lending hierarchy" 718 of data objects. Each of these hierarchies is associated with a respective set of "Reviewers", who are authorized to perform any workflow tasks that "Reviewers" are authorized to perform. Indeed, in some embodiments, a workflow task may be specified so that an authorized actor for the workflow task is a member of "Reviewers." As a result, identifying the set of "Reviewers" for a data object is tantamount to identifying which actors are authorized to perform "Reviewer" workflow tasks for workflows involving the data object.

In this example, the "mortgage lending" hierarchy 717 is associated with reviewers 719a (Ian, Will, and Lisa, in this example) and the "auto lending" hierarchy 718 is associated with reviewers 719b (Joan and Dana, in this example). In this example, both sets of reviewers (i.e., reviewers 719a and 719b) may be identified as authorized "Reviewers" for the primary object 716 such that a review workflow task may involve all of them in accordance with a suitable voting rule (e.g., majority vote, unanimous vote, at least one reviewer from each group, etc.). For example, if a change were made to the data object 716, then the review process for that change may require a vote by all five reviewers, and approval may be granted if the majority of the reviewers approve the change. Voting rules are described in more detail below, but this example illustrates that a data object (e.g., data object 716) may have an attribute specifying multiple data object hierarchies to which the data object belongs (e.g., hierarchies 717 and 718) and actors authorized to perform a workflow task (e.g., approve a change to data object 716) may be identified based on the value of this attribute by identifying actors associated with the specified hierarchies. Other examples are described herein, including with reference to FIGS. 1D, 1E, 1F, and 1G.

As another example of a technique for automatically identifying one or more actors authorized to perform a workflow task for a data object based on values of one or more attributes of the data object, in some embodiments, the data processing system may identify one or more actors authorized to perform a workflow task for a data object having one or more classification attributes based on the value(s) of the classification attribute(s). For example, the system may identify one or more actors to perform a workflow task for a data object using a value of the governance group classification attribute of the data object, a value of the sensitivity classification attribute of the data object, a value of the personally identifiable information (PII) classification attribute of the data object and/or the value of any other suitable classification attribute(s) of the data object, examples of which are provided herein.

An example of this approach is shown in the illustrative embodiment of FIG. 7B, which shows a diagram 705 illustrating identification of one or more workflow actors for a data object based on a value of a classification attribute of the data object. As shown in FIG. 7B, data object 706 has a sensitivity classification attribute 707 and the data processing system may identify authorized actors (e.g., to perform "Reviewer" tasks such as, for example, approving changes to a data object) based on the value of this attribute. In this example, the value of the sensitivity classification attribute 707 is "Highly Confidential," which leads the data processing system to identify actors 708 based on that value—the identified actors in this example are Carl, Jon and Security Officers 709 (Renee and Ethan). By contrast, as shown in FIG. 7C, the value of the classification attribute 712 of data object 711 is "Public", which leads the data processing system to identify different actors (actors 713—Sara and Jess, in this example) as actors authorized to perform "Reviewer" tasks).

In some embodiments, when actors authorized to perform a workflow task are identified based on the value of a data object attribute, the authorized actors may change when the value of the data object attribute changes. This change may occur even during execution of the workflow. For example, when a change to a data object involves a change to the value of its sensitivity classification attribute (e.g., from "Confidential" to "Highly Confidential") a different (e.g., a larger) set of reviewers may be identified as reviewing this and/or other changes. Other examples of this are described herein including with reference to FIGS. 1H and 1I.

Voting Schemes

As described herein, some workflow tasks are decisions made by one or more parties. For example, one or more reviewers may decide whether a pending change to a data object is to be approved or rejected (e.g., as described with reference to state 416 of FSM 400). As another example, one or more reviewers may decide whether a data object is to be deleted (e.g., as described with reference to state 408 of FSM 400). As yet another example, one or more reviewers may decide whether a pending issue is resolved (e.g., as described with reference to state 358 of FSM 350).

When only one actor is assigned to make a decision, then that single actor's input completely determines the decision. However, in some embodiments, multiple actors may be assigned to vote on a decision, and a voting scheme is utilized to determine an overall decision based on their individual votes. For example, in some embodiments, only a single one of the assigned decision makers needs to approve a pending change. In some such embodiments, the pending change is approved as soon as one of the assigned decision makers approves the change and is rejected when all of the decision makers reject the change. For example, as shown in the diagram 720 of FIG. 7E, a group of "Security Approvers" is defined as including three reviewers (Security Officers, Carl, and John) and the group may be assigned as "Reviewers" to any data object whose sensitivity classification attribute takes on the value of "Highly Confidential". The group is configured with a voting scheme parameter "Single", which indicates that as soon as any one of the three reviewers approves a pending change, the change is approved. For example, if Carl were to approve a pending change, the change would be approved and the other reviewers would not be presented with voting buttons in their work queues when they log in to see pending actions.

Figure 7E:
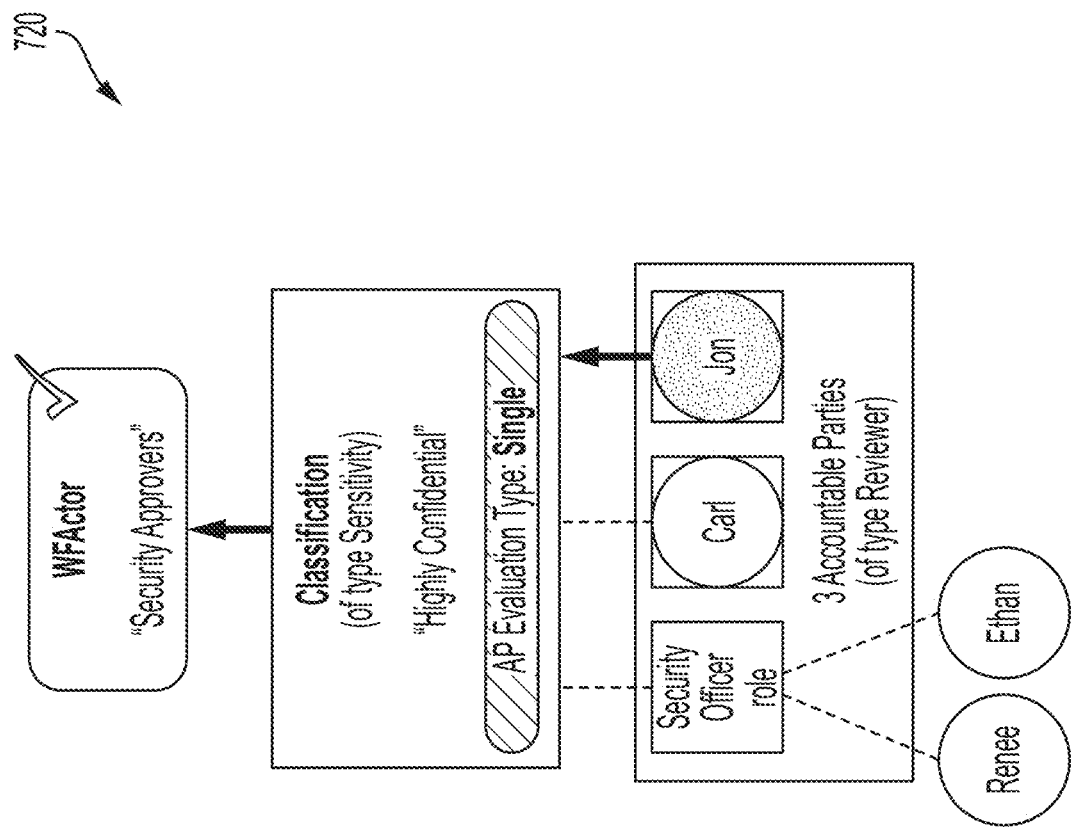
FIG. 7E is a diagram 720 illustrating a "single" decision-making configuration for a pending change in which only a single party's approval for the pending change is needed, in accordance with some embodiments of the technology described herein.

In the example of FIG. 7E, two of the reviewers are individuals while one of the reviewers ("Security Officer") is a group of multiple reviewers (Renee and Ethan) any one of which may vote for the "Security Officer" group as a whole. Thus, either Renee or Ethan may approve a pending change.

Figure 7G:
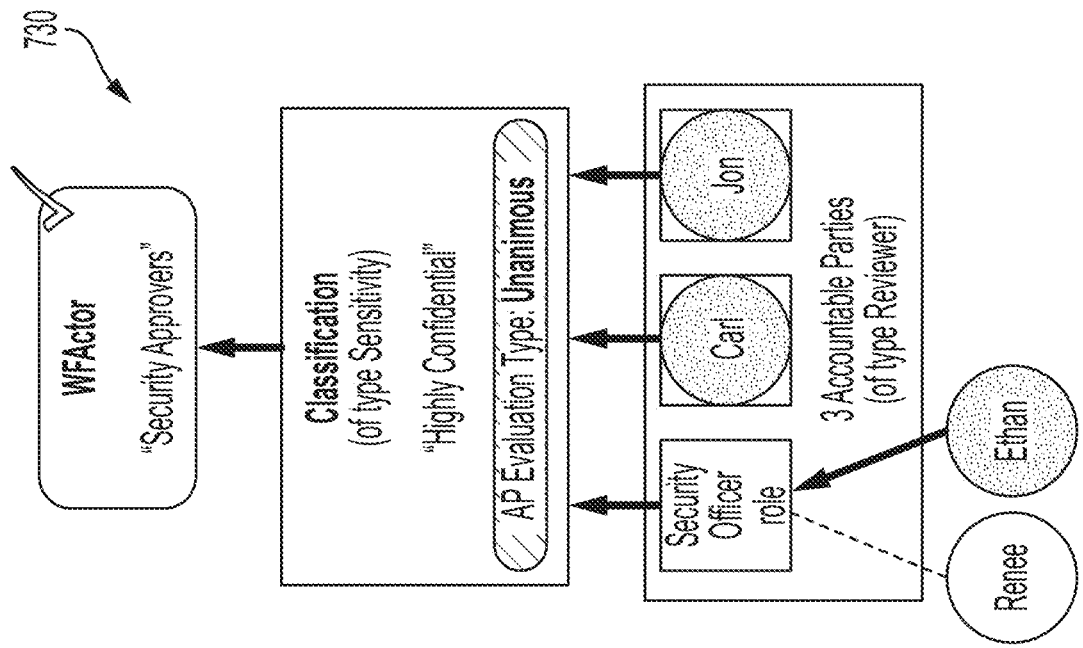
FIG. 7G is a diagram 730 illustrating a "unanimous" decision-making configuration for a pending change in which all of the identified workflow actors need to approve the pending change, in accordance with some embodiments of the technology described herein.
Figure 7F:
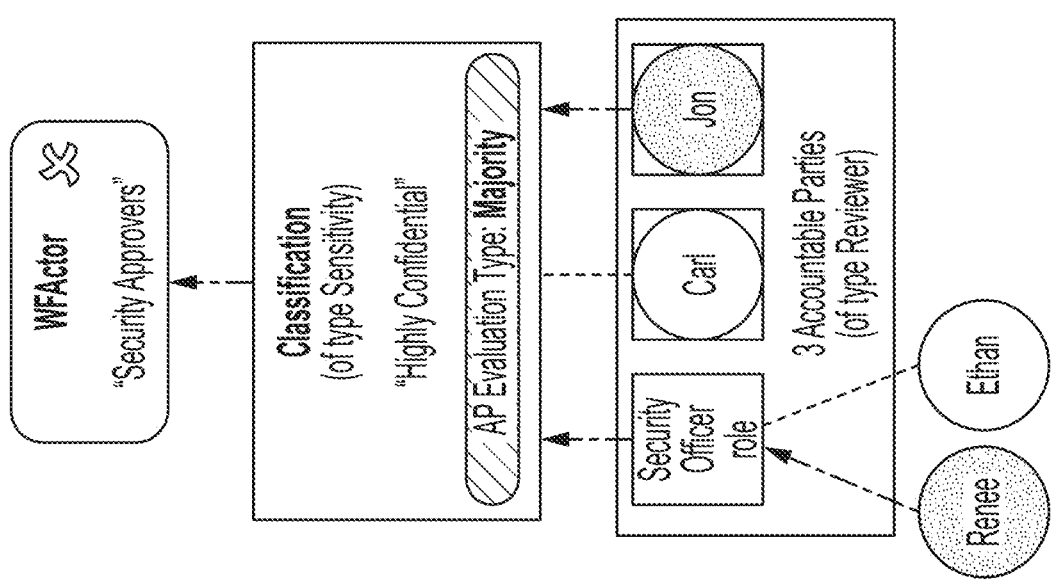
FIG. 7F is a diagram 725 illustrating a "majority" decision-making configuration for a pending change in which a majority of the identified workflow actors needs to approve the pending change, in accordance with some embodiments of the technology described herein.

In some embodiments, a majority of the assigned decision makers is needed to approve a pending change. For example, as shown in the diagram 725 of FIG. 7F, once Renee and Jon both reject a pending change, the pending change is rejected as there is no longer a way for the majority of decision makers to approve the change.

In some embodiments, the voting must be unanimous and all of the assigned decision makers are required to approve a pending change for that change to be approved. For example, as shown in the diagram 730 of FIG. 7G, a pending change is approved when Ethan and Carl and Jon all vote to approve it.

In some embodiments, there may be a decision maker authorized to override the voting scheme and votes of other decision makers. For example, such a decision maker may view the votes provided by the other decision maker and take them into consideration, but ultimately himself or herself make the final determination as to whether a pending change is to be approved or rejected.

In some embodiments, a data object may belong to multiple data object hierarchies and a decision workflow task may involve decision makers associated with each of the multiple hierarchies. In some such embodiments, a hierarchical voting scheme may be employed in which a voting scheme for each individual hierarchy must be satisfied before a pending change is approved.

Figures 7H, 7I:
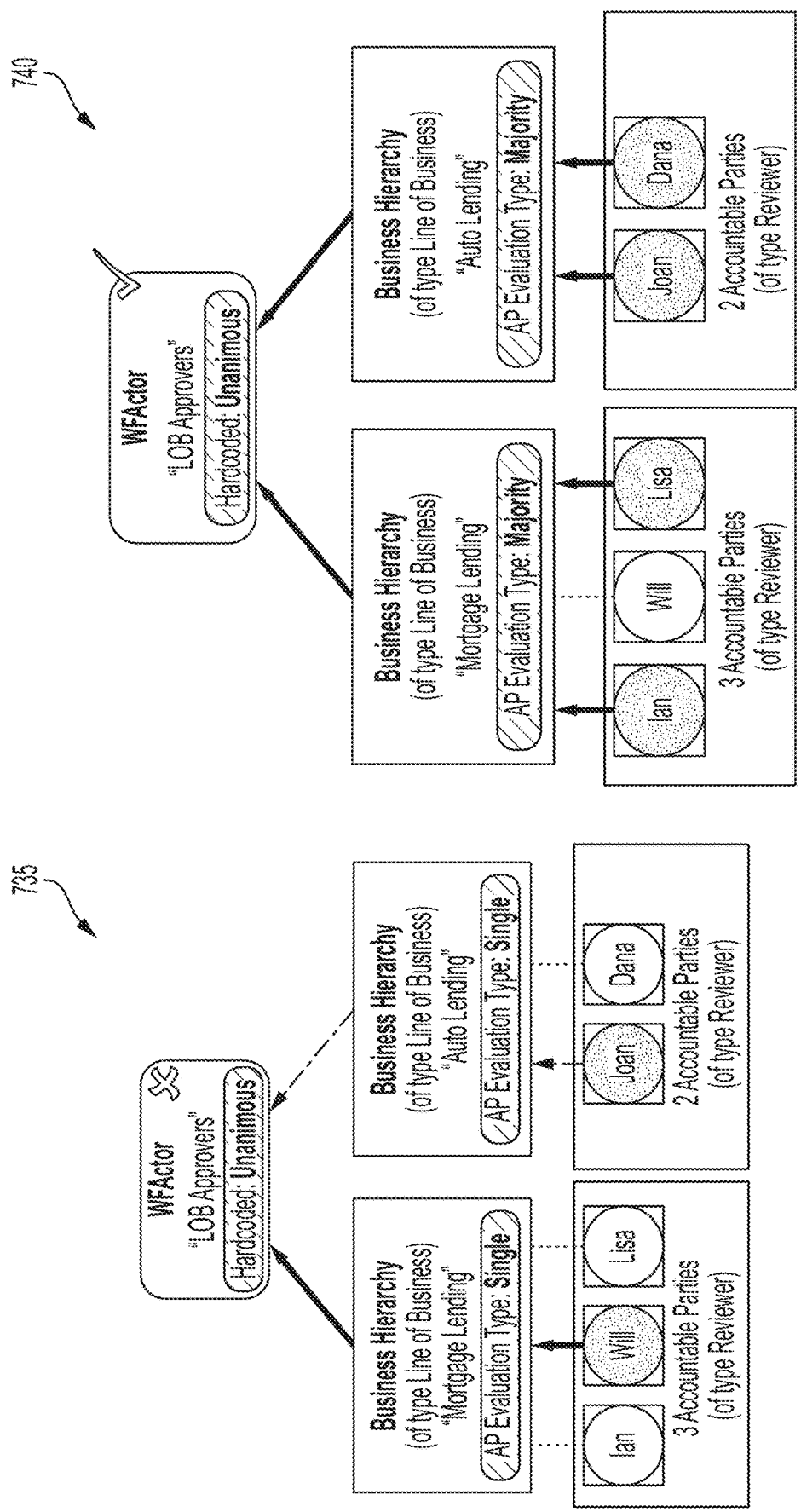
FIGS. 7H-7M illustrate a decision-making configurations for a pending change to a data object that belong to multiple object hierarchies, with each of the configurations specified with respect to each of the multiple object hierarchies, in accordance with some embodiments of the technology described herein.
Figure 7J:
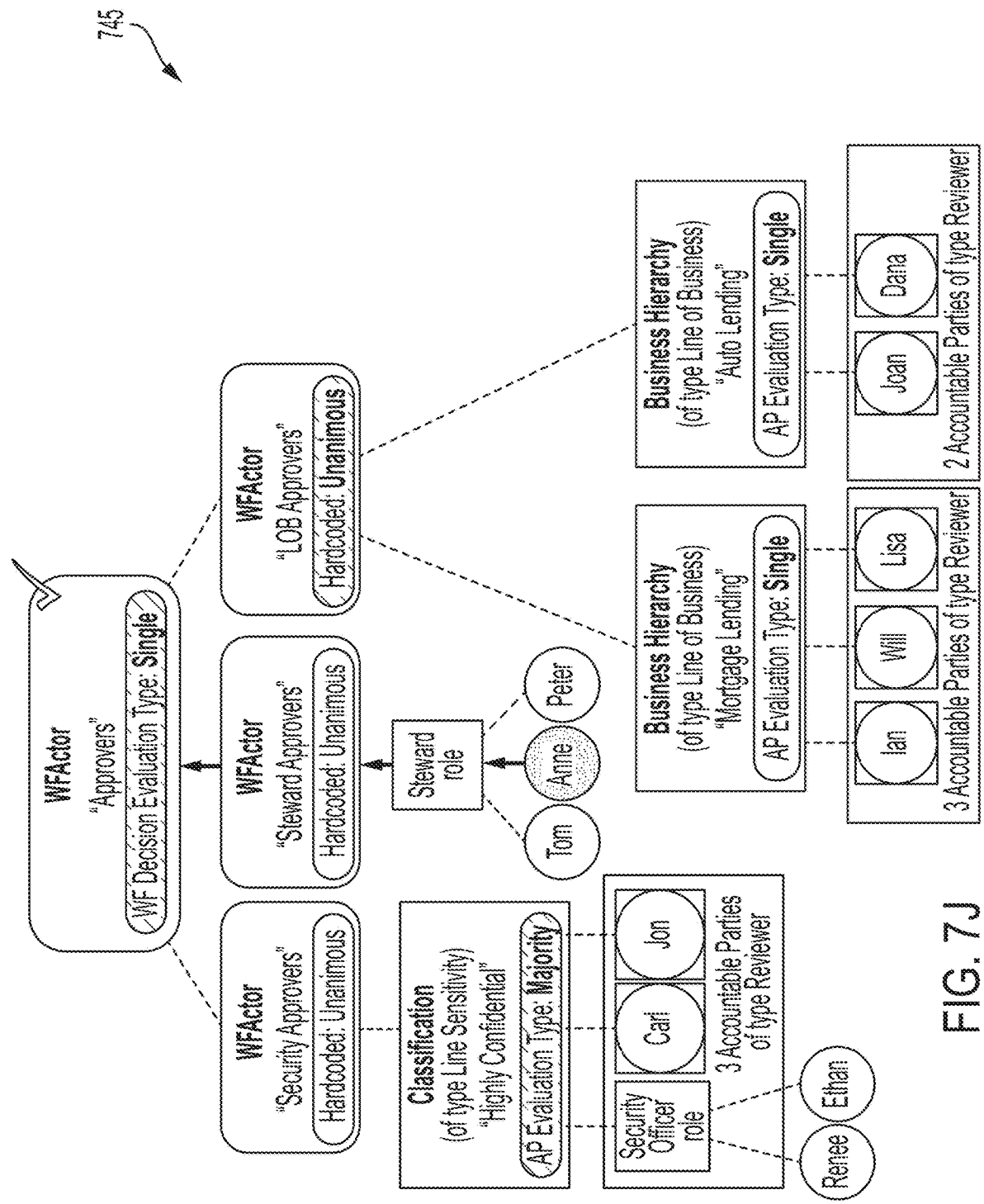

For example, as shown in the diagram 735 of FIG. 7H, a pending change to a data object would be approved by "LOB Approvers" when both: (1) a single one of the decision makers associated with the Mortgage Lending business hierarchy approves the change; and (2) a single one of the decision makers associated with the Auto Lending business hierarchy approves the change. For example, if Will (a decision maker in the Mortgage Lending hierarchy) were the first to vote and approves a pending change, then the "Approve" and "Reject" buttons will be removed from Ian's and Lisa's work queues, but the vote will remain open for Joan and Dana (decision makers in the Auto Lending hierarchy). If Joan were to approve the pending change, then the pending change would be approved, but if Joan were to reject the change, then as shown in FIG. 7H, the pending change would be rejected.

As another example, as shown in the diagram 740 of FIG. 7I, a majority approval is required for each of the multiple hierarchies. Thus, a pending change to a data object would be approved by "LOB Approvers," when both: (1) a majority of the decision makers associated with the Mortgage Lending business hierarchy approves the change; and (2) when a majority of the decision makers associated with the Auto Lending business hierarchy approves the change. For example, in the illustration of FIG. 7I, a change would be approved when Ian and Lisa and Joan and Dana approve the change.

As another example, if unanimous approval is required for each of the multiple hierarchies, a pending change to a data object would be approved by "LOB Approvers" when both: (1) all of the decision makers associated with the Mortgage Lending business hierarchy approves the change; and (2) all of the decision makers associated with the Auto Lending business hierarchy approves the change.

In some embodiments, multiple groups of decision makers may be assigned to a decision. For example, as shown in FIGS. 7J-7M, three groups of reviewers ("Security Approvers," "Steward Approvers," and "LOB Approvers") may be assigned to a decision. Approval from a single, a majority, or each one of these groups may be required. For example, as shown in diagram 745 of FIG. 7J, when approval from a single group is required, if Anne were to approve a pending change on behalf of the "Steward Approvers" group, the pending change would be approved and committed—the Approve and Reject buttons are removed from everyone else's work queue.

Figure 7K:
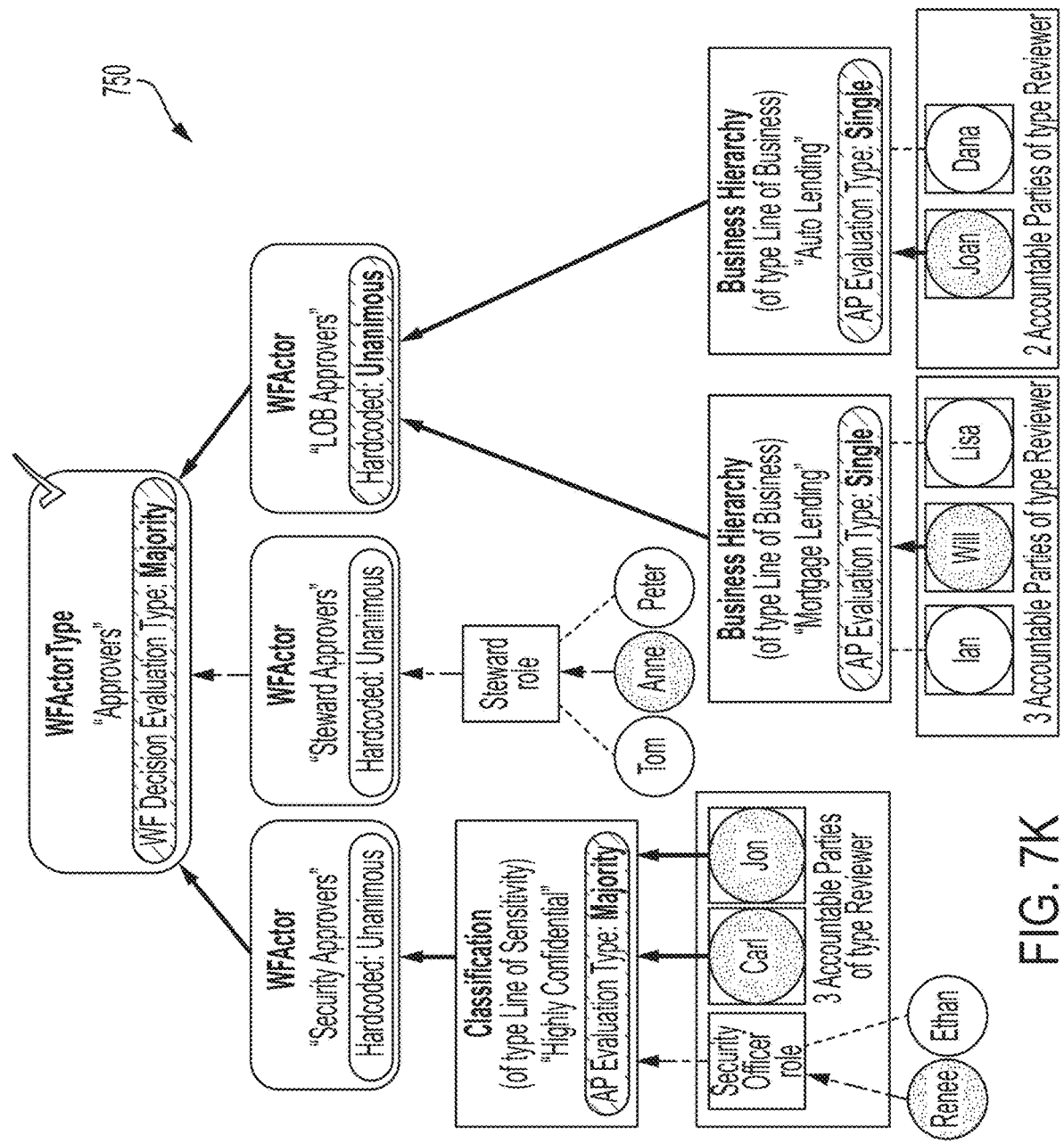

As another example, as shown in diagram 750 of FIG. 7K, when approval from a majority of groups is required, suppose that Carl and Jon were to approve the change, satisfying the majority requirement of the "Security Approvers" group, but Anne were to reject the change on behalf of the "Steward Approvers" group. The vote would remain open in this case because a majority is still possible. If Will were then to approve the change for the Mortgage Lending hierarchy and Joan were to approve the change for the Auto Lending hierarchy, the pending change would be approved overall and would be committed.

Figure 7L:
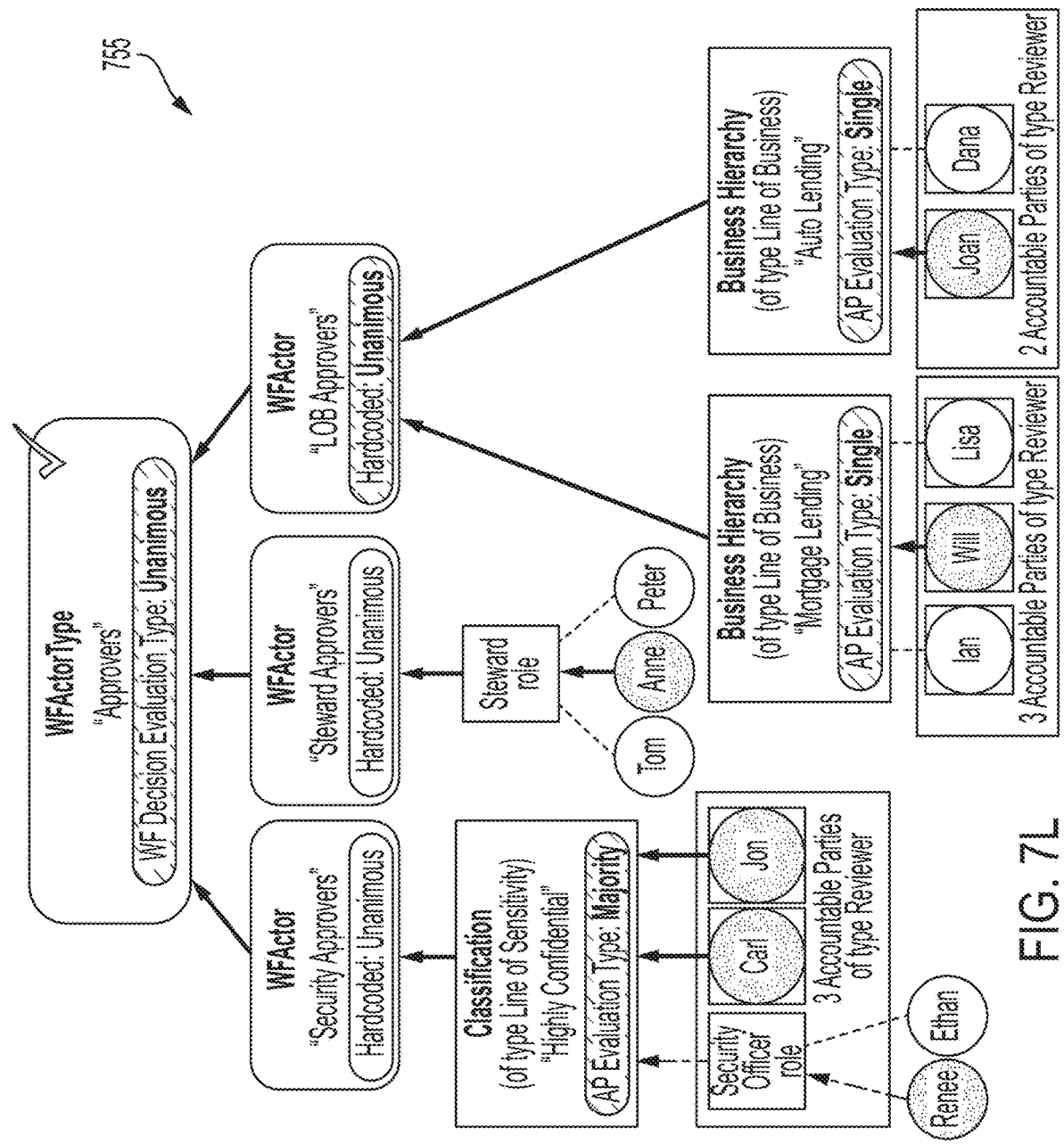
Figure 7M:
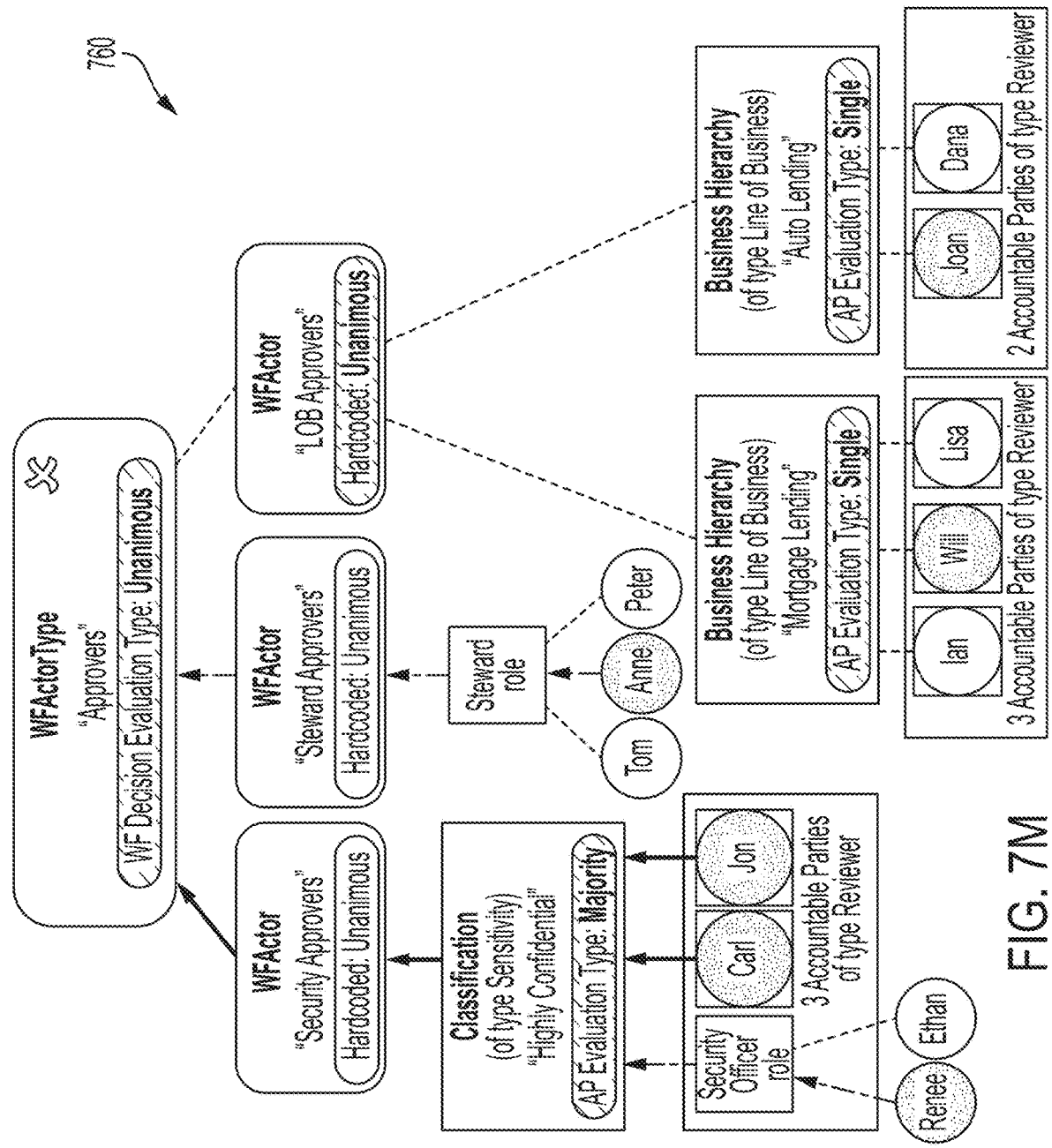

As another example, as shown in diagram 755 of FIG. 7L, when approval from all groups is required, the pending change would be approved, for instance, when: (1) Carl and John were to approve the pending change, satisfying the majority requirement of the "Security Approvers" group; (2) Anne were to approve the pending change on behalf of the "Steward Approvers" group; and (3) Will and Joan were to approve the change on behalf of the Mortgage and Auto lending hierarchies. On the other hand, as shown in diagram 760 of FIG. 7M, if Anne were to reject the pending change on behalf of the "Steward Approvers" group, a unanimous decision is no longer possible and the pending change would be rejected.

Example of Workflow Managed Using Primary and Secondary Finite State Machines

As described herein, in some embodiments, a workflow for a data object may be managed using one or more finite state machines. For example, a workflow for making changes to a data object may be managed using a primary finite state machine and one or more secondary finite state machines (e.g., to manage fine-grained changes to attributes of the data object). In addition, as described herein, in some embodiments, graphical user interfaces may be generated and presented to various actors to perform workflow tasks in a workflow for a data object. Aspects of these embodiments are further described below with reference to the example workflow for managing changes to a business term data object illustrated in FIGS. 8A-8N.

Figure 8A:
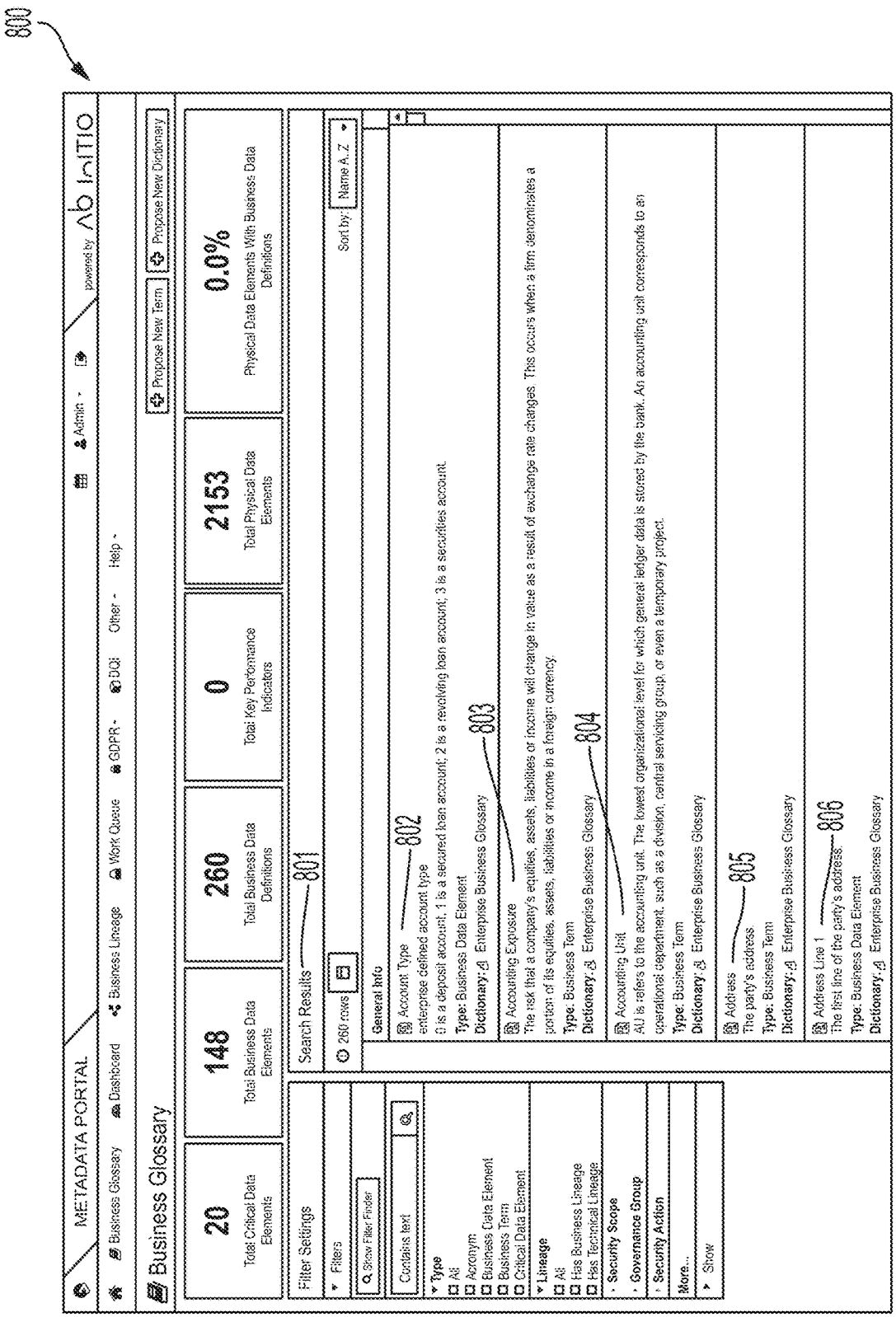
FIG. 8A is a view of a GUI 800 showing multiple business term data objects, in accordance with some embodiments of the technology described herein.

FIG. 8A is a view of a graphical user interface 800 showing multiple business term data objects, in accordance with some embodiments of the technology described herein. GUI 800 provides information about business term data objects for business terms in a business glossary containing 260 business term data objects. GUI 800 includes a "search results" pane 801 showing a listing of the first few of the 260 business term data objects, in an alphabetically sorted order, including: the "Account Type" data object 802, the "Accounting Exposure" data object 803, the "Accounting Unit" data object 804, the "Address" data object 805, and the "Address Line 1" data object 806.

In response to an actor selection of a business term data object through GUI 800, the data processing system may provide the actor with information about the selected business term data object. For example, in response to an actor selection of the "Accounting Exposure" data object 803, the data processing system may generate a GUI to provide the actor with information about the data object 803 such as, for example, the GUI 810 shown in FIG. 8B.

Figure 8B:
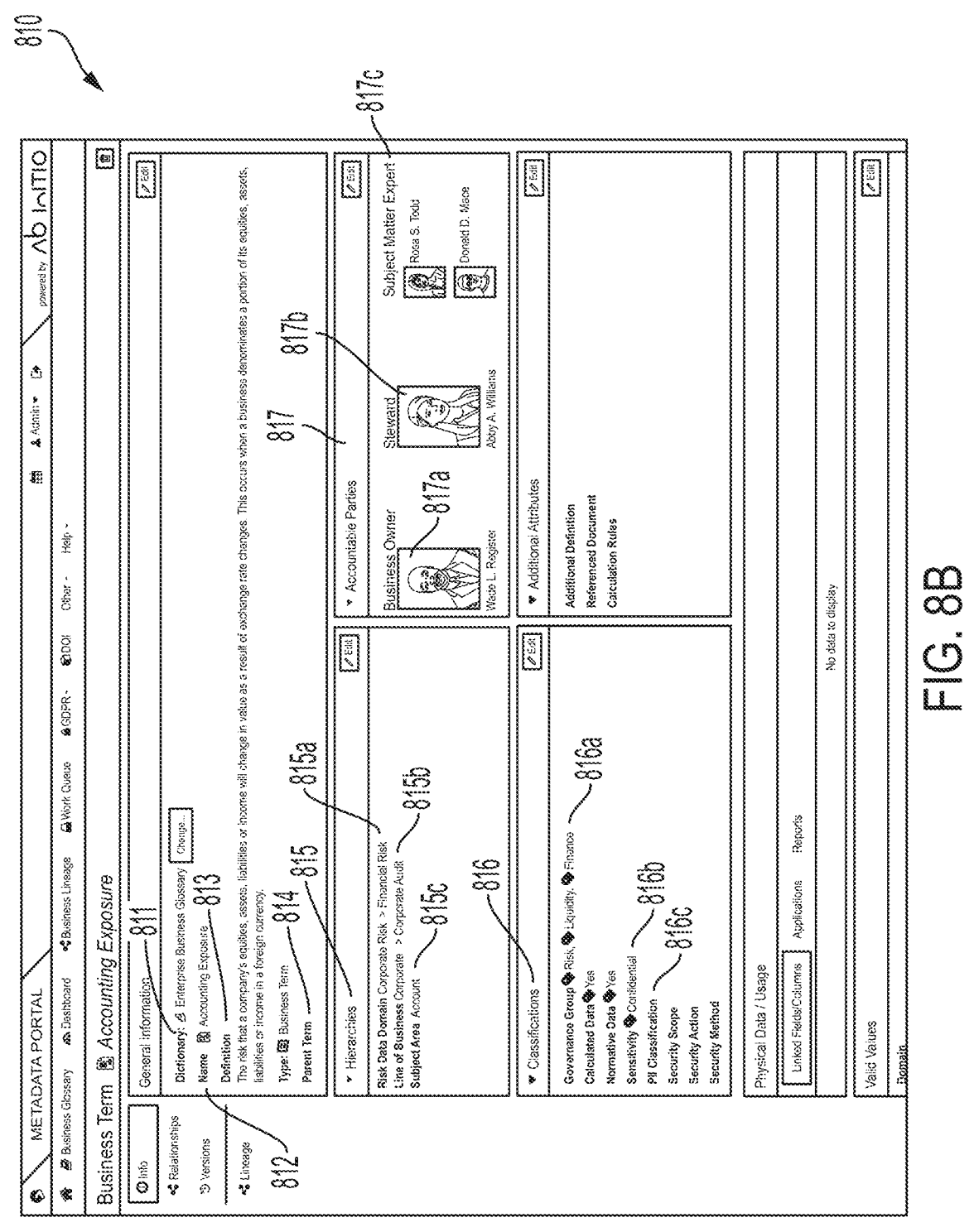

As shown in FIG. 8B, GUI 810 displays, among other things, information about attributes of the data object 803. For example, GUI 810 indicates the values of attributes including, among others, values of the following attributes: (1) the dictionary attribute 811 whose value ("Enterprise Business Dictionary," in this example) indicates the Dictionary to which the business term represented by the BTDO belongs; (2) the name attribute 812 whose value ("Accounting Exposure," in this example), indicates an identifier or name of the BTDO; (3) the definition attribute 813 whose value ("The risk that a company's equities, assets, liabilities or income will change in value as a result of exchange rate changes. This occurs when a firm denominates a portion of its equities, assets, liabilities or income in a foreign currency," in this example) provides a definition for the BTDO; (4) the parent term attribute 814 whose value indicates a parent data object of the BTDO in at least one hierarchy; (5) the hierarchies attribute 815, which may be a list of one or more hierarchies to which the BTDO belongs (including the "Financial Risk" hierarchy 815*a*, the "Corporate Audit" hierarchy 815*b*, and the "Account" hierarchy 815*c*, in this example); (6) various classification attributes 816, including the governance group classification attribute 816*a*, which may be a list of one or more governance groups to which the BTDO belongs ("Risk," "Liquidity" and "Finance", in this example), the sensitivity classification attribute 816*b* which indicates the sensitivity level of the BTDO (e.g., "Internal", "Public", "Confidential" and "Highly Confidential"), and the personally identifiable information ("PII") classification attribute 816*c* (e.g., "Level 1", "Level 2," etc.); (7) various accountable parties attributes 817 including the business owner attribute 817*a* ("Wade L. Register", in this example), the steward attribute 817*b* ("Abby A. Williams," in this example), and the Subject Matter Expert attribute 817*c* ("Rosa S. Todd" and "Donald D. Mace", in this example).

Figure 8C:
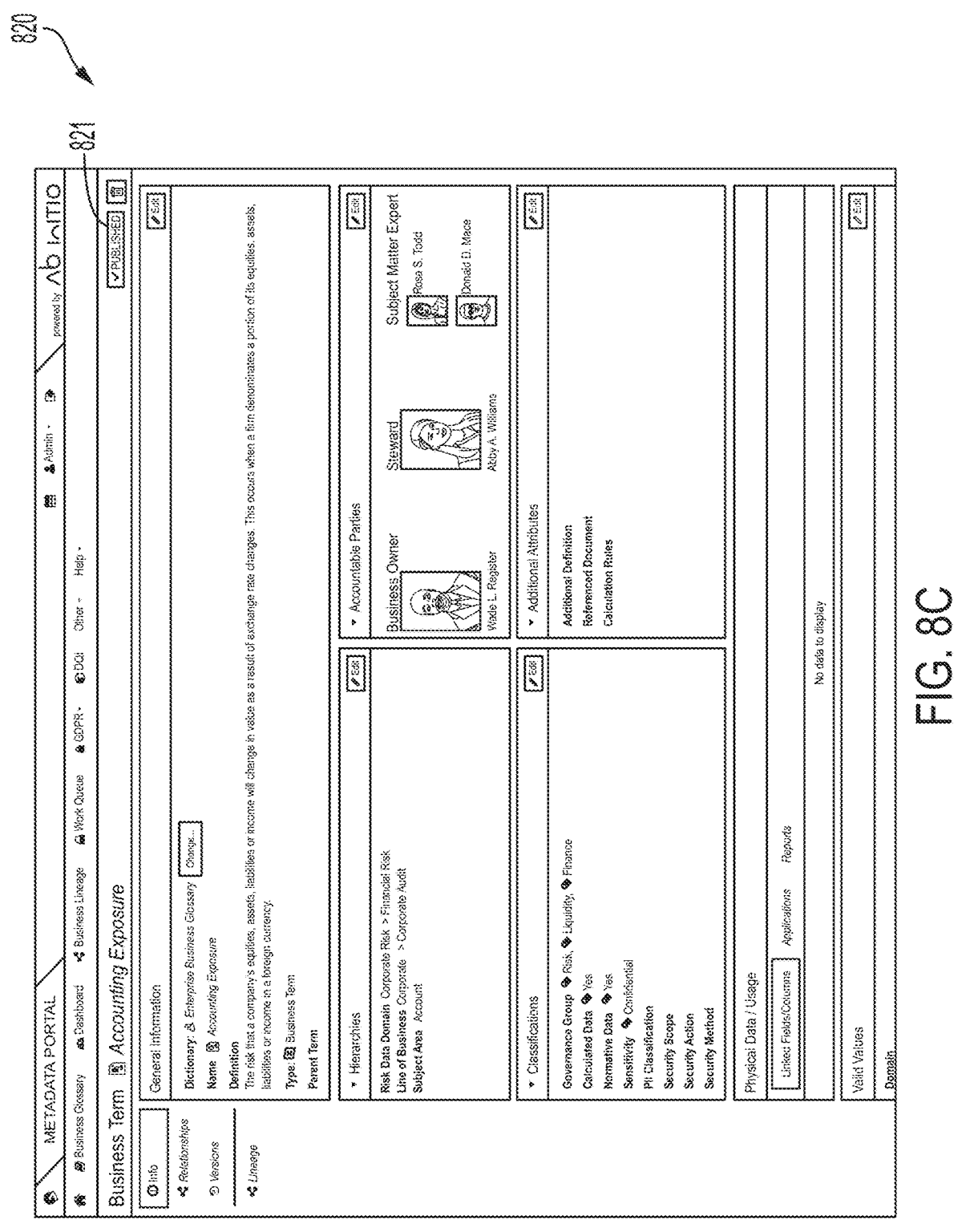

Various actors may be authorized to perform different actions for a business term data object. In this example, "Abby A. Williams" or "Abby" is the steward for the "Accounting Exposure" business term data object 803, and is authorized to make changes to this data object. Abby is able to make these changes through a graphical user interface, for example, like the GUI 820 shown in FIG. 8C that Abby may see upon logging into the data processing system. In this example, changes to the "Accounting Exposure" data object may be managed using the primary finite state machine and secondary finite state machines illustrated in FIGS. 9A-9D and 10, described below. Alternatively, the changes may be managed using the finite state machines described with reference to FIGS. 4A-4D and 5A-5C. As shown by GUI element 821, in FIG. 8C, the current state of the primary finite state machine for managing changes to the data object 803 is the "published" state.

Figure 8D:
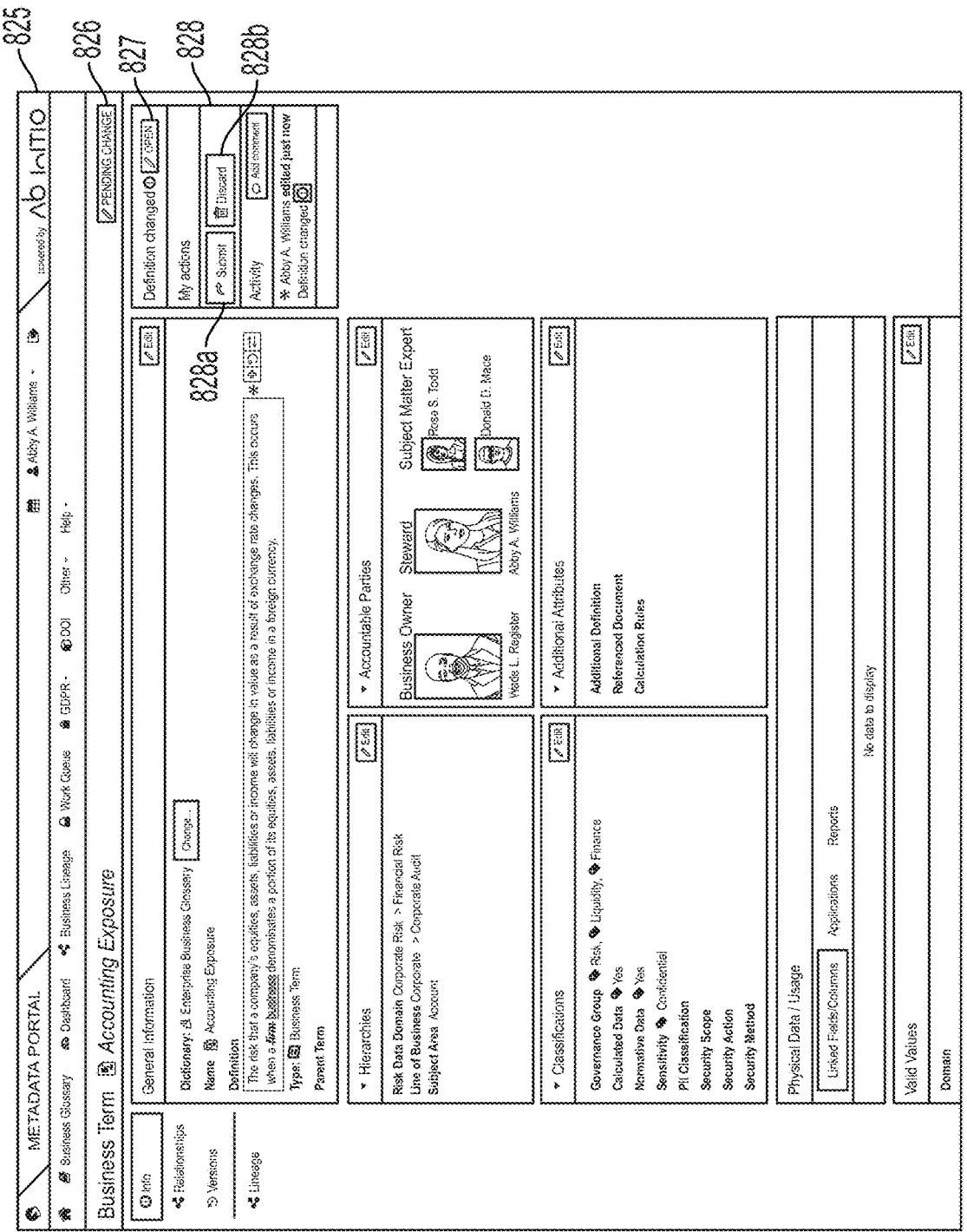
FIG. 8D is a view of a GUI 825 showing how an actor's change to the value of a first attribute of the data object results in: (1) a change to the current state of the finite state machine for managing a workflow for the business term data object; and (2) instantiation of a secondary finite state machine for managing the approval process for the change of the value of the first attribute, in accordance with some embodiments of the technology described herein.
Figure 8E:
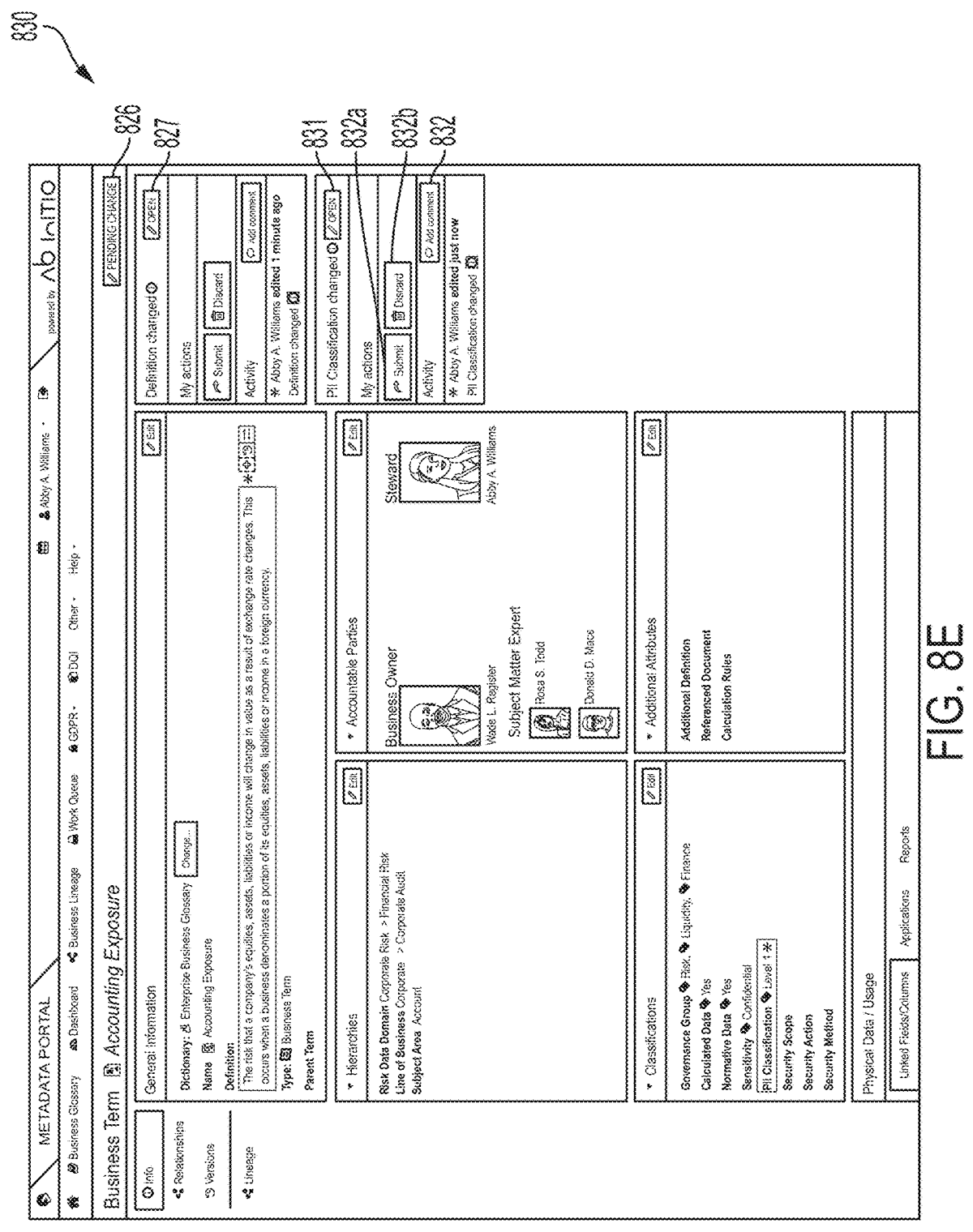
Figure 8F:
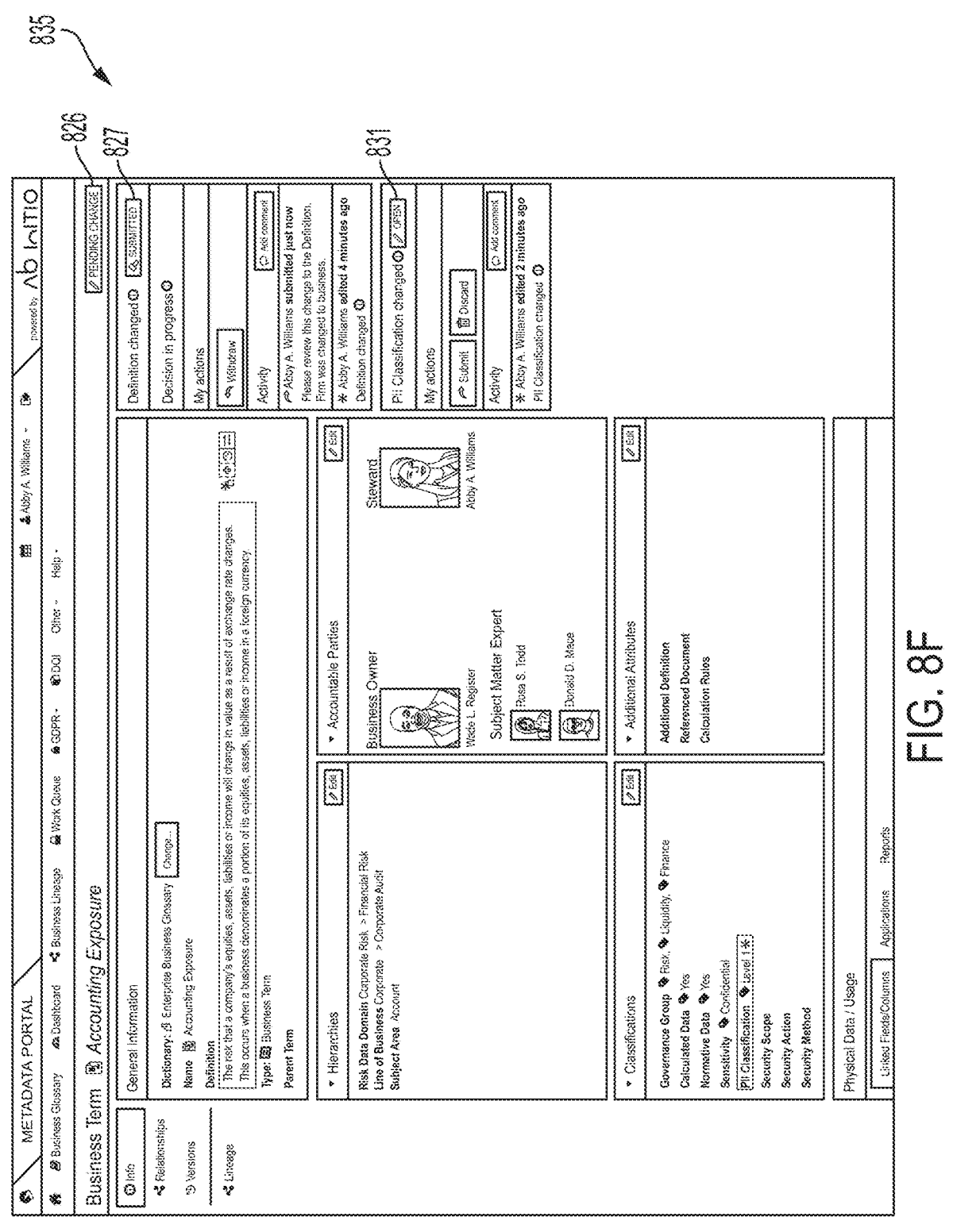
Figure 8G:
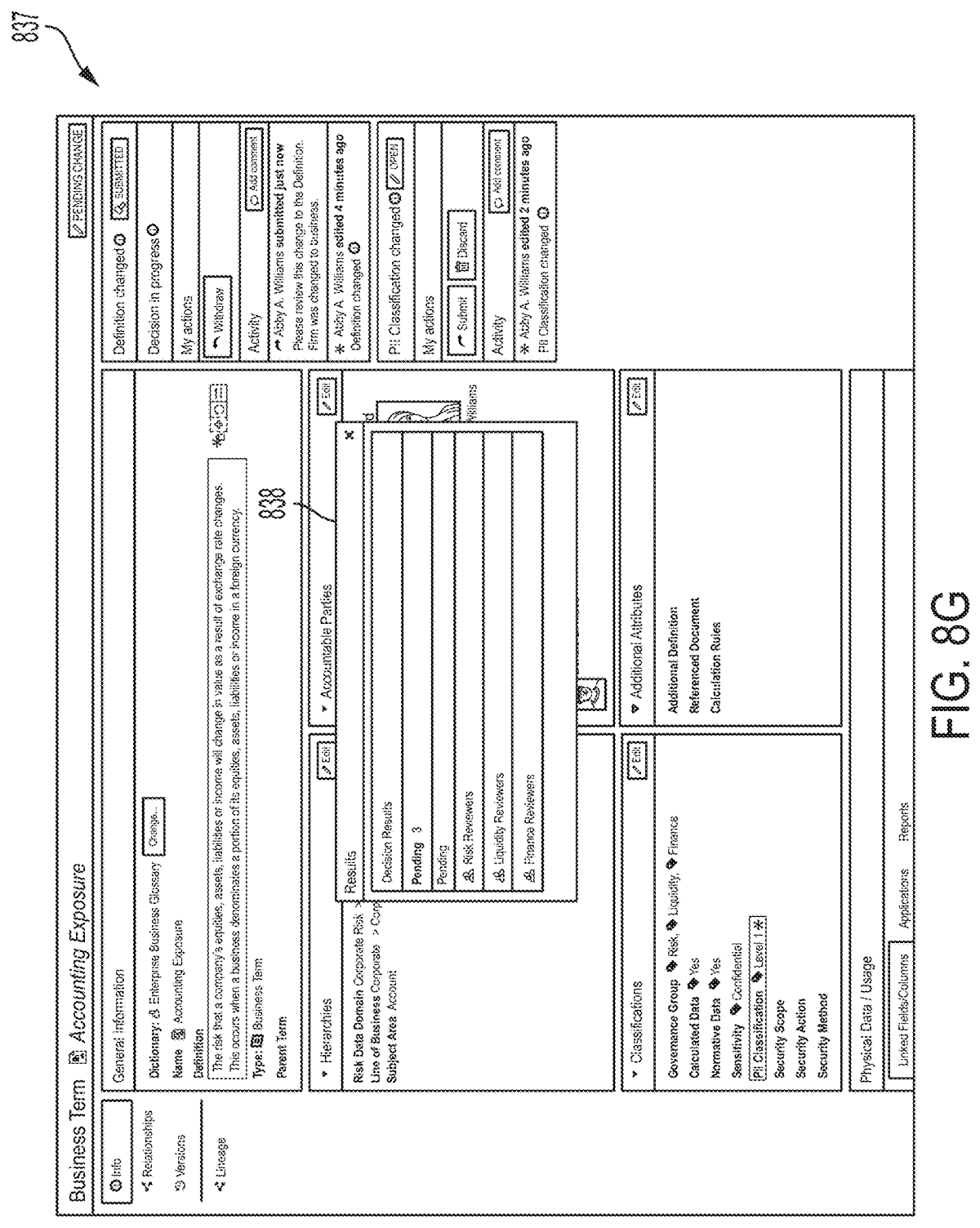
Figure 8J:
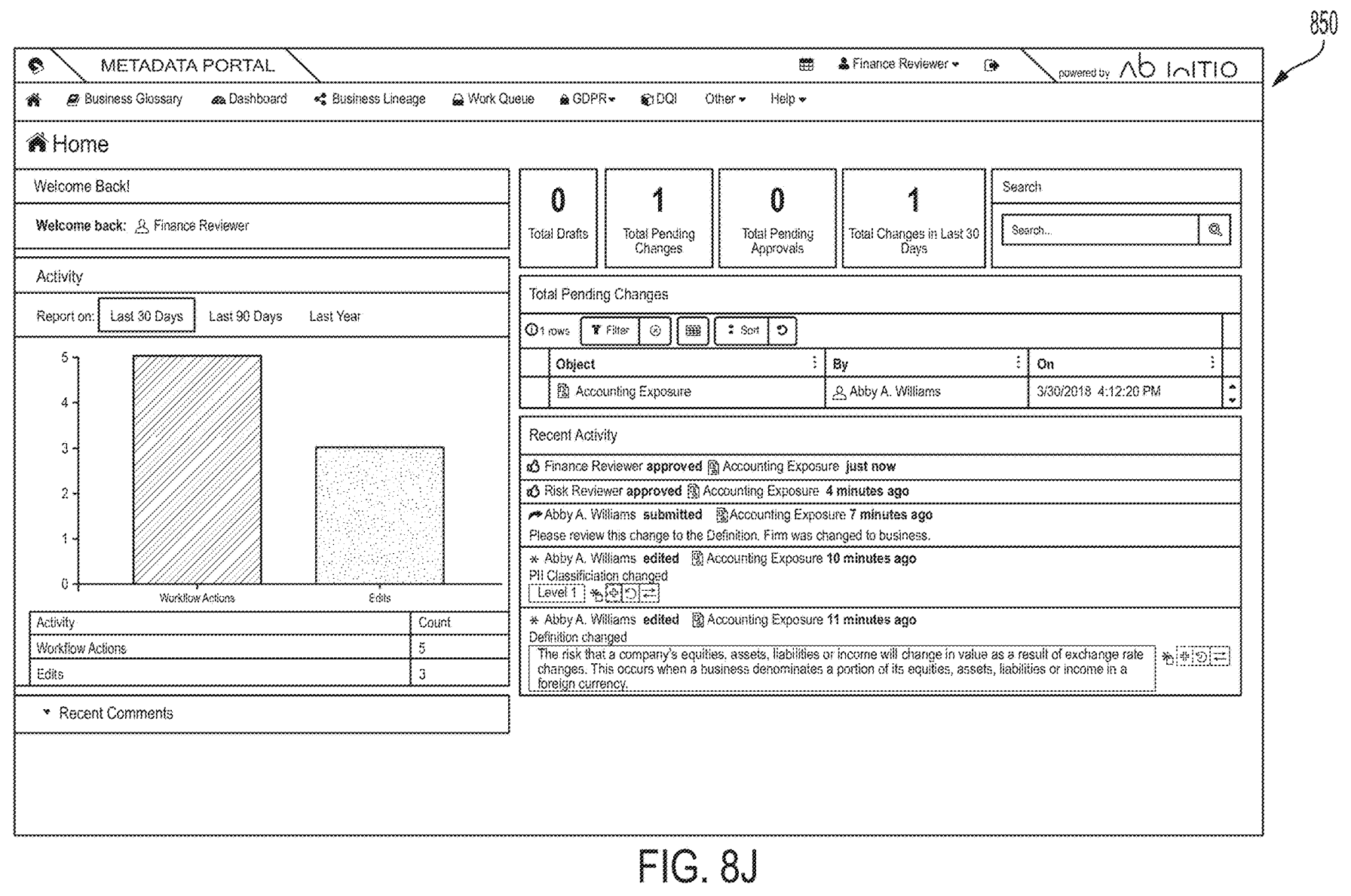
Figure 8K:
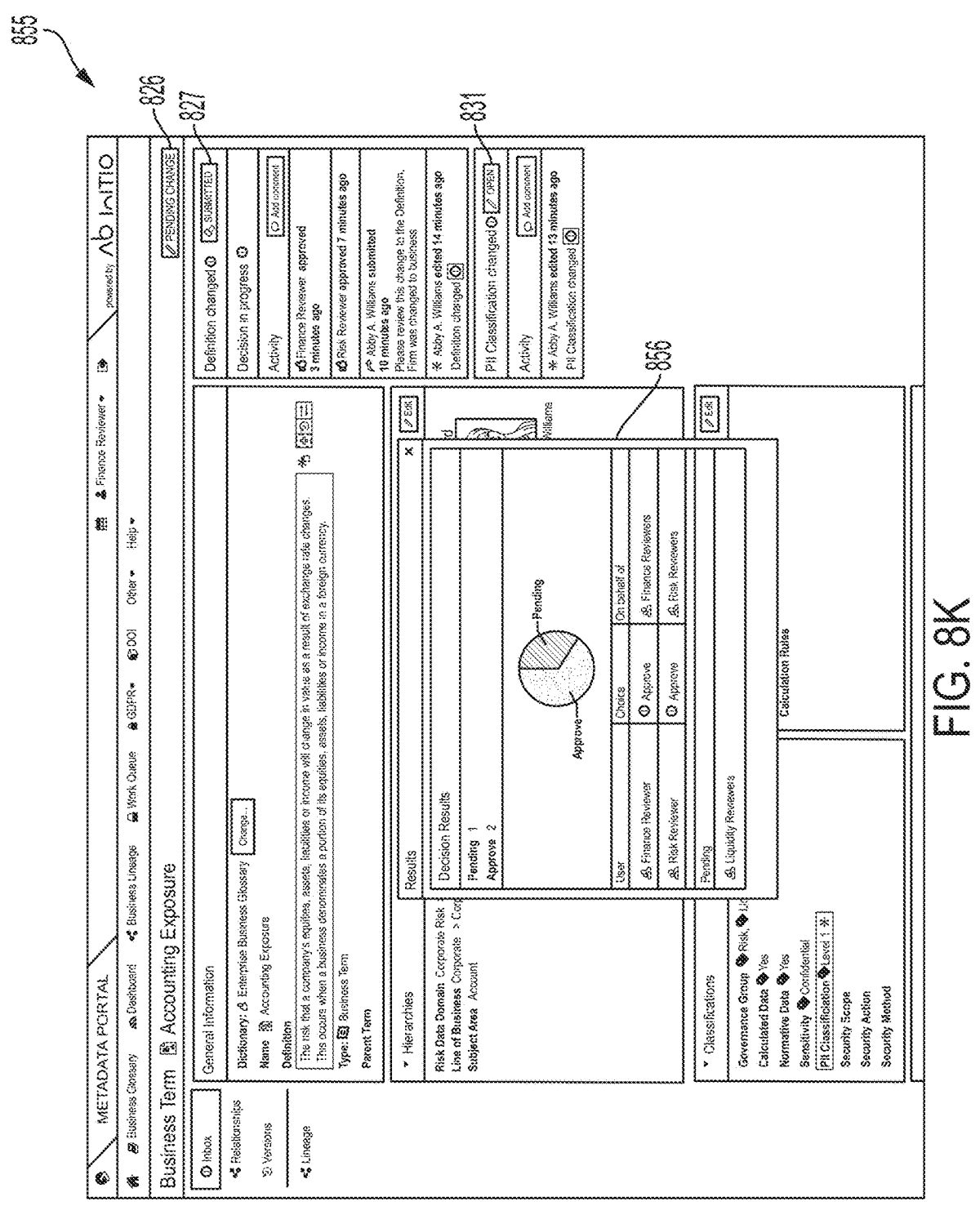
Figure 8L:
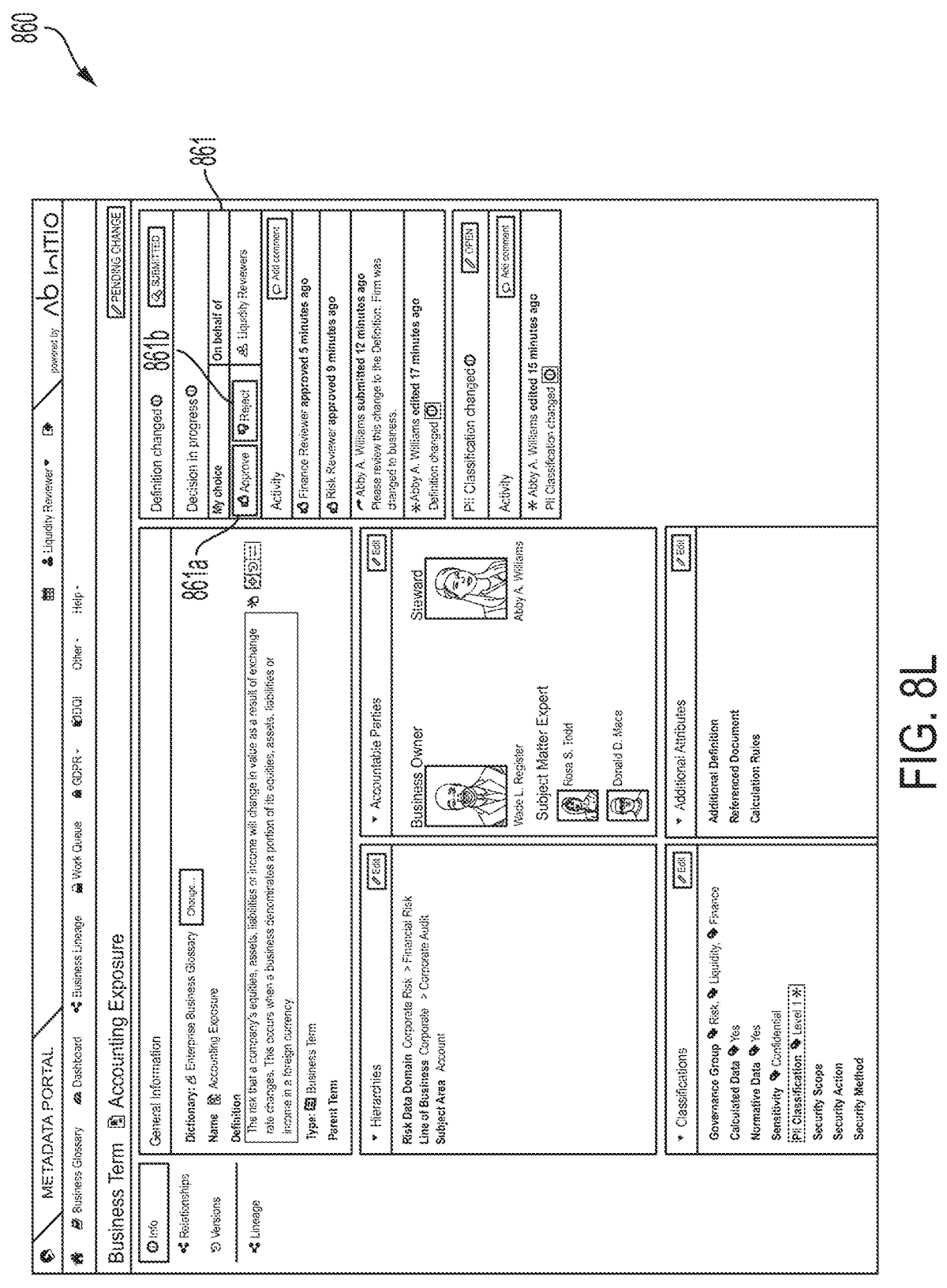
Figure 8M:
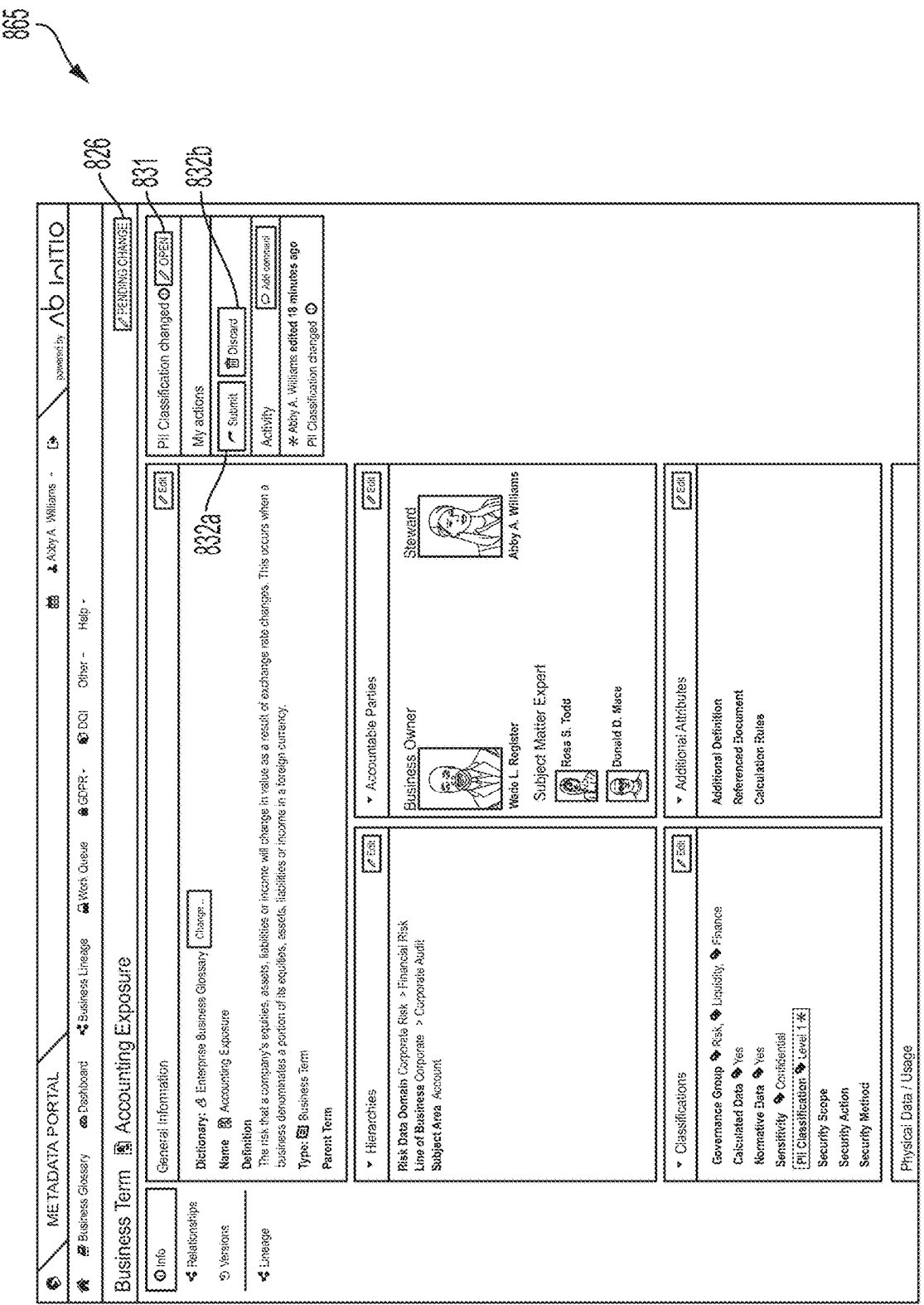
FIG. 8M is a view of a GUI 865 showing that a change to one attribute value of a data object has been approved, but that approval for a change to another attribute value of the data object remains pending, in accordance with some embodiments of the technology described herein.

In this example, Abby changes the value of the definition attribute 813 through the GUI interface 820. As a result, as shown by GUI element 826 in the GUI interface 825 of FIG. 8D, the state of the primary state machine changes from the "published" state to the "pending approval" state. In addition, as a result of this change, a secondary finite state machine is instantiated for managing the workflow of approving the change to the value of the definition attribute 813. As shown by the GUI element 827, the state of the secondary finite state machine is "Open." When the current workflow state of the secondary FSM is the "Open" state, Abby is authorized to submit the change to the definition attribute 813 for review or discard the change, and for this purpose the data processing system generates the GUI portion 828 having buttons 828a and 828b to allow her to perform one of these actions.

Next, as shown by the GUI 830 of FIG. 8E, Abby makes another change to the data object 803 by changing the value of the PII classification attribute 816c. As a result of this change, another secondary finite state machine is instantiated for managing the workflow of approving the change to the value of the PII classification attribute 816. As shown by the GUI element 831, the state of this secondary FSM is the "Open" state. When the current workflow state of the secondary FSM is the "Open" state, Abby is authorized to submit the change to the PII classification attribute 816c for review or discard the change, and for this purpose the data processing system generates the GUI portion 832 having buttons 832a and 832b to allow her to perform one of these actions.

Next, Abby submits the change to the definition attribute 813 for review using the button 828a. As a result, the state of the secondary finite state machine for managing this change transitions to the "submitted" state, as shown by GUI element 836 in GUI 835 of FIG. 8F. As shown in pane 838 in GUI 837 of FIG. 8G, this submitted change is to be approved by three reviewers—a risk reviewer, a liquidity reviewer, and a finance reviewer.

Next, in this example, a risk reviewer logs in and is presented with a GUI 840, shown in FIG. 8H, through which she may approve or reject the submitted change to the value of the definition attribute 813. The risk reviewer may take this action through the Approve and Reject buttons 841a and 841b, respectively.

Next, in this example, a finance reviewer logs in and is presented with a GUI 845, shown in FIG. 8I, through which he may approve or reject the submitted change to the value of the definition attribute 813. The finance reviewer may take this action through the Approve and Reject buttons 846a and 846b, respectively. Prior to taking this action, the finance review may see through GUI portion 847 that one other reviewer has approved the change, but two reviewers (i.e., the finance reviewer and the liquidity reviewer) have not yet submitted their decisions, which are still pending.

After approving the submitted change to the value of definition attribute 813, the finance reviewer may view his work queue through the GUI 850 illustrated in FIG. 8J.

Next, in this example, Abby logs in to see whether the change she submitted for the definition attribute 813 has been approved. Through the GUI 855 shown in FIG. 8K, Abby can see in GUI portion 856, that the change has been approved by two out of the three reviewers, but one approval (from the liquidity reviewer) is still pending.

Next, in this example, a liquidity reviewer logs in and is presented with a GUI 860, shown in FIG. 8L, through which she may approve or reject the submitted change to the value of the definition attribute 813. The liquidity reviewer may take this action through the Approve and Reject buttons 861a and 861b, respectively, shown in pane 861.

As a result of all three reviewers approving the submitted change, the change is approved, and instance of the secondary finite state machine for managing the approval process for this change completes and is deleted. Next, when Abby logs in to check on the status of her submission, she is presented with GUI 865 shown in FIG. 8L that indicates that her submitted change to the value of the definition attribute 813 has been approved.

Notwithstanding, Abby has to decide what action to take with respect to her proposed change to the PII classification attribute 816c. In this example, Abby discards the change by using the button 831b. With the first change approved and the second change discarded, there are no further pending changes, and the current workflow state of the primary finite state machine transitions to the "published" state from the "pending approval" state, as shown by the GUI element 871 of GUI 870 shown in FIG. 8N.

As may be appreciated from the foregoing example, using secondary finite state machines allows for the workflows for making changes to different attributes to proceed independently of one another.

FIG. 9A is a view of a graphical user interface 910 showing a listing of finite state machine specifications, in accordance with some embodiments of the technology described herein. The graphical user interface 910 may be generated by a data processing system (e.g., by GUI generation module 134) to provide the actor with a GUI through which to review, edit, add, and/or delete finite state machine specifications. In the illustrative example of FIG. 9A, the GUI 910 shows a listing of multiple different finite state machine specifications including specifications for the import state machines described with reference to FIGS. 6A and 6B, as well as the primary and secondary state machines used to enable the workflows illustrated in FIGS. 8A-8N.

Figure 8N:
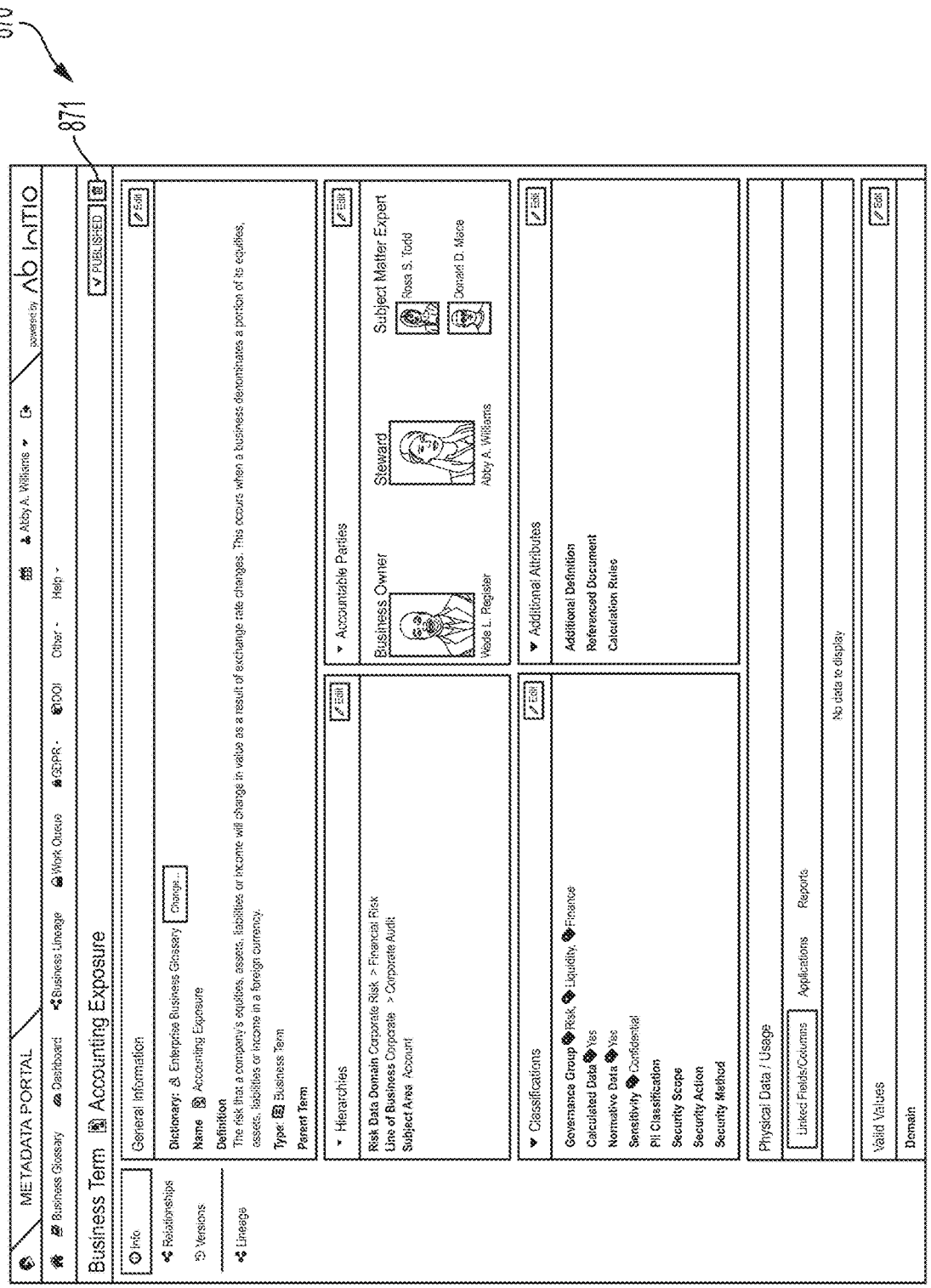
FIG. 8N is a view of a GUI 870 showing that the current state of the finite state machine for the data object has been updated to the "published" state, in accordance with some embodiments of the technology described herein.
Figure 9B:
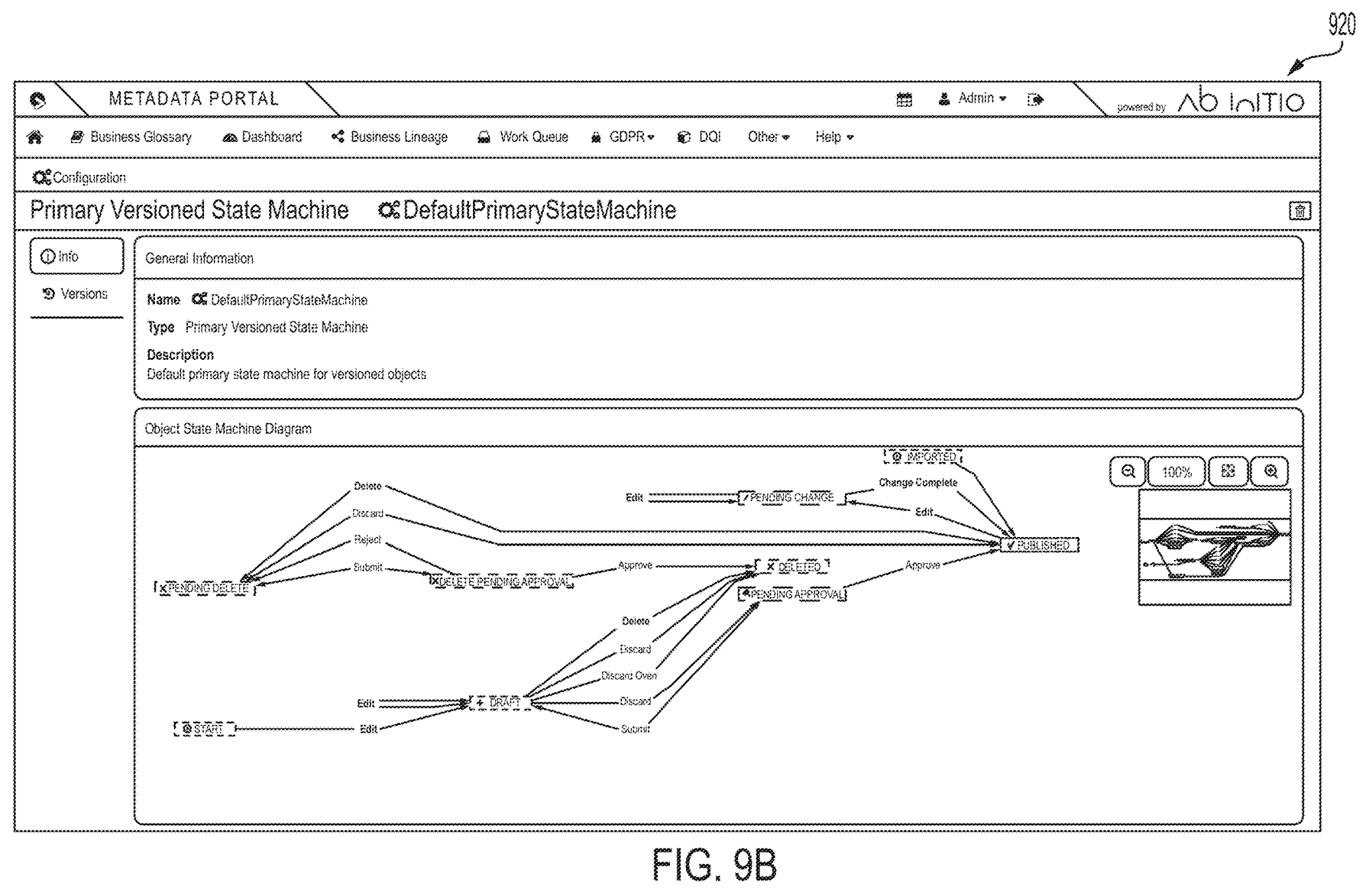
Figure 9D:
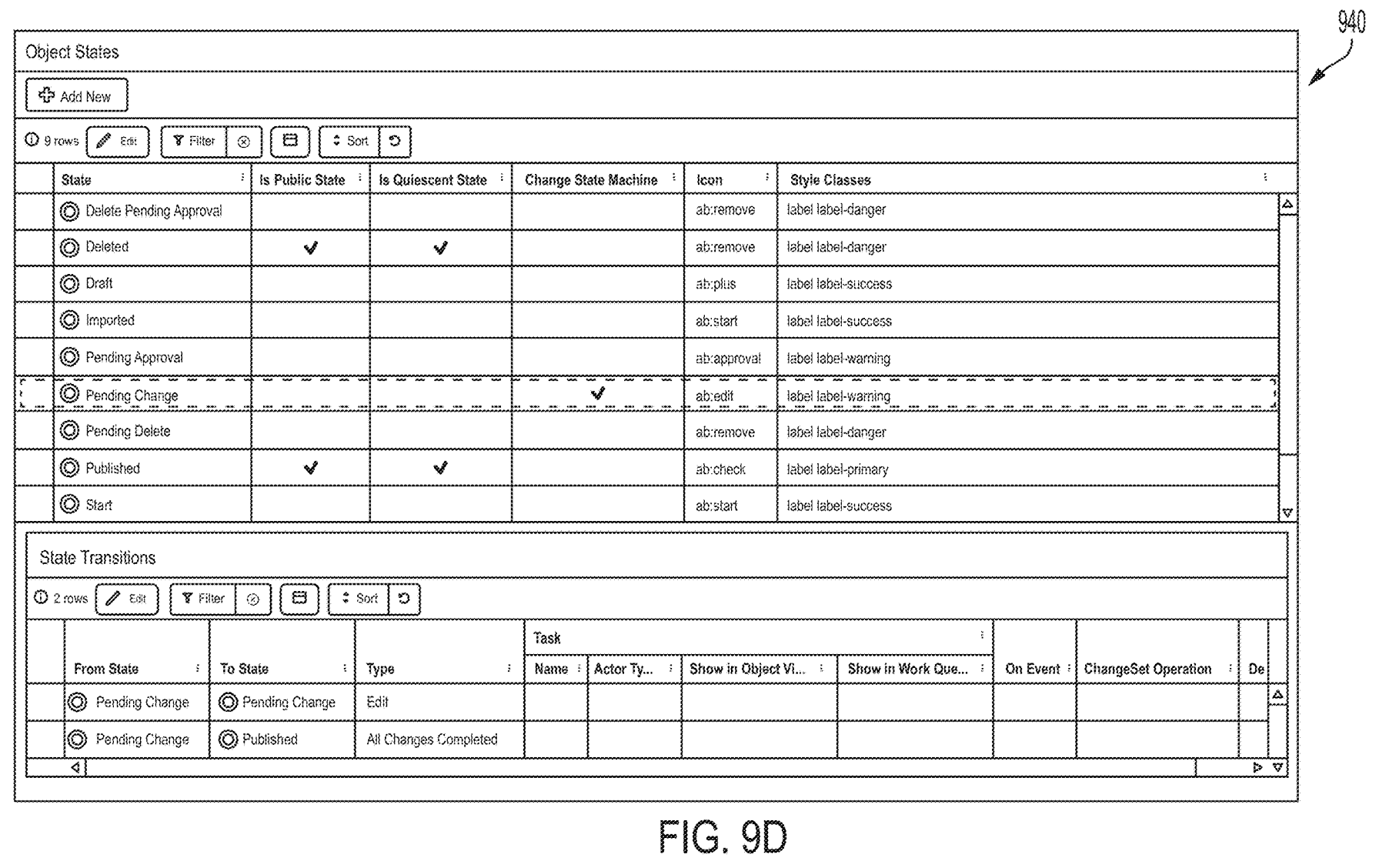

FIG. 9B is a view of a graphical user interface 920 showing a primary finite state machine for managing changes to the data object in the examples of FIGS. 8A-8N, in accordance with some embodiments of the technology described herein. The GUI 920 may be presented to an actor in response to the actor selecting to view the state diagram for this state machine through GUI 910.

FIG. 9C is a view of a graphical user interface 930 through which states of the FSM shown in FIG. 9B may be reviewed, added, deleted, and/or edited. For example, user interface 930 may be used to edit properties of the states (e.g., by specifying which of the states, if any, is quiescent, associated with a secondary finite state machine, etc.). Also, as shown in FIG. 9C, an actor may select a state and edit the transitions associated with the state. For example, as shown in FIG. 9C, in response to an actor's selection of the "start" state in the state table, the actor may be presented with a table of transitions associated with the start state. As another example, as shown in GUI 940 of FIG. 9D, in response to an actor's selection of the "pending change" state in the state table, the actor may be presented with a table of transitions associated with the "pending change" state.

Figure 10:
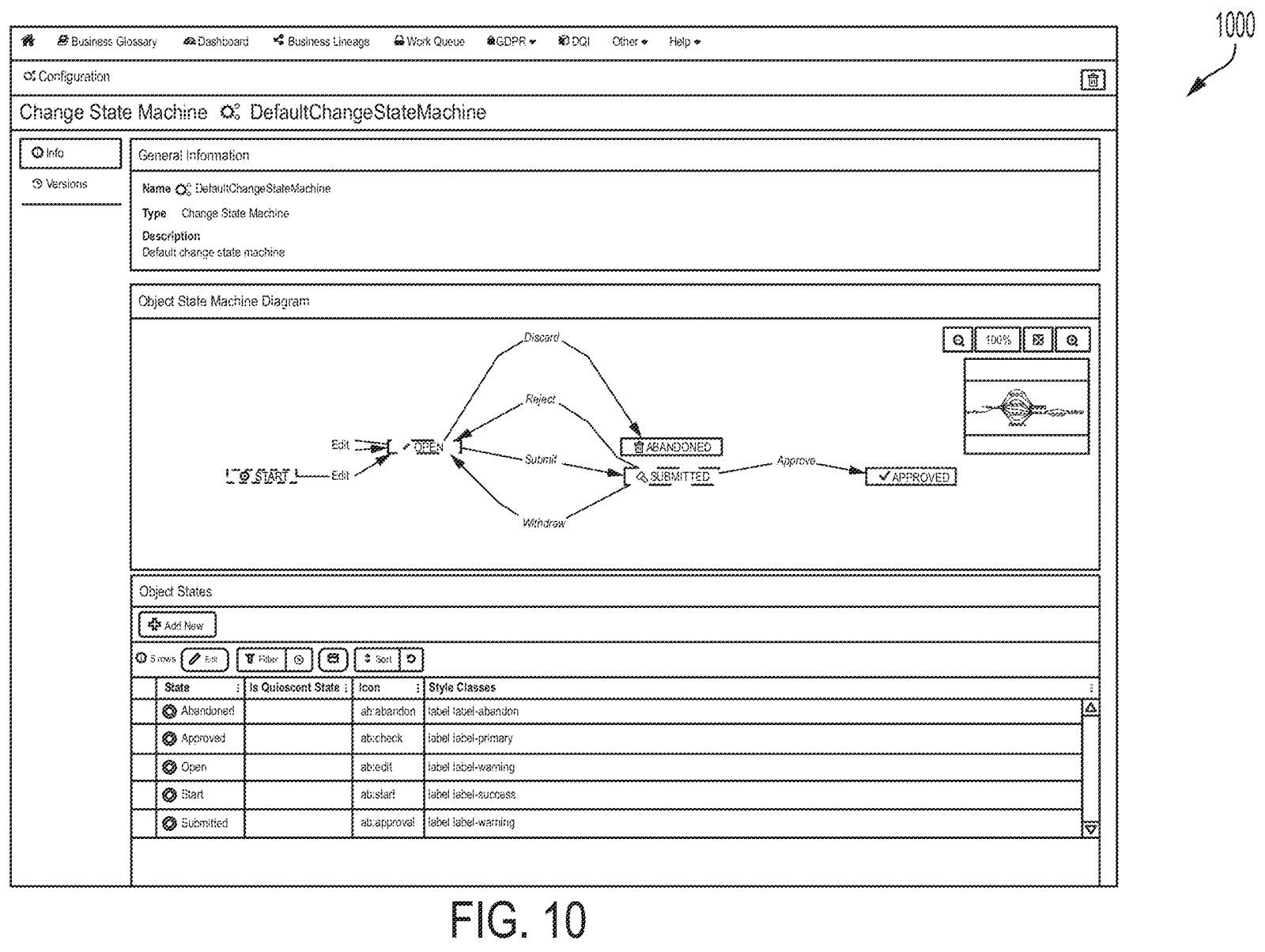

FIG. 10 is a view of a graphical user interface 1000 showing a secondary finite state machine for managing changes to attributes of the data object in the examples of FIGS. 8A-8N, in accordance with some embodiments of the technology described herein. GUI 1000 also shows a table of states of the secondary finite state machine, and their respective properties. States (and their associated transitions) may be edited, deleted, added, and/or reviewed through GUI 1000.

Additional Implementation Detail

Figure 11:
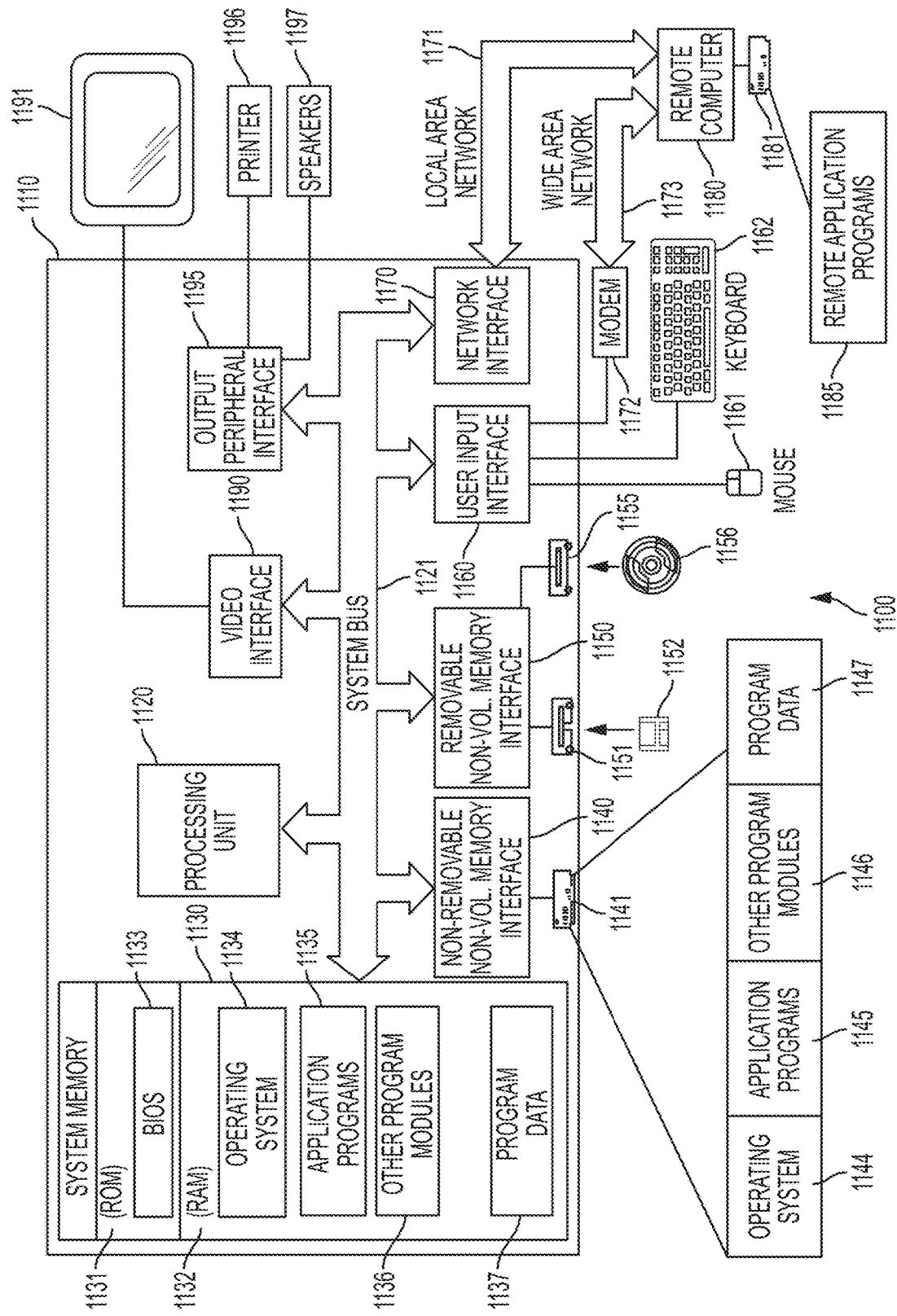
FIG. 11 is a block diagram of an illustrative computing system environment that may be used in implementing some embodiments of the technology described herein.

FIG. 11 illustrates an example of a suitable computing system environment 1100 on which the technology described herein may be implemented. The computing system environment 1100 is only one example of a suitable computing environment and is not intended to suggest any limitation as to the scope of use or functionality of the technology described herein. Neither should the computing environment 1100 be interpreted as having any dependency or requirement relating to any one or combination of components illustrated in the exemplary operating environment 1100.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the technology described herein includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1036, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a flash drive 1151 that reads from or writes to a removable, nonvolatile memory 1152 such as flash memory, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. An actor may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the actor input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor." It should be appreciated that an "actor" need not be a single individual, and that in some embodiments, actions attributable to an "actor" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for managing workflows for data objects persisted in at least one database of a data processing system, the data processing system comprising:
   (i) the at least one database storing:
      a plurality of data objects each representing a respective term in an enterprise glossary and storing values of attributes of the respective term, the attributes comprising a name attribute, a definition attribute, a hierarchy attribute, and/or one or more classification attributes, the plurality of data objects including a first data object, the first data object having a plurality of attributes including a first hierarchy attribute; and
      metadata specifying relationships among at least some of the plurality of data objects by specifying one or more hierarchies of data objects including a first hierarchy; and
   (ii) a workflow management system comprising: a workflow execution engine for managing execution of finite state machines (FSMs) including a first FSM associated with the first data object and for managing a first workflow for the first data object, the first FSM comprising a plurality of workflow states and a plurality of transitions corresponding to respective tasks of the first workflow, the method comprising:
   using the workflow management system and the first FSM associated with the first data object to manage the first workflow for the first data object at least in part by:
      accessing a current value of the first hierarchy attribute of the first data object in the at least one database, the current value of the first hierarchy attribute indicating at least one of the one or more hierarchies to which the first data object belongs, the at least one hierarchy including the first hierarchy;
      identifying, using the current value of the first hierarchy attribute and the first hierarchy, a first actor authorized to perform a first workflow task for the first data object, the first workflow task corresponding to a first one of the plurality of transitions of the first FSM that transitions the first FSM from a first workflow state in the plurality of workflow states to a second workflow state in the plurality of workflow states, the identifying comprising:
         using the current value of the first hierarchy attribute to determine that the first data object belongs to the first hierarchy of data objects specified by the metadata; and
         identifying the first actor as authorized to perform the first workflow task for a second data object hierarchically related to the first data object in the first hierarchy;
      generating a graphical user interface (GUI) through which the first actor can provide input specifying that the first workflow task is to be performed; and
      in response to receiving, from the first actor and through the GUI, input specifying that the first workflow task is to be performed:
         performing the first workflow task for the first data object; and updating a current workflow state of the first FSM to another workflow state by transitioning the first FSM from the first workflow state to the second workflow state.

2. The method of claim 1, wherein identifying the first actor as authorized to perform the first workflow task for the second data object in the first hierarchy comprises:
traversing at least a portion of the first hierarchy to identify the first actor as the actor authorized to perform the first workflow task for the second data object.

3. The method of claim 2, wherein the second data object is an ancestor of the first data object in the first hierarchy.

4. The method of claim 3, wherein the second data object is a parent of the first data object in the first hierarchy.

5. The method of claim 1, further comprising:
accessing a first specification for the first FSM for managing the first workflow, the first specification indicating the plurality of workflow states and the plurality of transitions among states in the plurality of workflow states;
generating the first FSM for managing the first workflow for the first data object using the first specification; and
associating the first FSM with the first data object.

6. The method of claim 5, wherein the plurality of data objects includes another data object different from the first data object, the method further comprising:
generating, using the first specification, a second FSM for managing the first workflow for the other data object, wherein the first FSM is different from the second FSM; and
associating the second FSM with the other data object.

7. The method of claim 1, wherein the first data object comprises a second attribute, the method comprising:
generating a second FSM for managing a second workflow for changing a value of the second attribute of the first data object; and
concurrently with using the first FSM to manage a first workflow for the first data object, using the second FSM to manage the second workflow for the second attribute of the first data object.

8. The method of claim 1, wherein the first workflow for the first data object is a workflow for managing changes to the first data object.

9. The method of claim 1, further comprising:
receiving input from each of multiple actors, including the first actor, input indicating whether or not the first workflow task is to be performed; and
performing the first workflow task for the first data object only when a majority of the multiple actors provides input indicating that the first workflow task is to be performed.

10. The method of claim 1, wherein the first workflow task corresponding to the first transition of the first FSM is approval or rejection of a change to the first data object.

11. At least one non-transitory computer readable storage medium storing processor-executable instructions that, when executed by a data processing system, cause the data processing system to perform a method for managing workflows for data objects persisted in at least one database of the data processing system, the data processing system comprising:
(i) the at least one database storing:
a plurality of data objects each representing a respective term in an enterprise glossary and storing values of attributes of the respective term, the attributes comprising a name attribute, a definition attribute, a hierarchy attribute, and/or one or more classification attributes, the plurality of data objects including a first data object, the first data object having a plurality of attributes including a first hierarchy attribute; and
metadata specifying relationships among at least some of the plurality of data objects by specifying one or more hierarchies of data objects including a first hierarchy; and
(ii) a workflow management system comprising: a workflow execution engine for managing execution of finite state machines (FSMs) including a first FSM associated with the first data object and for managing a first workflow for the first data object, the first FSM comprising a plurality of workflow states and a plurality of transitions corresponding to respective tasks of the first workflow, the method comprising:
using the workflow management system and the first FSM associated with the first data object to manage the first workflow for the first data object at least in part by:
accessing a current value of the first hierarchy attribute of the first data object in the at least one database, the current value of the first hierarchy attribute indicating at least one of the one or more hierarchies of data objects to which the first data object belongs, the at least one hierarchy including the first hierarchy;
identifying, using the current value of the first hierarchy attribute and the first hierarchy, a first actor authorized to perform a first workflow task for the first data object, the first workflow task corresponding to a first one of the plurality of transitions of the first FSM that transitions the first FSM from a first workflow state in the plurality of workflow states to a second workflow state in the plurality of workflow states, the identifying comprising:
using the current value of the first hierarchy attribute to determine that the first data object belongs to the first hierarchy of data objects specified by the metadata; and
identifying the first actor as authorized to perform the first workflow task for a second data object hierarchically related to the first data object in the first hierarchy;
generating a graphical user interface (GUI) through which the first actor can provide input specifying that the first workflow task is to be performed; and
in response to receiving, from the first actor and through the GUI, input specifying that the first workflow task is to be performed:
performing the first workflow task for the first data object; and
updating a current workflow state of the first FSM to another workflow state by transitioning the first FSM from the first workflow state to the second workflow state.

12. The at least one non-transitory computer-readable storage medium of claim 11, wherein identifying the first actor as authorized to perform the first workflow task for the second data object in the first hierarchy comprises:
traversing at least a portion of the first hierarchy to identify the first actor as the actor authorized to perform the first workflow task for the second data object wherein the second data object is related to the first data object according to the first hierarchy.

13. The at least one non-transitory computer-readable storage medium of claim 12, wherein the second data object is an ancestor of the first data object in the first hierarchy.

14. The at least one non-transitory computer-readable storage medium of claim 13, wherein the second data object is a parent of the first data object in the first hierarchy.

15. The at least one non-transitory computer-readable storage medium of claim 11, wherein a current value of a first classification attribute of the first data object indicates at least one classification for the first data object.

16. The at least one non-transitory computer-readable storage medium of claim 11, wherein the method further comprises:
  accessing a first specification for the first FSM for managing the first workflow, the first specification indicating the plurality of workflow states and the plurality of transitions among states in the plurality of workflow states;
  generating the first FSM for managing the first workflow for the first data object using the first specification; and
  associating the first FSM with the first data object.

17. The at least one non-transitory computer-readable storage medium of claim 16, wherein the plurality of data objects includes another data object different from the first data object, wherein the method further comprises:
  generating, using the first specification, a second FSM for managing the first workflow for the other data object, wherein the first FSM is different from the second FSM; and
  associating the second FSM with the other data object.

18. The at least one non-transitory computer-readable storage medium of claim 11, wherein the first data object comprises a second attribute, wherein the method further comprises:
  generating a second FSM for managing a second workflow for changing a value of the second attribute of the first data object; and
  concurrently with using the first FSM to manage a first workflow for the first data object, using the second FSM to manage the second workflow for the second attribute of the first data object.

19. The at least one non-transitory computer-readable storage medium of claim 11, wherein the first workflow for the first data object is a workflow for managing changes to the first data object.

20. The at least one non-transitory computer-readable storage medium of claim 11, wherein the method further comprises:
  receiving input from each of multiple actors, including the first actor, input indicating whether or not the first workflow task is to be performed; and
  performing the first workflow task for the first data object only when a majority of the multiple actors provides input indicating that the first workflow task is to be performed.

21. A data processing system comprising:
  at least one computer hardware processor;
  at least one database storing:
    a plurality of data objects each representing a respective term in an enterprise glossary and storing values of attributes of the respective term, the attributes comprising a name attribute, a definition attribute, a hierarchy attribute, and/or one or more classification attributes, the plurality of data objects including a first data object, the first data object having a plurality of attributes including a first hierarchy attribute; and
    metadata specifying relationships among at least some of the plurality of data objects by specifying one or more hierarchies of data objects including a first hierarchy; and
  a workflow management system comprising: a workflow execution engine for managing execution of finite state machines (FSMs) including a first FSM associated with the first data object and for managing a first workflow for the first data object, the first FSM comprising a plurality of workflow states and a plurality of transitions corresponding to respective tasks of the first workflow, wherein the workflow management system is configured to perform, using the at least one computer hardware processor, a method comprising:
    using the workflow management system and the first FSM associated with the first data object to manage the first workflow for the first data object at least in part by:
      accessing a current value of the first hierarchy attribute of the first data object in the at least one database, the current value of the first hierarchy attribute indicating at least one of the one or more hierarchies of data objects to which the first data object belongs, the at least one hierarchy including the first hierarchy;
      identifying, using the current value of the first hierarchy attribute and the first hierarchy, a first actor authorized to perform a first workflow task for the first data object, the first workflow task corresponding to a first one of the plurality of transitions of the first FSM that transitions the first FSM from a first workflow state in the plurality of workflow states to a second workflow state in the plurality of workflow states, the identifying comprising:
        using the current value of the first hierarchy attribute to determine that the first data object belongs to the first hierarchy of data objects specified by the metadata; and
        identifying the first actor as authorized to perform the first workflow task for a second data object hierarchically related to the first data object in the first hierarchy;
      generating a graphical user interface (GUI) through which the first actor can provide input specifying that the first workflow task is to be performed; and
      in response to receiving, from the first actor and through the GUI, input specifying that the first workflow task is to be performed:
        performing the first workflow task for the first data object; and
        updating the current workflow state of the first FSM to a second workflow state by transitioning the first FSM from the first workflow state to the second workflow state.

22. The data processing system of claim 21, wherein identifying the first actor as authorized to perform the first workflow task for the second data object in the first hierarchy comprises:
  traversing at least a portion of the first hierarchy to identify the first actor as the actor authorized to perform the first workflow task for the second data object wherein the second data object is related to the first data object according to the first hierarchy.

23. The data processing system of claim 21, wherein the second data object is an ancestor of the first data object in the first hierarchy.

24. The data processing system of claim 23, wherein the second data object is a parent of the first data object in the first hierarchy.

25. The data processing system of claim 21, wherein the current value of a first classification attribute of the first data object indicates at least one classification for the first data object.

26. The data processing system of claim 21, wherein the method further comprises:
   accessing a first specification for the first FSM for managing the first workflow, the first specification indicating the plurality of workflow states and the plurality of transitions among states in the plurality of workflow states;
   generating the first FSM for managing the first workflow for the first data object using the first specification; and
   associating the first FSM with the first data object.

27. The data processing system of claim 26, wherein the plurality of data objects includes another data object different from the first data object, wherein the method further comprises:
   generating, using the first specification, a second FSM for managing the first workflow for the other data object, wherein the first FSM is different from the second FSM; and
   associating the second FSM with the other data object.

28. The data processing system of claim 21, wherein the first data object comprises a second attribute, wherein the method further comprises:
   generating a second FSM for managing a second workflow for changing a value of the second attribute of the first data object; and
   concurrently with using the first FSM to manage a first workflow for the first data object, using the second FSM to manage the second workflow for the second attribute of the first data object.

29. The data processing system of claim 21, wherein the first workflow for the first data object is a workflow for managing changes to the first data object.

30. The data processing system of claim 21, wherein the method further comprises:
   receiving input from each of multiple actors, including the first actor, input indicating whether or not the first workflow task is to be performed; and
   performing the first workflow task for the first data object only when a majority of the multiple actors provides input indicating that the first workflow task is to be performed.

* * * * *